United States Patent [19]
Ebihara et al.

[11] Patent Number: 5,699,123
[45] Date of Patent: Dec. 16, 1997

[54] TELEVISION RECEIVER WITH AN ADJUSTABLE FRAME SIZE

[75] Inventors: Kazuyuki Ebihara; Kiyoshi Fujiwara; Izuru Shirai, all of Iwai, Japan

[73] Assignee: Victor Company of Japan, Ltd., Yokohama, Japan

[21] Appl. No.: 325,502

[22] Filed: Oct. 19, 1994

[30] Foreign Application Priority Data

Oct. 20, 1993 [JP] Japan .................. 5-285862
Nov. 12, 1993 [JP] Japan .................. 5-307330

[51] Int. Cl.$^6$ .................. H04N 5/46; H04N 5/445
[52] U.S. Cl. .................. 348/445; 348/913; 348/704; 348/734
[58] Field of Search .................. 348/445, 913, 348/473, 704, 469, 739, 734; H04N 5/46, 5/445, 7/04, 7/08

[56] References Cited

U.S. PATENT DOCUMENTS

| | | | |
|---|---|---|---|
| 5,132,793 | 7/1992 | Hirahata et al. | 348/445 |
| 5,146,331 | 9/1992 | Tsuchida | 359/169 |
| 5,249,049 | 9/1993 | Kranawetter et al. | 348/913 |
| 5,309,234 | 5/1994 | Kranawetter et al. | 348/913 |
| 5,347,318 | 9/1994 | Kobayashi et al. | 348/445 |
| 5,351,135 | 9/1994 | Saeger | 348/913 |
| 5,384,600 | 1/1995 | Kaizaki et al. | 348/445 |

FOREIGN PATENT DOCUMENTS 2121571 9/1990 Japan .................. H04N 5/80

OTHER PUBLICATIONS

"Runco Video Projector", Video Magazine, V16, n5, p. 14(3), Aug., 1992.

Primary Examiner—Glenton B. Burgess
Attorney, Agent, or Firm—Pollock, Vande Sande & Priddy

[57] ABSTRACT

A television receiver has a main body and a remote-control transmitter. A display having an aspect ratio of 16:9 visualizes an incoming video signal. A picture analysis circuit is operative for analyzing the incoming video signal. An aspect converting circuit is operative for changing an aspect condition of indication of the incoming video signal on the display. A button is provided on one of the main body and the remote-control transmitter for commanding automatic aspect conversion when being operated. A decision is made as to whether or not the button is operated to command automatic aspect conversion. When the button is decided to be operated, the picture analysis circuit is activated to analyze the incoming video signal and the aspect converting circuit is controlled to automatically control the aspect condition of indication of the incoming video signal on the display in response to a result of the analysis by the picture analysis circuit.

26 Claims, 29 Drawing Sheets

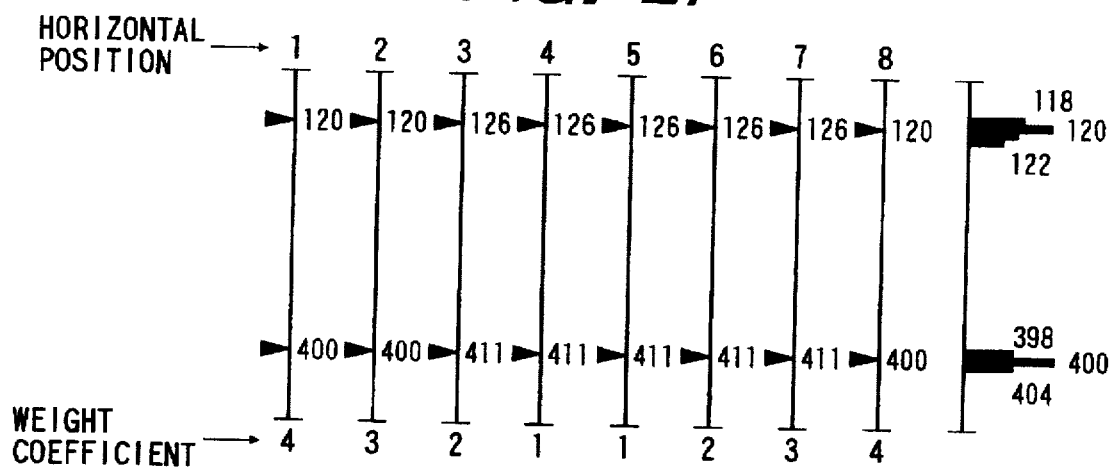
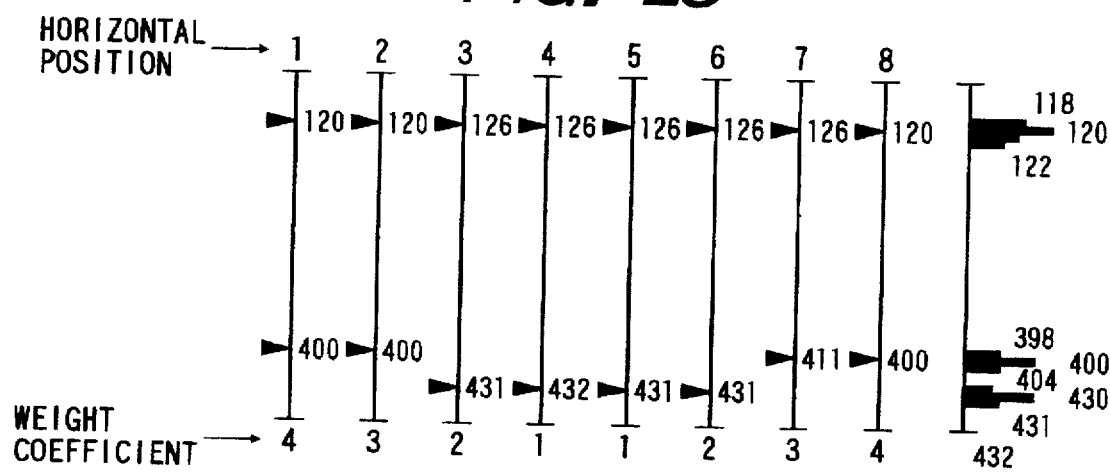
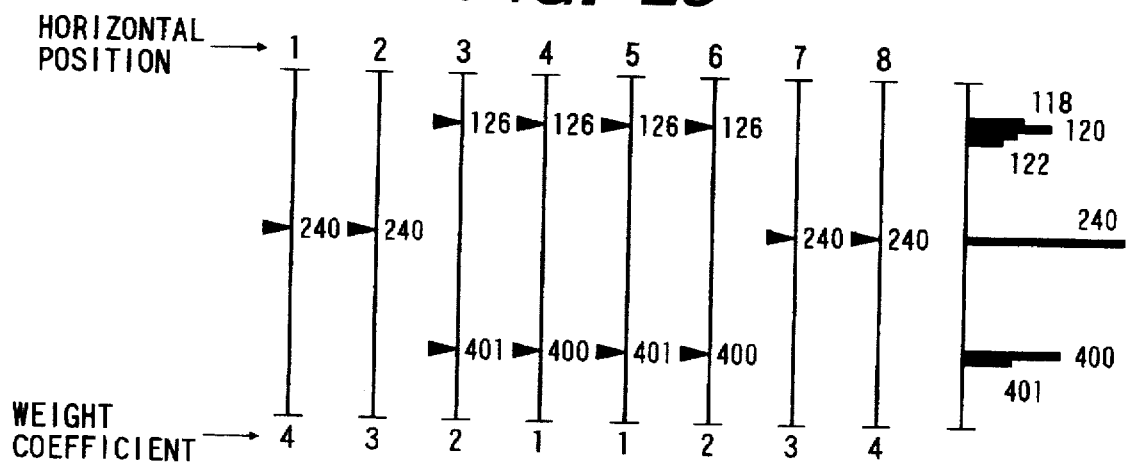

TELEVISION RECEIVER WITH AN ADJUSTABLE FRAME SIZE

BACKGROUND OF THE INVENTION

1. Field of the Invention

This invention relates to a television receiver having a wide display with an aspect ratio of, for example, 16:9. This invention also relates to a frame-size adjusting apparatus. This invention further relates to a method of detecting aspect-ratio information in a television signal or a video signal.

2. Description of the Prior Art

The aspect ratio is defined as the ratio of frame width to frame height in television. Typical formats of source television signals are of a normal-aspect type and a wide-aspect type adapted to an aspect ratio of 4:3 and an aspect ratio of 16:9 respectively. In addition, there are various kinds of formats of normal-aspect source television signals.

A vista source television signal adapted to an aspect ratio of 4:3 represents a picture composed of a central effective region and two noneffective mask regions extending above and below the central effective region respectively. The central effective region corresponds to an aspect ratio of 16:9. Generally, the noneffective mask regions are colored black.

Wide, television receivers have display screens corresponding to an aspect ratio of 16:9. Some of the wide television receivers include aspect converting circuits designed for a vista source television signal. The aspect converting circuit processes a vista source television signal or controls a vertical deflection width (a vertical raster amplitude), and thereby enables the central effective region of a picture to fully occupy a display screen while excluding the upper and lower noneffective mask regions of the picture from the display screen.

In general, wide television receivers can visualize normal-aspect source television signals as well as wide-aspect source television signals. Some of the wide television receivers are able to visualize normal-aspect source television signals of various formats on display screens in a manually changeable and adjustable manner. In such a wide television receiver, when the format or the type of an incoming television signal changes, complicated manual operation tends to be required to provide a desired manner of indication of every picture on a display screen.

SUMMARY OF THE INVENTION

It is a first object of this invention to provide an improved wide television receiver.

It is a second object of this invention to provide a good frame-size adjusting apparatus.

It is a third object of this invention to provide a good method of detecting aspect-ratio information.

This invention provides a television receiver having a main body and a remote-control transmitter which comprises a display having an aspect ratio of 16:9 and visualizing an incoming video signal; a picture analysis circuit for analyzing the incoming video signal; an aspect converting circuit for changing an aspect condition of indication of the incoming video signal on the display; a button provided on one of the main body and the remote-control transmitter for commanding automatic aspect conversion when being operated; first means for deciding whether or not the button is operated to command automatic aspect conversion; and second means for, when the button is decided to be operated by the first means, activating the picture analysis circuit to analyze the incoming video signal and controlling the aspect converting circuit to automatically control the aspect condition of indication of the incoming video signal on the display in response to a result of the analysis by the picture analysis circuit.

This invention provides a frame-size adjusting apparatus comprising a low pass filter for removing high-frequency components from an incoming video signal; an A/D converter for converting an output video signal from the low pass filter into corresponding digital data; a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit; wherein the calculation circuit comprises first means for differentiating the sampled and accepted segments of the digital data along a vertical direction for each of the vertically-extending regions, second means for subjecting output data from the first means to one of a squaring process or an absolute-value calculating process, and third means for detecting horizontal-line positions at which a central effective region of every picture starts and ends respectively in response to output data from the second means.

This invention provides a frame-size adjusting apparatus comprising a low pass filter for removing high-frequency components from an incoming video signal; an A/D converter for converting an output video signal from the low pass filter into corresponding digital data; a differentiating and summing circuit for differentiating the digital data into differentiation-resultant data along horizontal directions and summing the differential-resultant data into summing-resultant data in each of scanning lines; a calculation circuit for sampling and accepting segments of the digital data which correspond to a given horizontal position, for checking a signal level in response to the sampled and accepted segments of the digital data, and for detecting upper and lower mask regions in every picture represented by the incoming video signal in response to the summing-resultant signal and a result of the check on the signal level; and an aspect converting circuit for controlling an aspect condition of the incoming video signal in response to a result of the detection by the calculation circuit; wherein the calculation circuit comprises first means for differentiating the summing-resultant data data along a vertical direction, second means for subjecting output data from the first means to one of a squaring process or an absolute-value calculating process, and third means for detecting horizontal-line positions at which a central effective region of every picture starts and ends respectively in response to output data from the second means.

This invention provides a frame-size adjusting apparatus comprising a low pass filter for removing high-frequency components from an incoming video signal; an A/D converter for converting an output video signal from the low pass filter into corresponding digital data; a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit; wherein the calculation circuit comprises first means for detecting a luminance level in upper and lower mask regions, second means for nonlinearly converting the digital data with respect to a reference value based on the detected luminance level, and third means for detecting horizontal-line positions at which a central effective region of every picture starts and ends respectively in response to output data from the second means.

This invention provides a frame-size adjusting apparatus comprising a low pass filter for removing high-frequency components from an incoming video signal; an A/D converter for converting an output video signal from the low pass filter into corresponding digital data; a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit; wherein the calculation circuit comprises first means for detecting a luminance level in upper and lower mask regions, second means for comparing each value represented by the digital data with a reference value based on the detected luminance level, and third means for detecting horizontal-line positions at which a central effective region of every picture starts and ends respectively in response to a result of the comparison by the second means.

This invention provides a frame-size adjusting apparatus comprising a low pass filter for removing high-frequency components from an incoming video signal; an A/D converter for converting an output video signal from the low pass filter into corresponding digital data; a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit; wherein the calculation circuit comprises first means for detecting a luminance level in upper and lower mask regions, second means for converting the digital data into conversion-resultant data representative of either a predetermined first value and a predetermined second value with respect to a reference value based on the detected luminance level, and third means for detecting horizontal-line positions at which a central effective region of every picture starts and ends respectively in response to the conversion-resultant data.

This invention provides a frame-size adjusting apparatus comprising a low pass filter for removing high-frequency components from an incoming video signal; an A/D converter for converting an output video signal from the low pass filter; a luminance level detector for detecting a luminance level in upper and lower mask regions of a picture represented by the incoming video signal in response to an output signal of the A/D converter; an analog comparator for comparing the output video signal from the low pass filter with a reference signal representative of a reference level based on the detected luminance level, and for outputting digital data representative of a result of the comparing; a calculation circuit for sampling and accepting segments of the digital data which correspond to a plurality of vertically-extending regions in at least one field, and for detecting horizontal-line positions at which a central effective region of every picture starts and ends regarding the upper and lower mask regions respectively in response to the sampled and accepted segments of the digital data; and an aspect converting circuit for controlling an aspect condition of the incoming video signal in response to a result of the detection by the calculation circuit.

This invention provides a frame-size adjusting apparatus comprising a low pass filter for removing high-frequency components from an incoming video signal; an A/D converter for converting an output video signal from the low pass filter; a luminance level detector for detecting a luminance level in upper and lower mask regions of a picture represented by the incoming video signal in response to an output signal of the A/D converter; a digital comparator for comparing the output signal of the A/D converter with a reference signal representative of a reference level based on the detected luminance level, and for outputting digital data representative of a result of the comparing; a calculation circuit for sampling and accepting segments of the digital data which correspond to a plurality of vertically-extending regions in at least one field, and for detecting horizontal-line positions at which a central effective region of every picture starts and ends regarding the upper and lower mask regions respectively in response to the sampled and accepted segments of the digital data; and an aspect converting circuit for controlling an aspect condition of the incoming video signal in response to a result of the detection by the calculation circuit.

This invention provides a method of detecting aspect-ratio information which comprises the steps of a) sampling and accepting segments of data of an incoming video signal which correspond to a plurality of vertically-extending regions in at least one field; b) checking a luminance level represented by ones among the sampled and accepted data segments which correspond to upper and lower edge picture regions, and deciding whether or not upper and lower mask regions are present in a picture represented by the incoming video signal in response to the checked luminance level; c) detecting a luminance level in the upper and lower edge picture regions when the upper and lower mask regions are decided to be present; d) nonlinearly converting all the sampled and accepted data segments into conversion-resultant data segments with respect to a reference value based on the detected luminance level; and e) detecting horizontal-line positions at which a central effective region of every picture starts and ends respectively in response to the conversion-resultant data segments.

This invention provides a method of detecting aspect-ratio information which comprises the steps of a) sampling and accepting segments of data of an incoming video signal which correspond to a plurality of vertically-extending regions in at least one field; b) checking a luminance level represented by ones among the sampled and accepted data segments which correspond to upper and lower edge picture regions, and deciding whether or not upper and lower mask regions are present in a picture represented by the incoming video signal in response to the checked luminance level; c) detecting a luminance level in the upper and lower edge picture regions when the upper and lower mask regions are decided to be present; d) comparing all the sampled and accepted data segments with a reference value based on the detected luminance level; and e) detecting horizontal-line positions at which a central effective region of every picture starts and ends respectively in response to a result of the comparison by the step d).

This invention provides a method of detecting aspect-ratio information which comprises the steps of a) sampling and accepting segments of data of an incoming video signal which correspond to a plurality of vertically-extending regions in at least one field; b) checking a luminance level represented by ones among the sampled and accepted data segments which correspond to upper and lower edge picture regions, and deciding whether or not upper and lower mask regions are present in a picture represented by the incoming video signal in response to the checked luminance level; c) detecting a luminance level in the upper and lower edge picture regions when the upper and lower mask regions are decided to be present; d) converting all the sampled and accepted data segments into conversion-resultant data segments representative of either a first predetermined value or a second predetermined value with respect to a reference value based on the detected luminance level; and e) detecting horizontal-line positions at which a central effective region of every picture starts and ends respectively in response to the conversion-resultant data segments.

BRIEF DESCRIPTION OF THE DRAWINGS

FIG. 27 is a diagram of upper video start addresses, lower video end addresses, and an address projection which occur in the case of an incoming video signal representing a picture having upper and lower noneffective mask regions without any caption in a sixth embodiment of this invention.

FIG. 28 is a diagram of upper video start addresses, lower video end addresses, and an address projection which occur in the case of an incoming video signal representing a picture having an upper noneffective mask region and a lower mask region with a caption in the sixth embodiment.

FIG. 29 is a diagram of upper video start addresses, lower video end addresses, and an address projection which occur in the case of an incoming video signal representing a normal-aspect special-effect picture such as shown in FIG. 26 in the sixth embodiment.

DESCRIPTION OF THE PREFERRED EMBODIMENTS

First Embodiment

Figure 1:
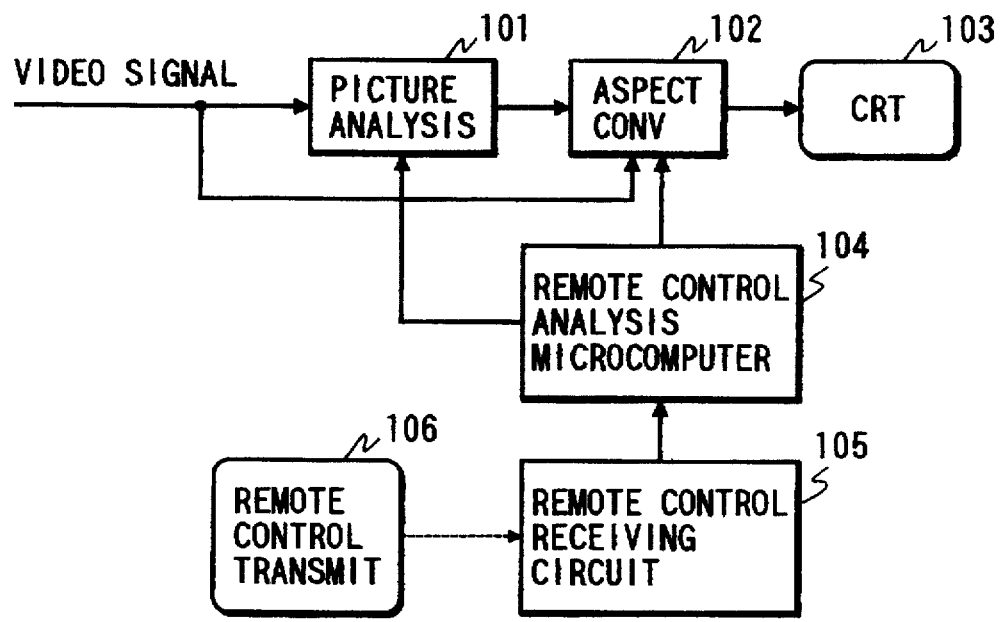
FIG. 1 is a block diagram of a television receiver according to a first embodiment of this invention.

With reference to FIG. 1, a wide television receiver of a first embodiment of this invention includes a picture analysis circuit 101, an aspect converting circuit 102, a display or a CRT 103, a remote-control analysis microcomputer 104, and a remote-control receiving circuit 105. A remote-control transmitter 106 generally separate from the main body of the television receiver can communicate with the remote-control receiving circuit 105 in a known way.

An incoming video signal (an incoming television signal) is inputted into the picture analysis circuit 101 and the aspect converting circuit 102. The circuit 101 analyzes the incoming video signal, and outputs a signal representative of a result of the analysis to the aspect converting circuit 102. The circuit 102 converts an aspect parameter or an aspect factor of the incoming video signal, and thereby changes the incoming video signal into a modified video signal in response to the output signal of the picture analysis circuit 101 or an output signal of the remote-control analysis microcomputer 104. The aspect converting circuit 102 feeds the modified video signal to the CRT 103. The CRT 103 visualizes every image represented by the modified video signal. The CRT 103 has a screen of predetermined dimensions corresponding to an aspect ratio of 16:9.

The aspect converting circuit 102 may be of another type which controls at least one of a horizontal deflection width (a horizontal raster amplitude) and a vertical deflection width (a vertical raster amplitude) in the CRT 103 to implement aspect conversion in response to the output signal of the picture analysis circuit 101 or the output signal of the remote-control analysis microcomputer 104.

The picture analysis circuit 101 extracts segments of plural fields of the incoming video signal which represent picture portions occupying different horizontal positions and extending along a vertical direction. The circuit 101 analyzes the extracted signal segments to decide whether or not every picture represented by the incoming video signal has upper and lower noneffective mask regions. Generally, the noneffective mask regions are colored black. In the case of a picture having a mask region, the circuit 101 further decides whether a caption is present in or absent from the mask region. It should be noted that the structure of the picture analysis circuit 101 and an algorithm used therein will be described later in connection with a second embodiment of this invention.

Figure 2:
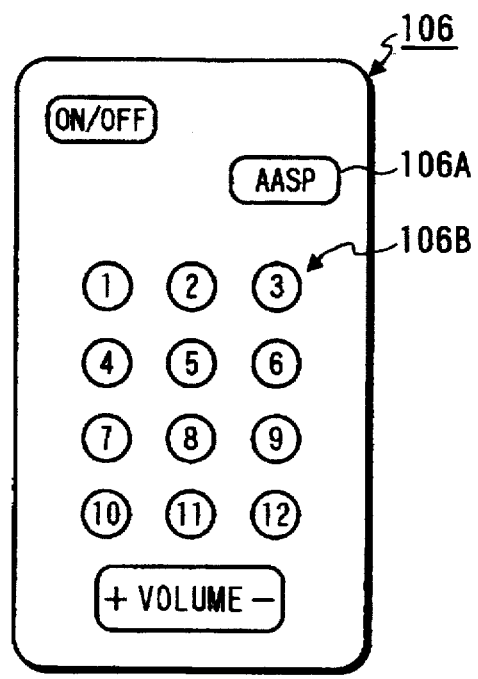
FIG. 2 is a plan view of a remote-control transmitter in FIG. 1.

As shown in FIG. 2, the remote-control transmitter 106 has a body provided with a button 106A for commanding or requiring automatic aspect conversion and an array 106B of channel selection keys. The button 106A is also designed to command or require change of the mode of operation of the aspect converting circuit 102. Specifically, first depression of the button 106A commands automatic aspect conversion while second or later depression thereof commands operation-mode change.

When the button 106A is depressed for the first time, the remote-control transmitter 106 emits a signal containing information representative of an automatic aspect conversion requirement. Generally, the signal emitted from the remote-control transmitter 106 is received by the remote-control receiving circuit 105. The remote-control receiving circuit 105 derives information from the received signal, and outputs the derived information to the remote-control analysis microcomputer 104. The remote-control analysis microcomputer 104 decides whether or not the button 106A is depressed for the first time, that is, whether or not automatic aspect conversion is required, by referring to the information from the remote-control receiving circuit 105. When the remote-control analysis microcomputer 104 detects that automatic aspect conversion is required, the device 104 outputs a signal to the picture analysis circuit 101 which commands the execution of analysis of the incoming video signal by the picture analysis circuit 101. The picture analysis circuit 101 analyzes the incoming video signal in compliance with the command signal from the remote-control analysis microcomputer 104. According to the analysis by the picture analysis circuit 101, a determination is made as to whether or not every picture represented by the incoming video signal has upper and lower noneffective mask regions. In the case of a picture having a mask region, a further determination is made as to whether a caption is present in or absent from the mask region. In addition, a further determination may be made regarding a width of the mask region. The picture analysis circuit 101 outputs a command signal to the aspect converting circuit 102 in response to results of the determinations so that the aspect converting circuit 102 can provide an optimal aspect or a desirable aspect regarding the modified video signal. Specifically, one of different modes of operation of the aspect converting circuit 102 is automatically selected in response to the command signal from the picture analysis circuit 101, that is, the results of the determinations.

When the button 106A is depressed for the second or later time, the remote-control transmitter 106 emits a signal containing information representative of an operation-mode change requirement. Generally, the signal emitted from the remote-control transmitter 106 is received by the remote-control receiving circuit 105. The remote-control receiving circuit 105 derives information from the received signal, and outputs the derived information to the remote-control analysis microcomputer 104. The remote-control analysis microcomputer 104 decides whether or not the button 106A is depressed for one of the second and later times, that is, whether or not operation-mode change is required, by referring to the information from the remote-control receiving circuit 105. When the remote-control analysis microcomputer 104 detects that operation-mode change is required, the device 104 outputs a signal to the aspect converting circuit 102 which commands change of the mode of operation of the aspect converting circuit 102. The aspect converting circuit 102 changes its operation mode in response to the command signal from the remote-control analysis microcomputer 104.

The aspect converting circuit 102 operates in one of predetermined different modes ①, ②, ③, and ④. Operation of the aspect converting circuit 102 is changed among the predetermined modes ①, ②, ③, and ④ in response to the command signals from the remote-control analysis microcomputer 104 and the picture analysis circuit 101.

Figure 3:
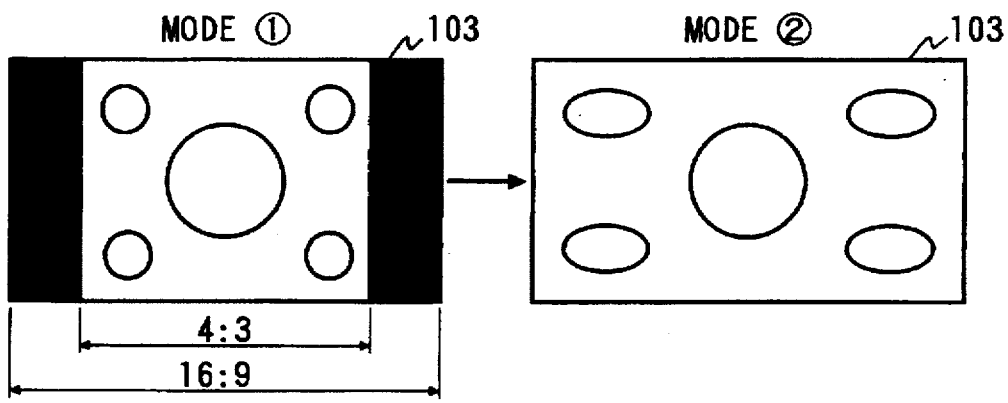
FIG. 3 is a diagram of pictures indicated on a CRT in FIG. 1.

During the first mode ① of operation, the aspect converting circuit 102 changes a normal-aspect incoming video signal into a wide-aspect modified video signal through a time-base compressing process (a horizontally compressing process), or the aspect converting circuit 102 reduces a horizontal deflection width (a horizontal raster amplitude) in the CRT 103. In this case, as shown in FIG. 3, every picture indicated by the CRT 103 has a central effective, region and noneffective vertical edges extending rightward and leftward of the central effective region respectively. The central effective region of the picture has an aspect radio of 4:3, and agrees with a picture represented by the normal-aspect incoming video signal.

During the second mode ② of operation, the aspect converting circuit 102 changes a normal-aspect incoming video signal into a wide-aspect modified video signal through a nonlinearly and horizontally expanding process, or the aspect converting circuit 102 nonlinearly increases a horizontal deflection width (a horizontal raster amplitude) in the CRT 103. In this case, as shown in FIG. 3, every picture represented by the normal-aspect incoming video signal fully occupies the screen of the CRT 103 while only left-hand and right-hand edges of the picture are expanded horizontally.

Figure 4:
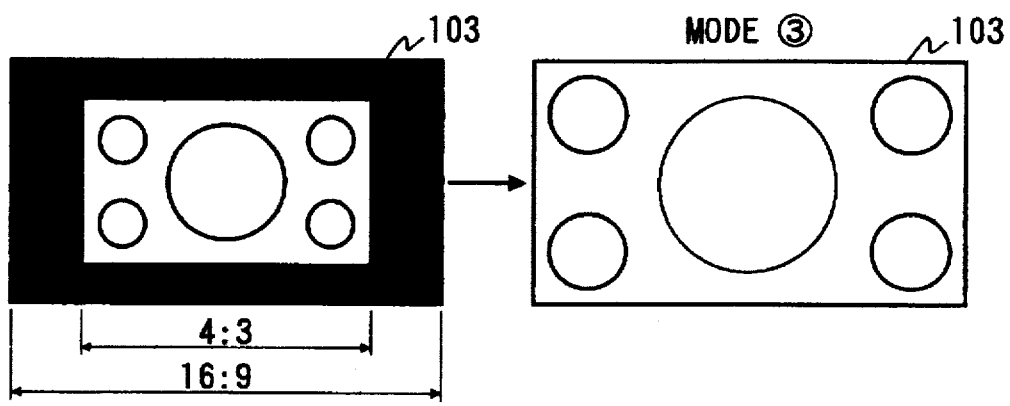
FIG. 4 is a diagram of pictures indicated on the CRT in FIG. 1.

The third mode ③ of operation of the aspect converting circuit 102 is designed to handle a normal-aspect incoming video signal which represents a picture composed of a wide-aspect central effective region and two noneffective mask regions extending above and below the central effective region respectively. An example of such a picture is shown in the left-hand portion of FIG. 4. During the third mode ③ of operation, the aspect converting circuit 102 changes such a normal-aspect incoming video signal into a wide-aspect modified video signal through an expanding process, or the aspect converting circuit 102 increases a vertical deflection width (a vertical raster amplitude) in the CRT 103. In this case, as shown in the right-hand portion of FIG. 4, the central effective region of a picture represented by the normal-aspect incoming video signal is expanded to fully occupy the screen of the CRT 103 while the upper and lower noneffective mask regions of the picture are excluded from the screen of the CRT 103.

Figure 5:
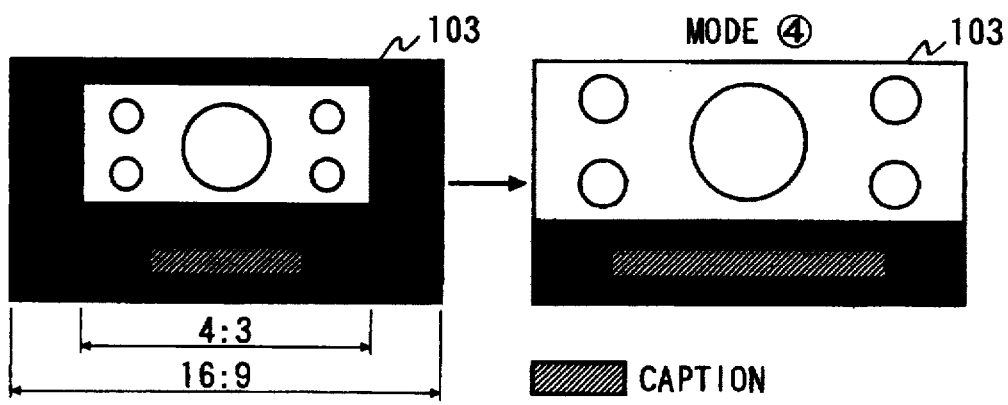
FIG. 5 is a diagram of pictures indicated on the CRT in FIG. 1.

The fourth mode ④ of operation of the aspect converting circuit 102 is designed to handle a normal-aspect incoming video signal which represents a picture composed of a wide-aspect central effective region, a noneffective mask region extending above the central effective region, and a mask region extending below the central effective region and having a caption. An example of such a picture is shown in the left-hand portion of FIG. 5. During the fourth mode ④ of operation, the aspect converting circuit 102 changes such a normal-aspect incoming video signal into a wide-aspect modified video signal through an expanding process and a compressing process. In this case, as shown in the right-hand portion of FIG. 5, the central effective region of a picture represented by the normal-aspect incoming video signal is expanded to fully occupy upper and mid portions of the screen of the CRT 103 while the upper noneffective mask region of the picture is excluded from the screen of the CRT 103. In addition, the lower mask region of the picture, that is, the mask region having the caption, is compressed vertically to fully occupy a lower portion of the screen of the CRT 103.

As previously described, the picture analysis circuit 101 analyzes the incoming video signal when the button 106A on the remote-control transmitter 106 is depressed for the first time. According to the analysis by the picture analysis circuit 101, a determination is made as to whether or not every picture represented by the incoming video signal has upper and lower noneffective mask regions. In the case of a picture without upper and lower noneffective mask regions, the picture analysis circuit 101 outputs a command signal to the aspect converting circuit 102 which enables the aspect converting circuit 102 to operate in the second mode ②. In the case of a picture having upper and lower noneffective mask regions, a further determination is made as to whether a caption is present in or absent from the lower mask region. In the absence of a caption, the picture analysis circuit 101 outputs a command signal to the aspect converting circuit 102 which enables the aspect converting circuit 102 to operate in the third mode ③. In the presence of a caption, the picture analysis circuit 101 outputs a command signal to the aspect converting circuit 102 which enables the aspect converting circuit 102 to operate in the fourth mode ④. Thus, when the button 106A on the remote-control transmitter 106 is depressed for the first time, operation of the aspect converting circuit 102 is automatically set to one of the second, third, and fourth modes ②, ③, and ④ in accordance with the format or the type of the incoming video signal which is detected by the picture analysis circuit 101.

As previously described, in response to second or later depression of the button 106A, the remote-control analysis microcomputer 104 outputs a signal to the aspect converting circuit 102 which commands change of the mode of operation of the aspect converting circuit 102. The aspect converting circuit 102 changes its operation mode in response to the command signal from the remote-control analysis microcomputer 104.

Consequently, the mode of operation of the aspect converting circuit 102 is sequentially and cyclically changed in a predetermined order as ②→①→③→④→② (or ③→④→②→①→③; ④→②→①→③→④) in response to depressions of the button 106A. To attain the predetermined order, preset different priorities are assigned to the operation modes respectively.

Figure 6:
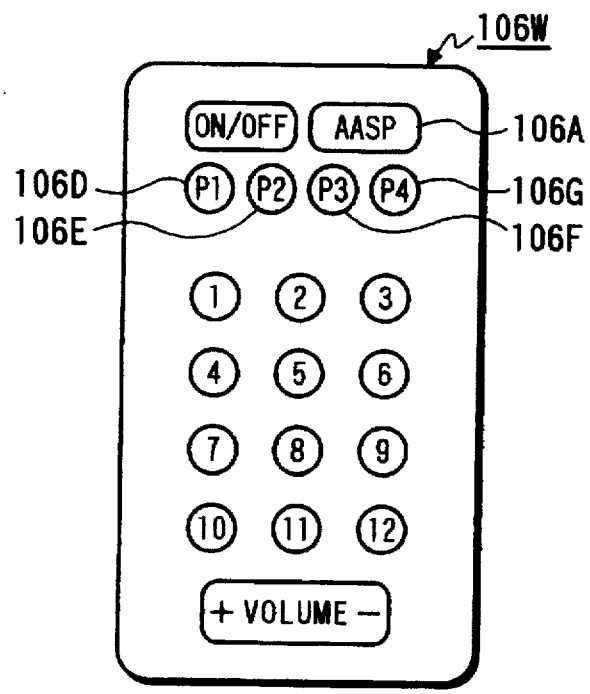
FIG. 6 is a plan view of a modified remote-control transmitter.

The remote-control transmitter 106 of FIG. 2 may be replaced by a remote-control transmitter 106W of FIG. 6. As shown in FIG. 6, the remote-control transmitter 106W additionally includes buttons 106D, 106E, 106F, and 106G for selecting or requiring the modes ①, ②, ③, and ④ of operation of the aspect converting circuit 102 respectively. When one of the buttons 106D, 106E, 106F, and 106G is depressed, the remote-control transmitter 106W emits a signal containing information representative of an operation-mode selection requirement. Generally, the signal emitted from the remote-control transmitter 106W is received by the remote-control receiving circuit 105. The remote-control receiving circuit 105 derives information from the received signal, and outputs the derived information to the remote-control analysis microcomputer 104. The remote-control analysis microcomputer 104 decides which of the buttons 106D, 106E, 106F, and 106G is depressed, that is, which of the modes ①, ②, ③, and ④ of operation of the aspect converting circuit 102 is required, by referring to the information from the remote-control receiving circuit 105. When the remote-control analysis microcomputer 104 detects or identifies the required mode of operation, the device 104 outputs a signal to the aspect converting circuit 102 which commands the aspect converting circuit 102 to operate in the required mode.

It is preferable that the picture analysis circuit 101 is activated only when the button 106A is depressed to require automatic aspect conversion. In this case, it is possible to prevent an aspect change in images indicated on the CRT 103 during an interval other than a time of depression of the button 106A.

The picture analysis circuit 101 may be operated in response to a change in operating conditions of the television receiver such as a change between an on state and an off state of a main power supply, a channel change, an audio-mode change (a change among a stereophonic mode, a monophonic mode, and a bilingual mode), or a change between incoming source signals (a change between a tuner output signal and an externally-applied signal). It should be noted that the remote-control analysis microcomputer 104 can easily detect such a change in operating conditions of the television receiver by referring to an output signal of the remote-control receiving circuit 105.

The button 106A may be moved from the remote-control transmitter 106 to the main body of the television receiver. In this case, the button 106A is directly connected to the remote-control analysis microcomputer 104.

Aspect conversion means a change in conditions of the visualization of the incoming video signal on the CRT 103 which contains an adjusting change in a vertical picture (frame) amplitude and an adjusting change in a vertical picture position in addition to mode conversion. For example, another mode of operation of the aspect converting circuit 102 may be provided by adding adjustment of a vertical picture position to the previously-described mode ④.

Second Embodiment

Figure 7:
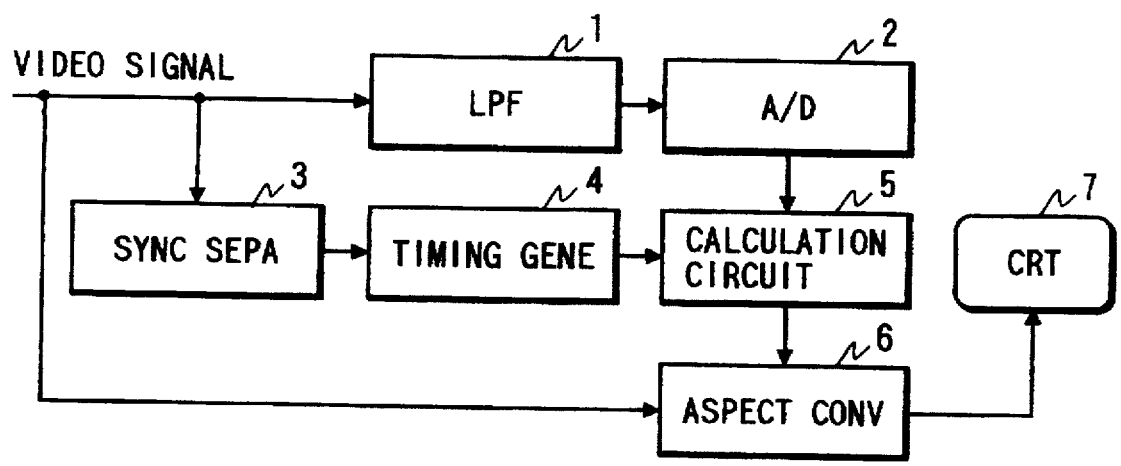
FIG. 7 is a block diagram of a television receiver according to a second embodiment of this invention.

With reference to FIG. 7, a wide television receiver of a second embodiment of this invention includes a low pass filter 1, an A/D converter 2, a sync separation circuit 3, a timing signal generator 4, a calculation circuit 5, an aspect converting circuit 6, and a display or a CRT 7.

The low pass filter 1, the A/D converter 2, the sync separation circuit 3, the timing signal generator 4, and the calculation circuit 5 compose a picture analysis circuit corresponding to the picture analysis circuit 101 in FIG. 1. The aspect converting circuit 6 corresponds to the aspect converting circuit 102 in FIG. 1. The CRT 7 corresponds to the CRT 103 in FIG. 1.

An incoming video signal (an incoming television signal) is inputted into the low pass filter 1, the sync separation circuit 3, and the aspect converting circuit 6. The low pass filter 1 removes high-frequency components from the incoming video signal, and outputs a resultant video signal to the A/D converter 2. It should be noted that low-frequency components, for example, components having frequencies of 0–800 kHz, are predominant in segments of an incoming video signal which represent mask regions. Accordingly, detection of mask regions can be executed by referring to only low-frequency components of an incoming video signal. In the case where the incoming video signal is an NTSC composite video signal, color signal components superposed at a frequency of 3.58 MHz are rejected by the low pass filter 1. Thus, the A/D converter 2 and the calculation circuit 5 which follow the low pass filter 1 operate regardless of whether the incoming video signal is an NTSC composite video signal or a luminance signal which results from Y/C separation of a composite video signal. The A/D converter 2 changes the received video signal into a corresponding digital video signal. The A/D converter 2 outputs the digital video signal to the calculation circuit 5.

The sync separation circuit 3 separates a horizontal sync signal and a vertical sync signal from the incoming video signal, and outputs the sync signals to the timing signal generator 4. The timing signal generator 4 produces a timing signal in response to the sync signals, and outputs the timing signal to the calculation circuit 5. The calculation circuit 5 samples and accepts the output video signal of the A/D converter 2 at a timing determined by the timing signal fed from the timing signal generator 4. The calculation circuit 5 decides whether or not a picture represented by the incoming video signal has upper and lower noneffective mask regions on the basis of the sampled and accepted video signal.

It is preferable that the calculation circuit 5 uses a microcomputer. In this case, an A/D converter in an I/O port of the microcomputer may be used as the A/D converter 2.

In the case where the calculation circuit 5 is of the type which can select or extract desired segments from the output video signal of the A/D converter 2 in response to a horizontal sync signal and a vertical sync signal, the timing signal generator 4 can be omitted.

Figure 8:
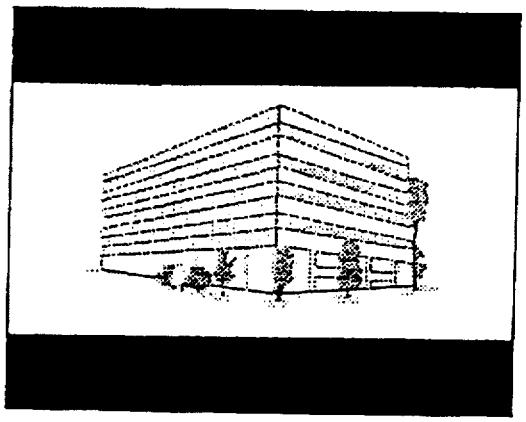
FIG. 8 is an illustration of a picture having a central effective region, and upper and lower noneffective mask regions.
Figure 9:
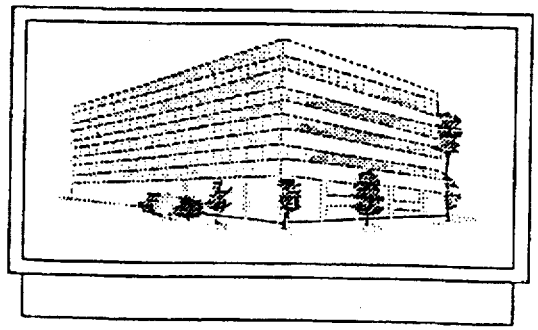
FIG. 9 is an illustration of a picture indicated on a CRT in FIG. 7 which corresponds to the picture of FIG. 8.

When the calculation circuit 5 detects that a picture represented by the incoming video signal has a wide-aspect central effective region and upper and lower noneffective mask regions as shown in FIG. 8, the calculation circuit 5 commands the aspect converting circuit 6 to execute aspect conversion of the incoming video signal so that the central effective region of the picture represented by the incoming video signal will fully occupy the screen of the CRT 7 as shown in FIG. 9. The aspect converting circuit 6 executes aspect conversion by processing the incoming video signal or by controlling at least one of a horizontal deflection width (a horizontal raster amplitude) and a vertical deflection width (a vertical raster amplitude) in the CRT 7.

Figure 10:
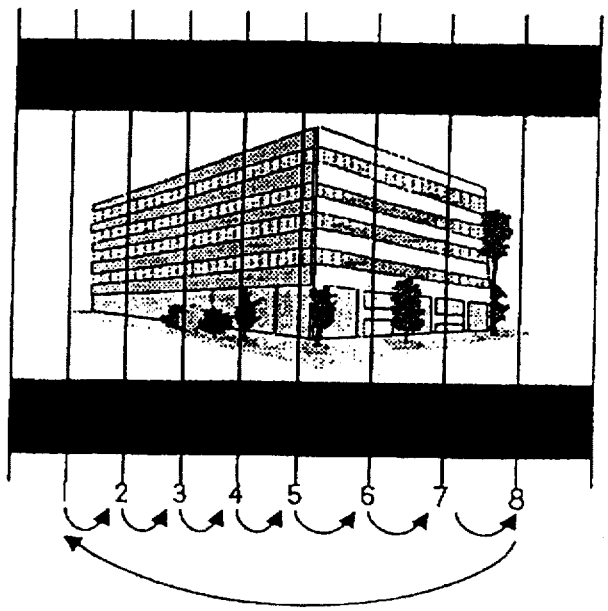
FIG. 10 is a diagram of a picture represented by an incoming video signal, and vertical line regions of the picture which correspond to extracted segments of the incoming video signal in the second embodiment.

Operation of the calculation circuit 5 will now be further described. As previously described, the calculation circuit 5 extracts segments of the output video signal of the A/D converter 2 in response to the timing signal fed from the timing signal generator 4. Specifically, during a first field-period, the signal segments (data) extracted by the calculation circuit 5 correspond to a vertical picture line region having a horizontal position "1" as shown in FIG. 10. During a second field-period, the signal segments (data) extracted by the calculation circuit 5 correspond to a vertical picture line region having a horizontal position "2" which follows the horizontal position "1" along a time base as shown in FIG. 10. During third and later field-periods, the signal segments (data) extracted by the calculation circuit 5 correspond to vertical picture line regions having horizontal positions "3", "4", "5", "6", "7", and "8" which follow the horizontal position "2" along a time base as shown in FIG. 10. In this way, during eight successive field-periods, the signal segments (data) extracted by the calculation circuit 5 correspond to vertical picture line regions having horizontal positions "1", "2", "3", "4", "5", "6", "7", and "8". It should be noted that during one field-period or two successive field-periods, the calculation circuit 5 may extract signal segments (data) corresponding to vertical picture line regions having horizontal positions "1", "2", "3", "4", "5", "6", "7", and "8".

Figure 11:
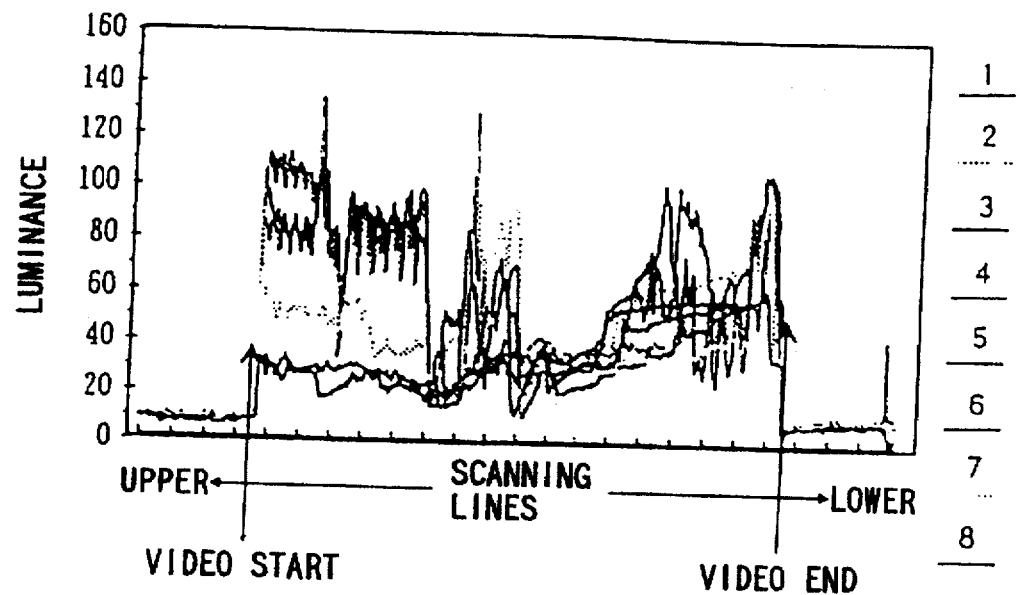
FIG. 11 is a diagram of a first example of a distribution of luminances represented by extracted signal segments which correspond to one vertical picture line region in the second embodiment.

FIG. 11 shows an example of a distribution of the luminances represented by the signal segments (data) extracted by the calculation circuit 5 which correspond to one vertical picture line region. The example in FIG. 11 occurs in the case where the incoming video signal represents a picture having a wide-aspect central effective region and upper and lower noneffective mask regions. In this case, a decision regarding the presence and absence of upper and lower mask regions can be executed through detection of the positions of an upper line (an upper horizontal scanning line) and a lower line (a lower horizontal scanning line) at which a central effective region starts and ends respectively, that is, through detection of the positions of the boundaries between the central effective region and the upper and lower mask regions.

Figure 12:
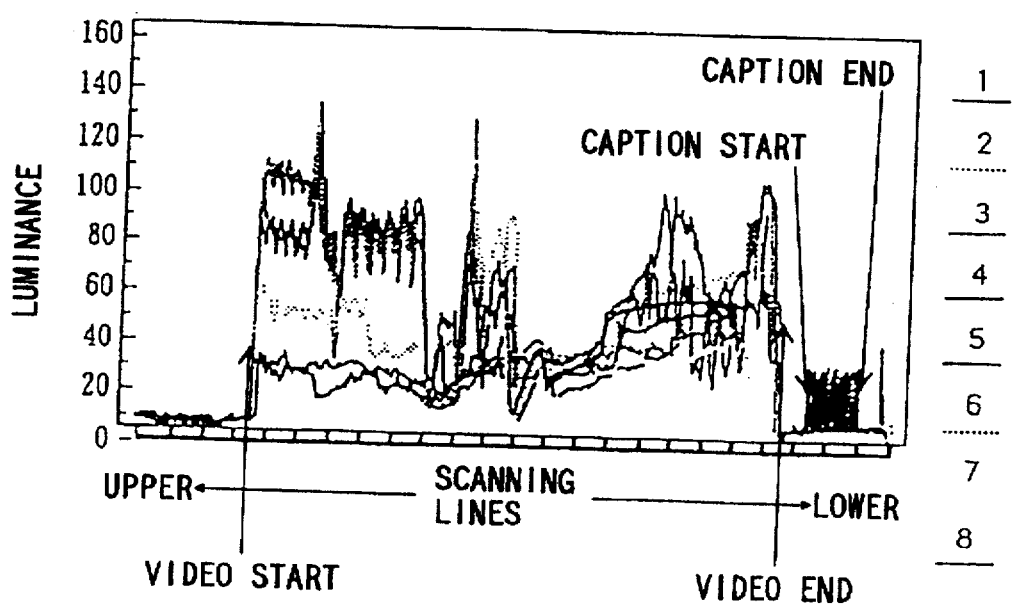
FIG. 12 is a diagram of a second example of a distribution of luminances represented by extracted signal segments which correspond to one vertical picture line region in the second embodiment.

FIG. 12 shows an example of a distribution of the luminances represented by the signal segments extracted by the calculation circuit 5 which correspond to one vertical picture line region. The example in FIG. 12 occurs in the case where the incoming video signal represents a picture having a wide-aspect central effective region, an upper noneffective mask region, and a lower mask region with a caption. In this case, a decision regarding the presence and absence of upper and lower mask regions can be executed through detection of the positions of an upper line (an upper horizontal scanning line) and a lower line (a lower horizontal scanning line) at which a central effective region starts and ends respectively, that is, through detection of the positions of the boundaries between the central effective region and the upper and lower mask regions. In addition, a decision regarding the presence and absence of a caption in and from the lower mask region can be executed through detection of the positions of an upper line (an upper horizontal scanning line) and a lower line (a lower horizontal scanning line) at which the caption starts and ends respectively, that is, through detection of the positions of the boundaries between the caption and backgrounds in the lower mask region.

Figure 13:
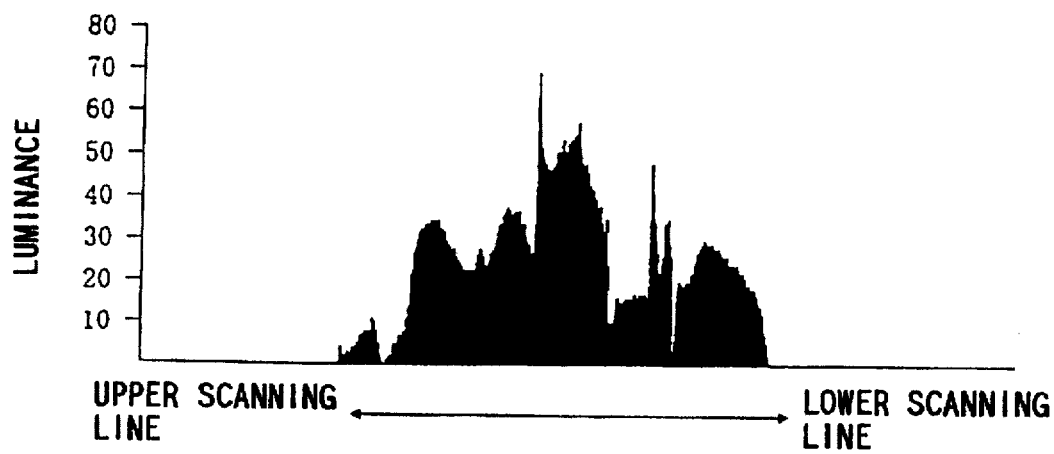
FIG. 13 is a diagram of a third example of a distribution of luminances represented by extracted signal segments which correspond to one vertical picture line region in the second embodiment.
Figure 14:
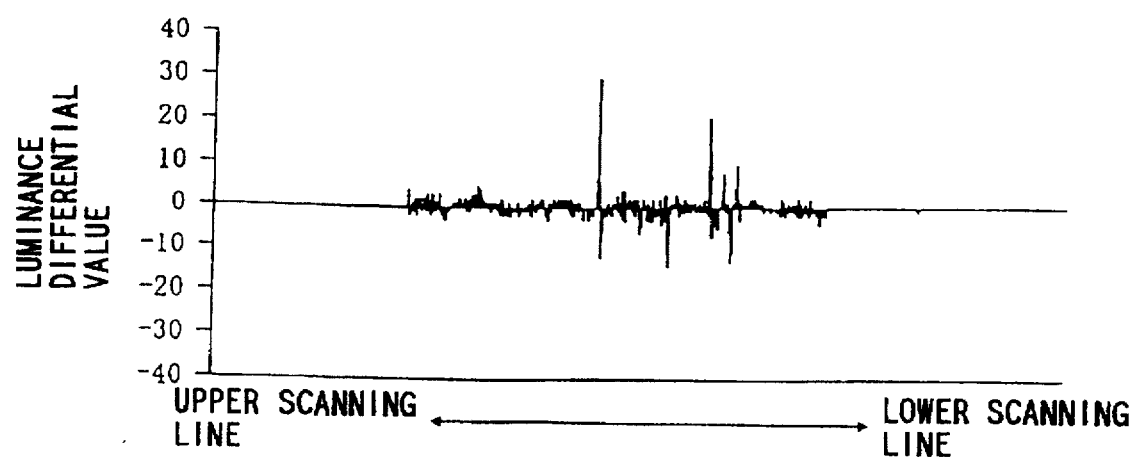
FIG. 14 is a diagram of a result of differentiation of the luminance distribution in FIG. 13.

To enable accurate detection of the positions of the previously-indicated boundaries, the calculation circuit 5 differentiates, along a vertical direction, the distribution of the luminances represented by the extracted signal segments which correspond to each of the vertical picture line regions. In other words, the calculation circuit 5 determines a variation, along a vertical direction, in the luminances represented by the extracted signal segments. The differentiation is introduced in consideration of the fact that a mask region has no luminance variation. FIG. 13 shows an example of the luminances represented by the extracted signal segments which correspond to one vertical picture line region. FIG. 14 shows a result of the differentiation of the distribution of the luminances in FIG. 13.

Figure 15:
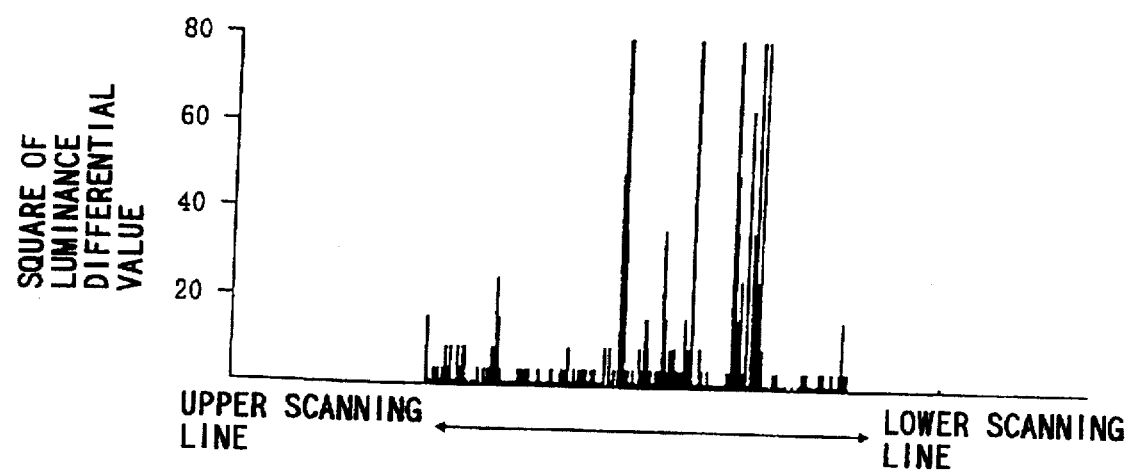
FIG. 15 is a diagram of a result of the square in connection with the differentiation-resultant data in FIG. 14.

To enable more accurate detection of the positions of the previously-indicated boundaries, the calculation circuit 5 squares the result of the differentiation of the luminance distribution. FIG. 15 shows the result of the square in connection with the differentiation-resultant data in FIG. 14. The calculation circuit 5 compares the square-resultant values with a predetermined reference value, detecting the positions of the previously-indicated boundaries.

Figure 16:
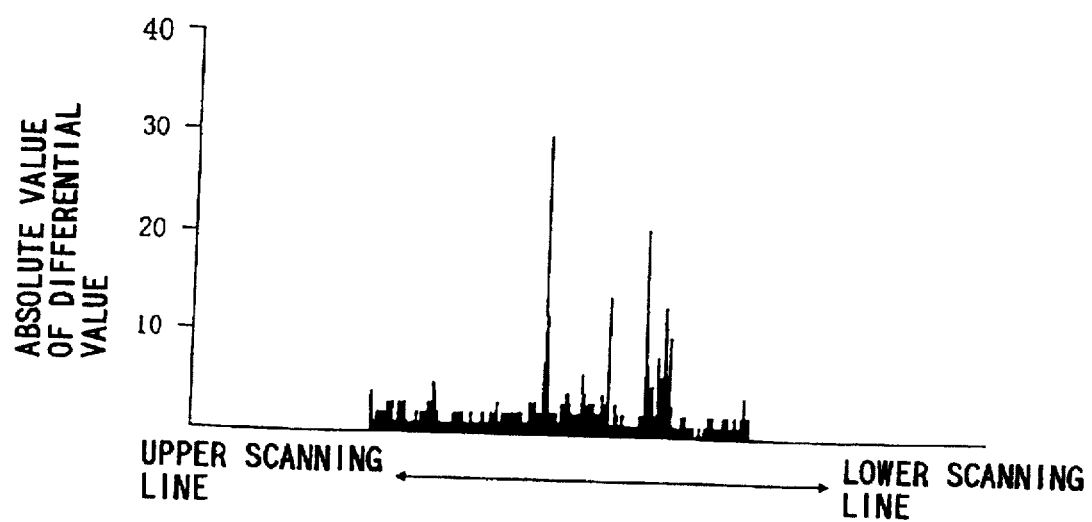
FIG. 16 is a diagram of a result of the absolute-value calculation in connection with the differentiation-resultant data in FIG. 14.

The squaring process executed by the calculation circuit 5 may be replaced by a process of calculating absolute values of the result of the differentiation of the luminance distribution. FIG. 16 shows the result of the absolute-value calculation in connection with the differentiation-resultant data in FIG. 14. The calculation circuit 5 compares the resultant absolute values with a predetermined reference value, detecting the positions of the previously-indicated boundaries.

The calculation circuit 5 detects the positions of an upper line (an upper horizontal scanning line) and a lower line (a lower horizontal scanning line) at which a central effective region starts and ends respectively in response to data representing the result of the square (see FIG. 15) or the absolute-value calculation (see FIG. 16). The calculation circuit 5 includes a memory storing the data representing the result of the square (see FIG. 15) or the absolute-value calculation (see FIG. 16) in connection with all the vertical picture line regions. Pieces of the data representing the result of the square (see FIG. 15) or the absolute-value calculation (see FIG. 16) are stored in segments of the memory to which successive addresses are sequentially assigned along a vertical direction. The calculation circuit 5 sequentially scans the data pieces in the memory along both a downward vertical direction (an up-to-down direction) and an upward vertical direction (a down-to-up direction), and searches for data pieces greater in level than immediately preceding data pieces by at least a predetermined reference value (a predetermined reference level). The calculation circuit 5 determines or detects addresses of the searched data pieces as indications of the positions of an upper line (an upper horizontal scanning line) and a lower line (a lower horizontal scanning line) at which a central effective region starts and ends respectively. In the case of eight vertical picture line regions as shown in FIG. 10, there are provided eight addresses regarding the position of an upper line at which a central effective region starts, and eight addresses regarding the position of a lower line at which a central effective region ends. When a caption is present in a lower mask region, there are also provided eight addresses regarding the position of an upper line at which a caption starts, and eight addresses regarding the position of a lower line at which a caption ends.

Figure 17:
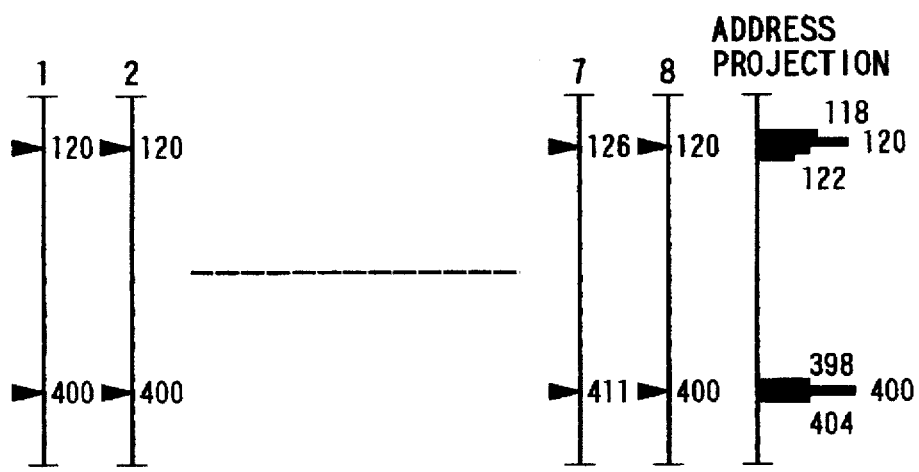
FIG. 17 is a diagram of upper video start addresses, lower video end addresses, and an address projection in the second embodiment.

The detected addresses regarding the position of an upper line at which a central effective region starts are now referred to as upper video start addresses. On the other hand, the detected addresses regarding the position of a lower line at which a central effective region ends are now referred to as lower video end addresses. FIG. 17 shows an example of the upper video start addresses and the lower video end addresses. According to the example in FIG. 17, the upper video start address and the lower video end address are "120" and "400" respectively regarding the vertical picture line region having a horizontal position "1", and the upper video start address and the lower video end address are "120" and "400" respectively also regarding the vertical picture line region having a horizontal position "2". In addition, the upper video start address and the lower video end address are "126" and "411" respectively regarding the vertical picture line region having a horizontal position "7", and the upper video start address and the lower video end address are "120" and "400" respectively regarding the vertical picture line region having a horizontal position "8".

A value or numeral of "1" is given to each of the upper video start addresses and the lower video end addresses while a value or numeral of "0" is given to each of other addresses. The numerals are added in each address position, forming an address projection such as shown in the right-hand edge of FIG. 17.

Data representing the address projection exhibits a normal distribution, a random distribution, or a good distribution in which all upper video start addresses are equal to each other and all lower video end addresses are equal to each other. The random distribution tends to occur in the case of a picture which does not have mask regions. Addresses at which peak values occur in the address projection are defined as a final upper video start address and a final lower video end address. In the case where the final upper video start address and the final lower video end address are composed of more than half members, the final upper video start address and the final lower video end address are accepted and used. On the other hand, in the case where the final upper video start address and the final lower video end address are not composed of more than half members, the final upper video start address and the final lower video end address are rejected and discarded. In this case, the calculation circuit 5 samples and accepts segments of the output video signal of the A/D converter 2 again, and generates a second address projection from the sampled signal segments. Then, the calculation circuit 5 decides a final upper video start address and a final lower video end address by referring to the second address projection.

The calculation circuit 5 decides whether or not every picture represented by the incoming video signal has upper and lower noneffective mask regions by referring to information of the final upper video start address and the final lower video end address. When the calculation circuit 5 detects that every picture represented by the incoming video signal has a wide-aspect central effective region and upper and lower noneffective mask regions as shown in FIG. 8, the calculation circuit 5 commands the aspect converting circuit 6 to execute aspect conversion of the incoming video signal so that the central effective region of the picture represented by the incoming video signal will fully occupy the screen of the CRT 7 as shown in FIG. 9.

In the case where the calculation circuit 5 includes a microcomputer having a combination of an I/O port, a CPU, a RAM, and a ROM, the calculation circuit 5 operates in accordance with a program stored in the ROM. In this case, the program is designed to enable the calculation circuit 5 to execute the previously-indicated processes.

Third Embodiment

Figure 18:
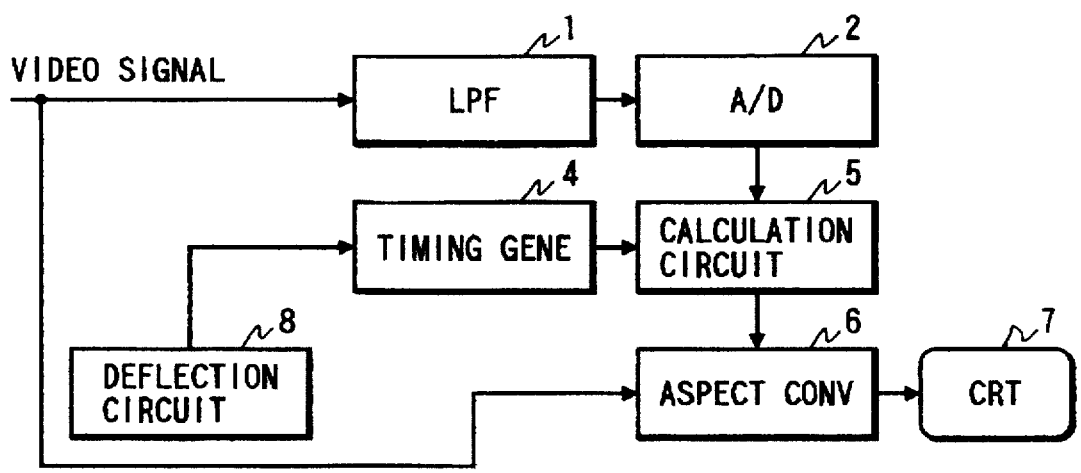
FIG. 18 is a block diagram of a television receiver according to a third embodiment of this invention.

FIG. 18 shows a third embodiment of this invention which is similar to the embodiment of FIG. 7 except that a deflection circuit 8 is used in place of the sync separation circuit 3 (see FIG. 7). The deflection circuit 8 feeds a horizontal sync signal and a vertical sync signal to a timing signal generator 4.

Fourth Embodiment

Figure 19:
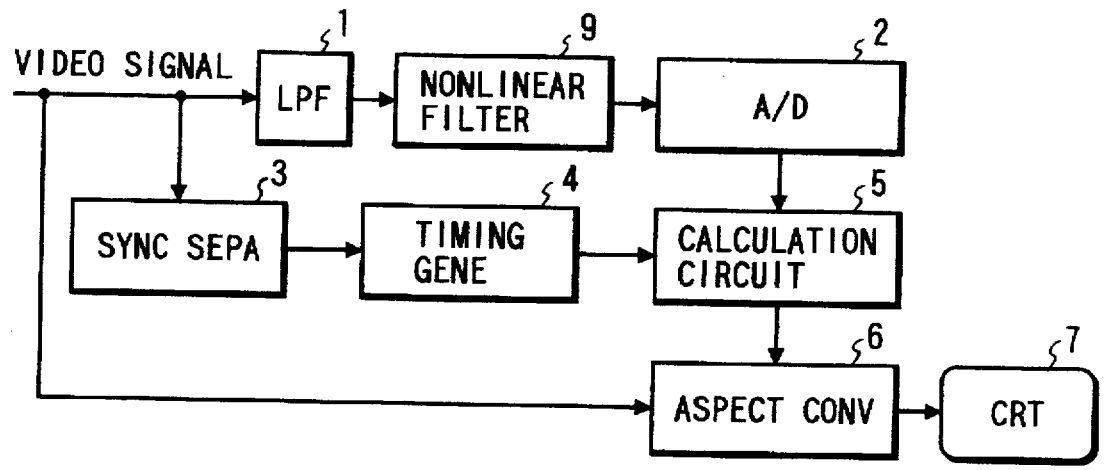
FIG. 19 is a block diagram of a television receiver according to a fourth embodiment of this invention.

FIG. 19 shows a fourth embodiment of this invention which is similar to the embodiment of FIG. 7 except that a nonlinear filter 9 is connected between a low pass filter 1 and an A/D converter 2. In the embodiment of FIG. 19, the output signal of the low pass filter 1 is processed by the nonlinear filter 9, and the output signal of the nonlinear filter 9 is fed to the A/D converter 2.

Since mask regions are colored black, accurate detection of positions of the mask regions can be enabled in response to components of an incoming video signal which corresponds to dark-picture portions (low-luminance picture portions). The nonlinear filter 9 is designed to select such dark-picture components of the output signal of the low pass filter 1.

Figure 20:
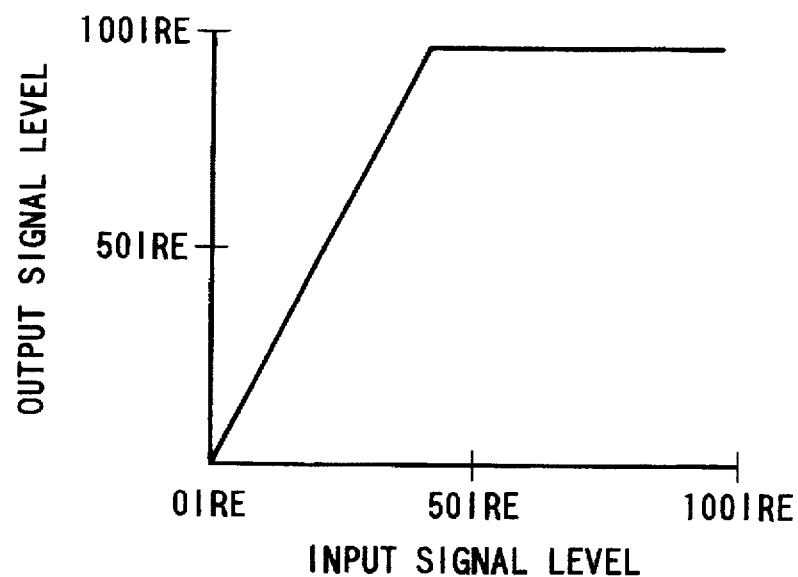
FIG. 20 is a diagram of a first example of the characteristics of a nonlinear filter in FIG. 19.

FIG. 20 shows a first example of the characteristics of the nonlinear filter 9. According to the example in FIG. 20, the level of the output signal of the nonlinear filter 9 linearly increases to a predetermined limiting level as the level of the input signal thereto (the output signal of the low pass filter 1) increases from 0 IRE to a predetermined reference level between 20 IRE and 50 IRE. In addition, the level of the output signal of the nonlinear filter 9 remains at the predetermined limiting level as the level of the input signal thereto (the output signal of the low pass filter 1) increases from the predetermined reference level.

Figure 21:
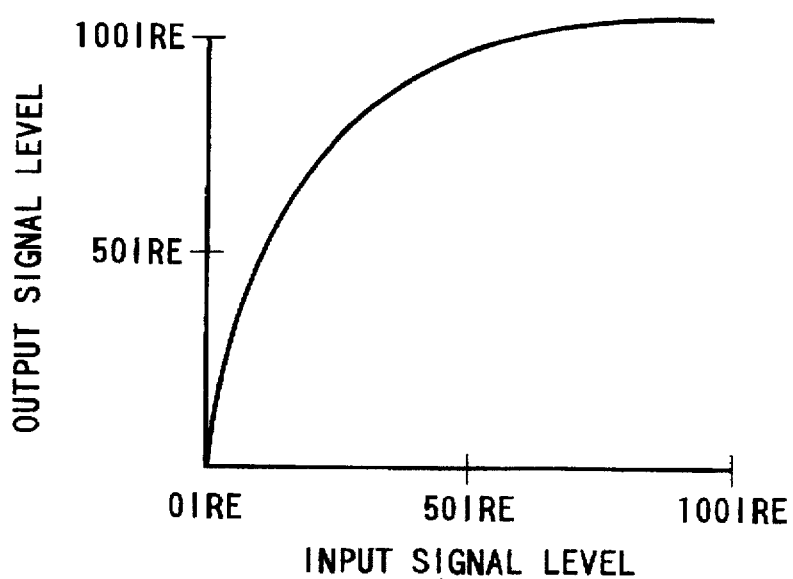
FIG. 21 is a diagram of a second example of the characteristics of the nonlinear filter in FIG. 19.

FIG. 21 shows a second example of the characteristics of the nonlinear filter 9. According to the example in FIG. 21, the level of the output signal of the nonlinear filter 9 increases toward a predetermined limiting level along a curved line as the level of the input signal thereto (the output signal of the low pass filter 1) increases.

Figure 22:
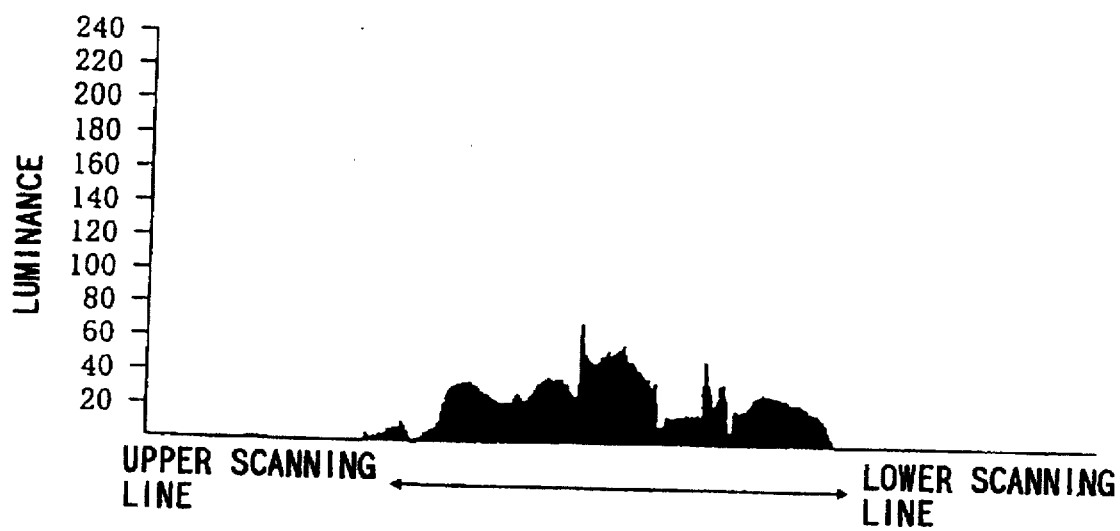
FIG. 22 is a diagram of a distribution of luminances represented by an output signal of a low pass filter which corresponds to one vertical picture line region in the fourth embodiment.
Figure 23:
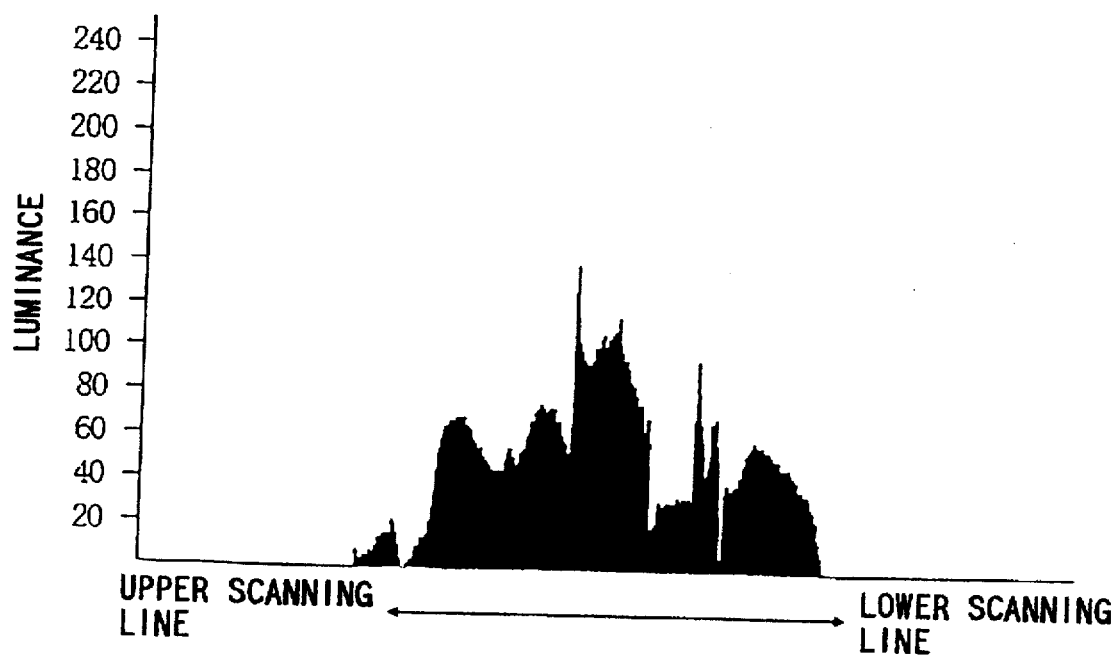
FIG. 23 is a diagram of a distribution of luminances represented by an output signal of the nonlinear filter in connection with the output signal of the low pass filter in FIG. 22.

FIG. 22 shows an example of a distribution of the luminances represented by the output signal of the low pass filter 1 which correspond to one vertical picture line region. FIG. 23 shows a distribution of the luminances represented by the output signal of the nonlinear filter 9 in connection with the output signal of the low pass filter 1 in FIG. 22. As understood from FIGS. 22 and 23, the nonlinear filter 9 emphasizes signal segments corresponding to dark-picture portions in luminance, and thus enables more accurate detection of mask regions.

It should be noted that the nonlinear filter 9 may be replaced by a nonlinear digital filter interposed between the A/D converter 2 and a calculation circuit 5.

Fifth Embodiment

Figure 24:
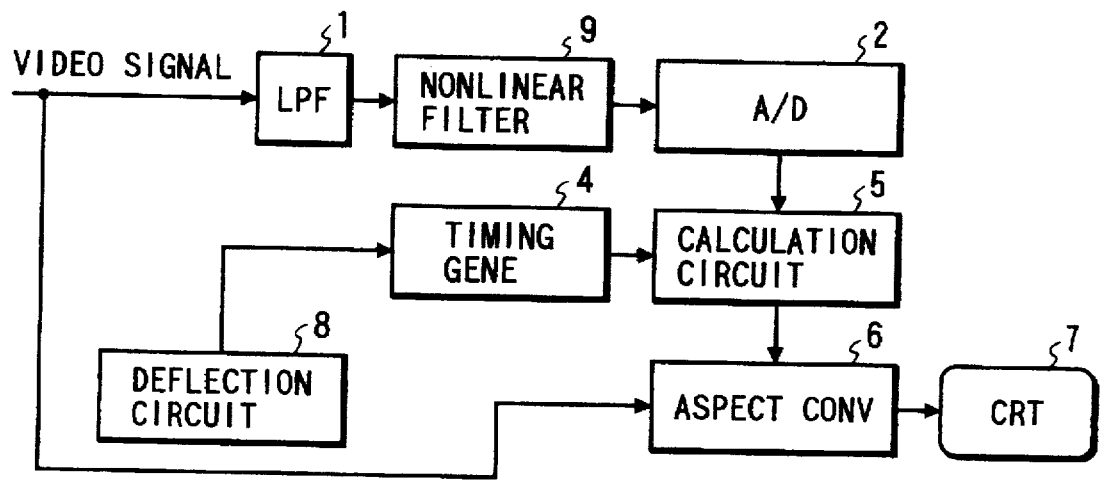
FIG. 24 is a block diagram of a television receiver according to a fifth embodiment of this invention.

FIG. 24 shows a fifth embodiment of this invention which is similar to the embodiment of FIG. 19 except that a deflection circuit 8 is used in place of a sync separation circuit 3 (see FIG. 19). The deflection circuit 8 feeds a horizontal sync signal and a vertical sync signal to a timing signal generator 4.

Sixth Embodiment

A sixth embodiment of this invention is similar to one of the embodiments of FIGS. 7, 18, 19, and 24 except for design changes indicated later.

Figure 25:
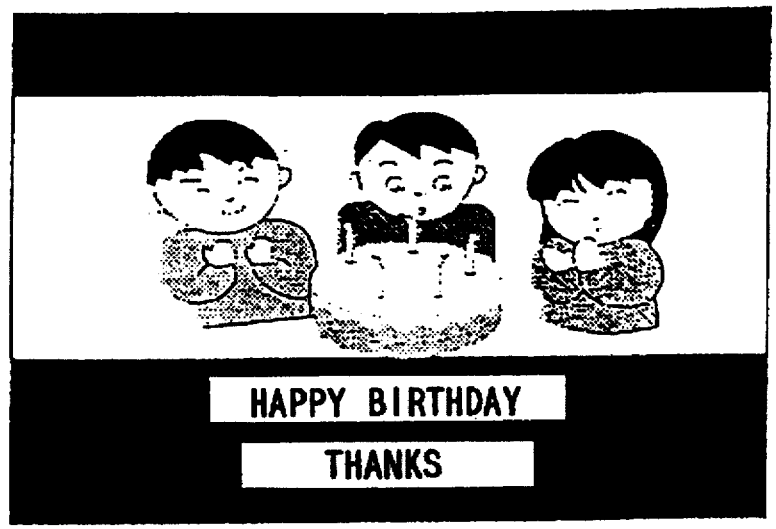
FIG. 25 is an illustration of a picture having a central effective region, an upper noneffective mask region, and a lower mask region with a caption.
Figure 26:
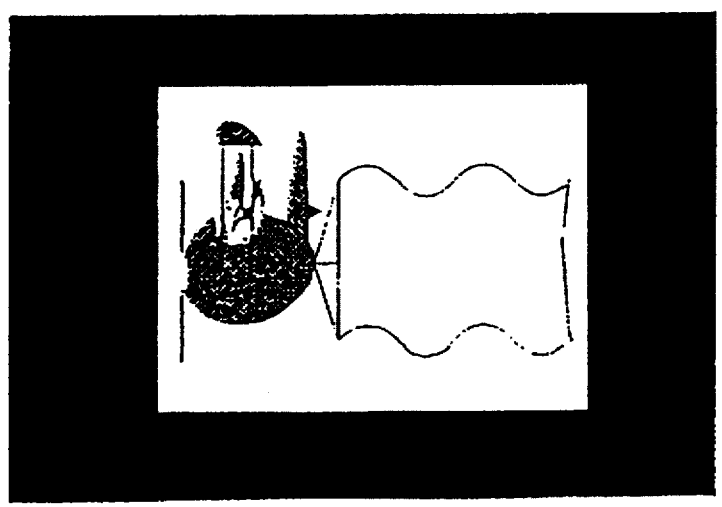
FIG. 26 is an illustration of a normal-aspect picture generated by a special effect for providing a black margin on all sides.

FIG. 25 shows an example of a picture having a central effective region, an upper noneffective mask region, and a lower mask region with a caption. FIG. 26 shows an example of a normal-aspect picture generated by a special effect for providing a black margin on all sides. The normal-aspect picture in FIG. 26 has a central effective region and an edge black region surrounding the central effective region.

The sixth embodiment is designed to prevent wrong detection of the boundary between a central effective region and a lower noneffective region in a picture such as shown in FIG. 25. The sixth embodiment is also designed to prevent a normal-aspect special-effect picture such as shown in FIG. 26 from being decided to be a wide-aspect picture.

In the sixth embodiment, a calculation circuit 5 (see FIGS. 7, 18, 19, and 24) introduces a weighting process into the addition of numerals to form an address projection. Generally, in a picture such as shown in FIG. 25, a caption is excluded from right-hand and left-hand edges of the picture. Thus, information corresponding to the right-hand and left-hand edges of the picture more accurately indicates the boundary between a central effective region and a lower mask region than information corresponding to other regions of the picture does. In a normal-aspect special-effect picture such as shown in FIG. 26, a black region extends in right-hand and left-hand edges of the picture. Thus, information corresponding to the right-hand and left-hand edges of the picture more accurately indicates whether or not the picture agrees with a wide-aspect picture than information corresponding to other regions of the picture does. In consideration of these facts, the weighting process provides greater weights to upper video start addresses and lower video end addresses regarding right-hand and left-hand edges of a picture, and provides smaller weights to upper video start addresses and lower video end addresses regarding a picture region between the right-hand and left-hand edges.

Specifically, regarding vertical picture line regions having horizontal position "1" and "8" (see FIG. 10), a value or numeral (a weighting coefficient) of "4" is given to each of upper video start addresses and lower video end addresses while a value or numeral of "0" is given to each of other addresses. Regarding vertical picture line regions having horizontal position "2" and "7" (see FIG. 10), a value or numeral (a weighting coefficient) of "3" is given to each of upper video start addresses and lower video end addresses while a value or numeral of "0" is given to each of other addresses. Regarding vertical picture line regions having horizontal position "3" and "6" (see FIG. 10), a value or numeral (a weighting coefficient) of "2" is given to each of upper video start addresses and lower video end addresses while a value or numeral of "0" is given to each of other addresses. Regarding vertical picture line regions having horizontal position "4" and "5" (see FIG. 10), a value or numeral (a weighting coefficient) of "1" is given to each of upper video start addresses and lower video end addresses while a value or numeral of "0" is given to each of other addresses. It should be noted that the weighting coefficients may be changed in accordance with the total number of vertical picture line regions and the accuracy of an A/D converter 2 (see FIGS. 7, 18, 19, and 24). The numerals are added in each address position, forming an address projection such as in the right-hand edges of FIGS. 27, 28, and 29.

FIG. 27 shows an example of the address projection which occurs in the case of an incoming video signal representing a picture having upper and lower noneffective mask regions without any caption. FIG. 28 shows an example of the address projection which occurs in the case of an incoming video signal representing a picture having an upper noneffective mask region and a lower mask region with a caption. FIG. 29 shows an example of the address projection which occurs in the case of an incoming video signal representing a normal-aspect special-effect picture such as shown in FIG. 26.

Addresses at which peak values occur in the address projection are defined as a final upper video start address and a final lower video end address. In the case where the peak values corresponding to the final upper video start address and the final lower video end address are equal to or greater than a predetermined reference value, the final upper video start address and the final lower video end address are accepted and used. It is preferable that the predetermined reference value depends on the total number of vertical picture line regions and the accuracy of the A/D converter 2. On the other hand, in the case where the peak values corresponding to the final upper video start address and the final lower video end address are smaller than the predetermined reference value, the final upper video start address and the final lower video end address are rejected and discarded. In this case, the calculation circuit 5 samples and accepts segments of the output video signal of the A/D converter 2 again, and generates a second address projection from the sampled signal segments. Then, the calculation circuit 5 decides a final upper video start address and a final lower video end address by referring to the second address projection.

Seventh Embodiment

A Seventh embodiment of this invention is similar to one of the embodiments of FIGS. 7, 18, 19, and 24 except for design changes indicated later.

Figure 30:
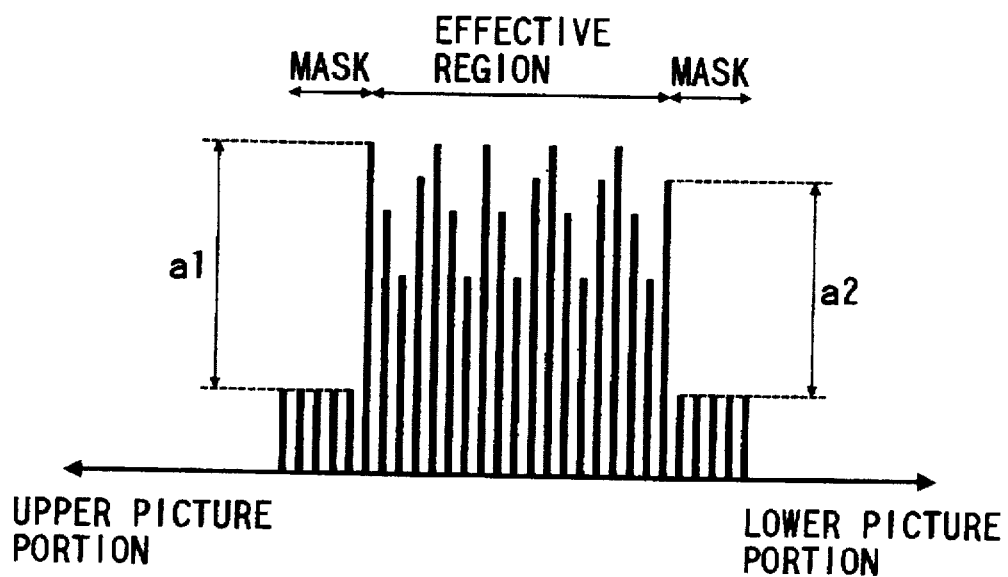
FIG. 30 corresponds to FIG. 15, and shows an example of the result of the square in connection with differentiation-resultant data which occurs in the case of an incoming video signal representing a relatively bright picture in a seventh embodiment of this invention.
Figure 31:
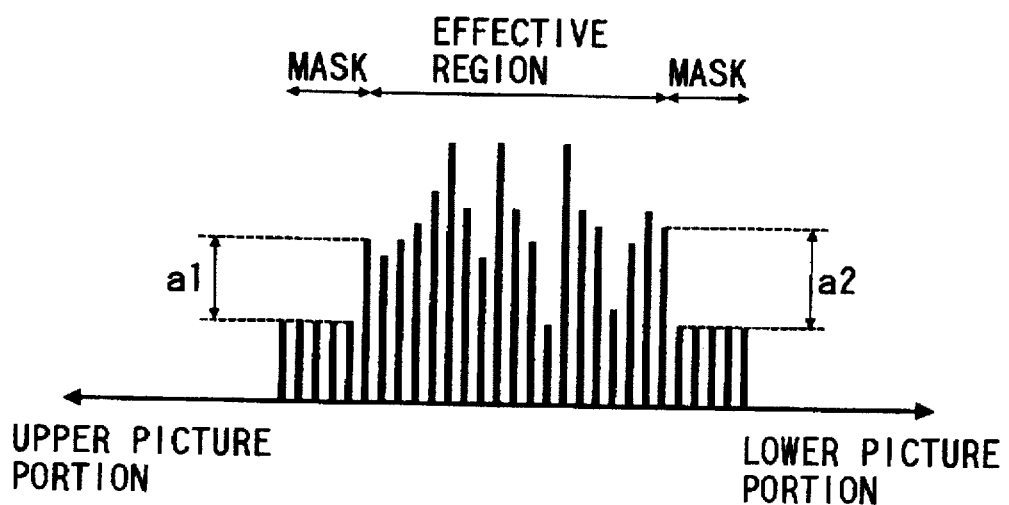
FIG. 31 corresponds to FIG. 15, and shows an example of the result of the square in connection with differentiation-resultant data which occurs in the case of an incoming video signal representing a relatively dark picture in the seventh embodiment.

FIG. 30 corresponds to FIG. 15, and shows an example of the result of the square in connection with the differentiation-resultant data which occurs in the case of an incoming video signal representing a relatively bright picture. As shown in FIG. 30, great value differences a1 and a2 are present at the boundaries between a central effective region and upper and lower noneffective mask regions in a relatively bright picture. FIG. 31 corresponds to FIG. 15, and shows an example of the result of the square in connection with the differentiation-resultant data which occurs in the case of an incoming video signal representing a relatively dark picture. As shown in FIG. 31, small value differences a1 and a2 are present at the boundaries between a central effective region and upper and lower noneffective mask regions in a relatively dark picture.

The seventh embodiment is designed to accurately detect the boundaries between a central effective region and upper and lower noneffective mask regions even in a relatively dark picture.

In the seventh embodiment, a calculation circuit 5 (see FIGS. 7, 18, 19, and 24) sums up or integrates the values (the levels) of luminances represented by extracted signal segments which correspond to all vertical picture line regions. In other words, the calculation circuit 5 derives information related to an average brightness of a picture represented by an incoming video signal. The calculation circuit 5 may sum up or integrate the values (the levels) of the square in connection with the differentiation-resultant data. As previously described in connection with the embodiment of FIG. 7, the calculation circuit 5 uses a reference value (a reference level) in detecting the positions of an upper line (an upper horizontal scanning line) and a lower line (a lower horizontal scanning line) at which a central effective region starts and ends respectively. The calculation circuit 5 varies the reference value (the reference level) as a function of the sum of the values of the luminances so that accurate detection of the boundaries can be attained even in the case of a relatively dark picture.

Eighth Embodiment

Figure 32:
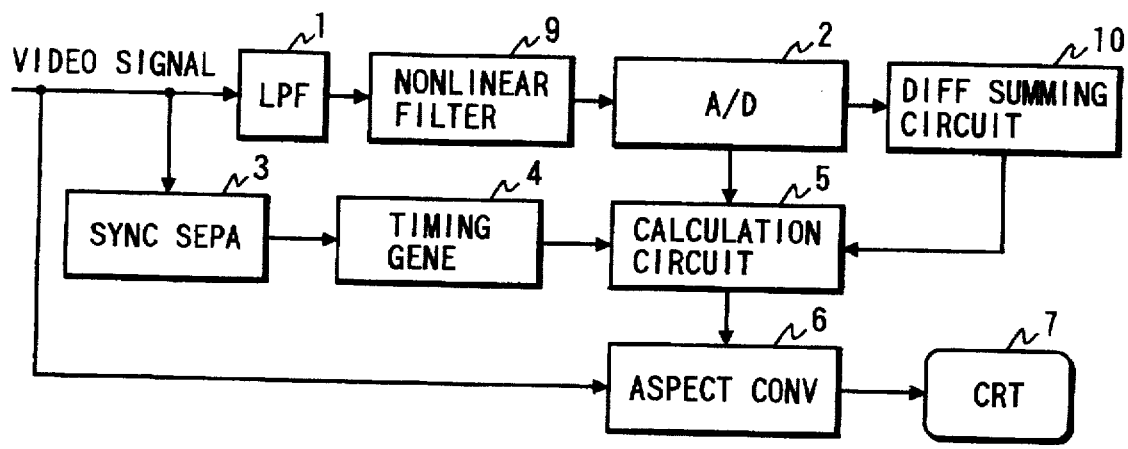
FIG. 32 is a block diagram of a television receiver according to an eighth embodiment of this invention.

FIG. 32 shows an eighth embodiment of this invention which is similar to the embodiment of FIG. 19 except for design changes indicated later. The embodiment of FIG. 32 includes a differentiation summing circuit 10 connected to both an A/D converter 2 and a calculation circuit 5.

The differentiation summing circuit 10 receives the output video signal from the A/D converter 2. First, the differentiation summing circuit 10 periodically samples the output video signal of the A/D converter 2, and executes differentiation of the values represented by the samples of the video signal for each line (each horizontal scanning line). Second, the differentiation summing circuit 10 squares the result of the differentiation, or calculates the absolute values of the result of the differentiation. Third, the differentiation summing circuit 10 calculates the sum of the values of the square or the sum of the absolute values for each line (each horizontal scanning line). Finally, the differentiation summing circuit 10 outputs a signal (data) representative of the calculated sum to the calculation circuit 5.

The calculation circuit 5 samples and accepts the output video signal of the A/D converter 2 and the output signal of the differentiation summing circuit 10 at a timing determined by a timing signal fed from a timing signal generator 4. The calculation circuit 5 decides whether or not a picture represented by an incoming video signal has upper and lower noneffective mask regions by referring to the sampled signals.

In the case where the calculation circuit 5 uses a microcomputer, the differentiation summing circuit 10 may be incorporated into the calculation circuit 5.

Figure 33:
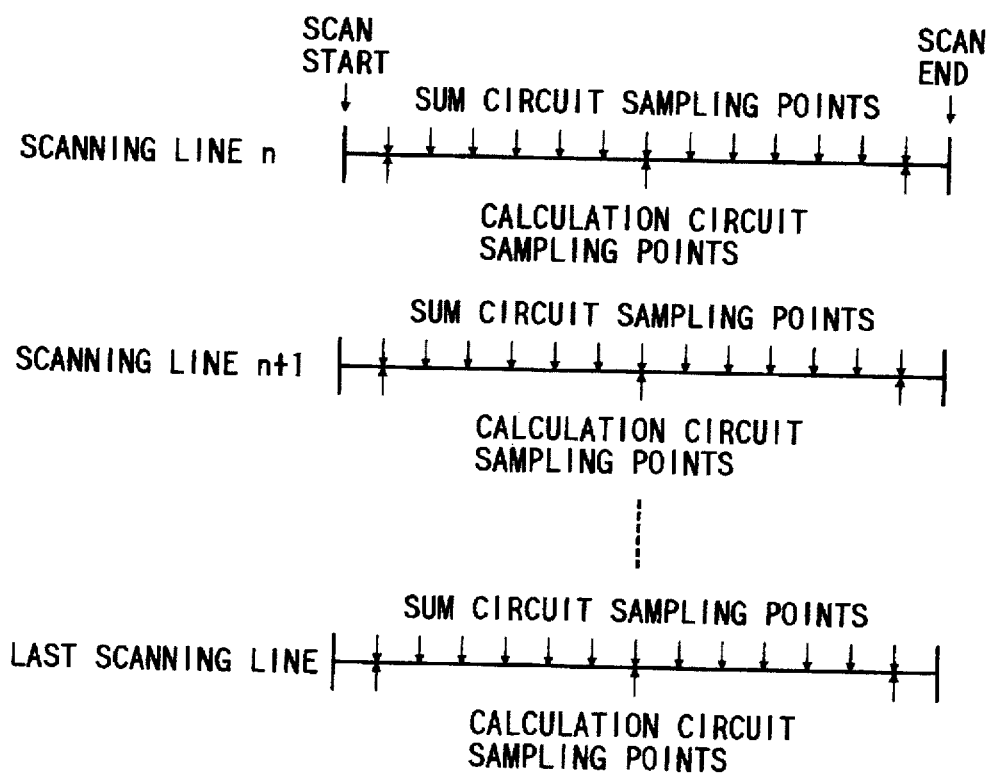
FIG. 33 is a diagram of horizontal lines (scanning lines), and sampling points in the eighth embodiment.

The calculation circuit 5 samples and accepts the output video signal of the A/D converter 2 at a timing determined by the taming signal fed from the timing signal generator 4. As shown in FIG. 33, the signal samples provided by the calculation circuit 5 agree with some of the signal samples provided by the differentiation summing circuit 10 in every horizontal line. The calculation circuit 5 decides whether or not the sum represented by the output signal of the differentiation summing circuit 10 is effective by referring to the samples of the output video signal of the A/D converter 2 for each horizontal line.

In the case where an incoming video signal level differs from a black level although the sum represented by the output signal of the differentiation summing circuit 10 corresponds to "0", the related horizontal line is not in a mask region. The calculation circuit 5 detects the incoming video signal level (or the level represented by the output signal of the A/D converter 2) at several different points in every horizontal line. When the detected incoming signal level agrees with the black level, the calculation circuit 5 accepts and uses the related output signal of the differentiation summing circuit 10. When the detected incoming signal level differs from the black level although the sum represented by the output signal of the differentiation summing circuit 10 corresponds to "0", the calculation circuit 5 rejects the related output signal of the differentiation summing circuit 10 and replaces it with a signal representing a maximum value.

Figure 34:
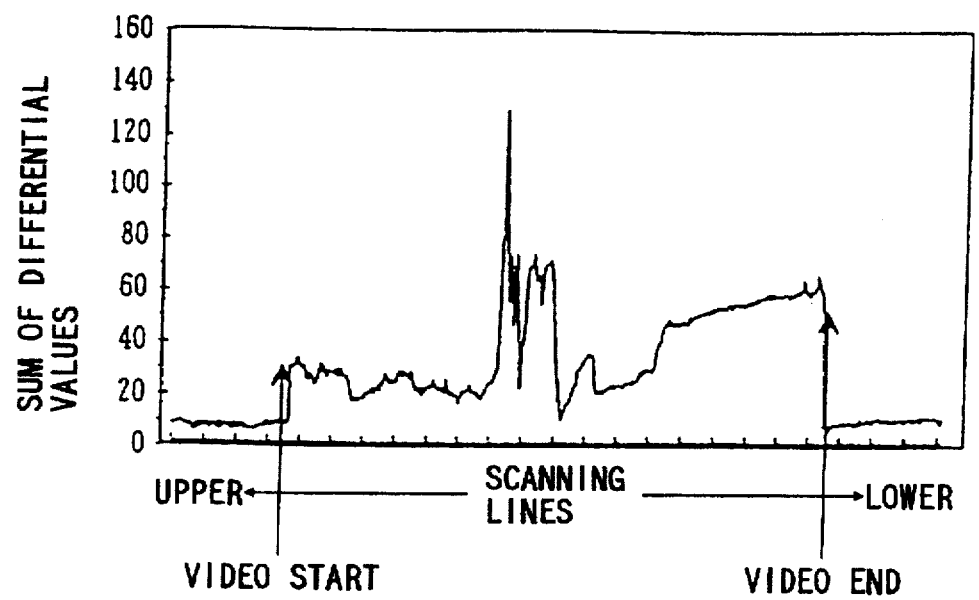
FIG. 34 is a diagram of a distribution of values represented by the output signal of a differentiation summing circuit which occurs in the case of an incoming video signal representing a picture having a central effective region and upper and lower noneffective mask regions without any caption in the eighth embodiment.
Figure 35:
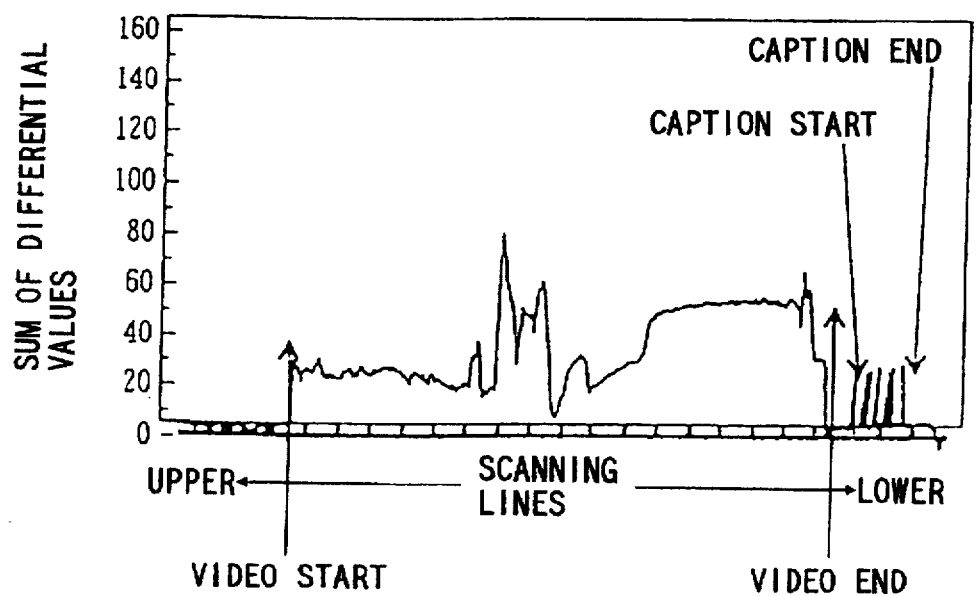
FIG. 35 is a diagram of a distribution of values represented by the output signal of the differentiation summing circuit which occurs in the case of an incoming video signal representing a picture having a central effective region, an upper noneffective mask region, and a lower mask region with a caption in the eighth embodiment.

These processes provide a distribution of the values represented by the output signal of the differentiation summing circuit 10 and the maximum-value signal regarding horizontal lines composing a field or a frame. FIG. 34 shows an example of the distribution which occurs in the case of an incoming video signal representing a picture having a central effective region and upper and lower noneffective mask regions without any caption. In the distribution of FIG. 34, there are steps of a given magnitude or more at the boundaries between the central effective region and the upper and lower noneffective mask regions of the picture. In this case, the calculation circuit 5 detects an upper video start line position (the position of an upper line at which the central effective region starts) and a lower video end line position (the position of a lower line at which the central effective region ends) by finding the steps in the distribution. FIG. 35 shows an example of the distribution which occurs in the case of an incoming video signal representing a picture having a central effective region, an upper noneffective mask region, and a lower mask region with a caption. In the distribution of FIG. 35, there are also steps at the boundaries between the caption and the background in the lower mask region. In this case, the calculation circuit 5 detects a caption start line position (the position of a line at which the caption starts) and a caption end line position (the position of a line at which the caption ends) in addition to the upper video start line position and the lower video end line position by finding the steps in the distribution.

The calculation circuit 5 differentiates the distribution of the values along a vertical direction (a direction perpendicular to horizontal lines) to calculate differences in value between lines or variations in value along the vertical direction. The calculation circuit 5 squares the result of the differentiation or calculates the absolute values of the result of the differentiation. The calculation circuit 5 compares the square-resultant values or the resultant absolute values with a predetermined reference value, detecting the positions of the previously-indicated boundaries (that is, the upper video start line position and the lower video end line position).

As in the seventh embodiment, the calculation circuit 5 may derive information related to an average brightness of a picture represented by an incoming video signal. In this case, the calculation circuit 5 varies the reference value (the reference level) as a function of the average brightness so that accurate detection of the boundaries can be attained even in the case of a relatively dark picture.

Ninth Embodiment

Figure 36:
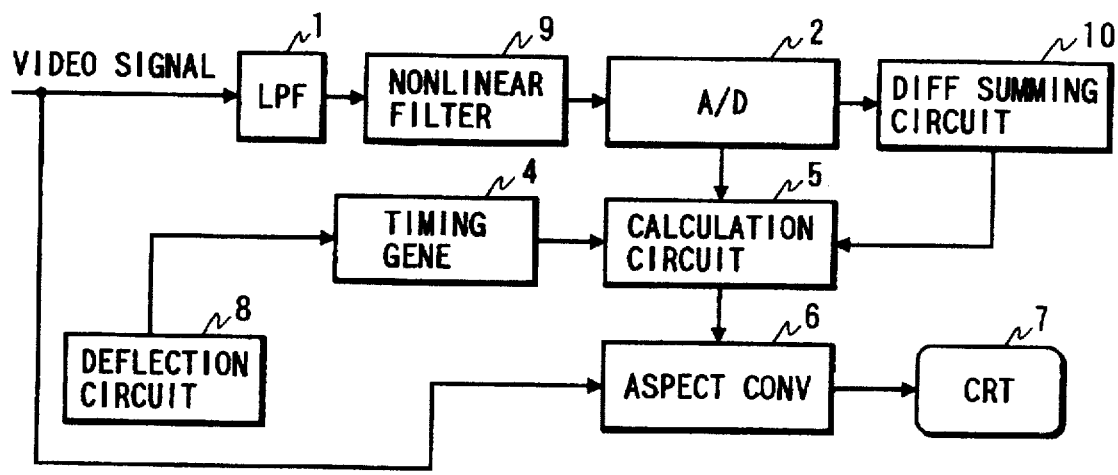
FIG. 36 is a block diagram of a television receiver according to a ninth embodiment of this invention.

FIG. 36 shows a ninth embodiment of this invention which is similar to the embodiment of FIG. 32 except that a deflection circuit 8 is used in place of a sync separation circuit 3 (see FIG. 32). The deflection circuit 8 feeds a horizontal sync signal and a vertical sync signal to a timing signal generator 4.

Tenth Embodiment

A tenth embodiment of this invention is similar to one of the embodiments of FIGS. 7, 18, 19, and 24 except for design changes indicated later.

In the tenth embodiment, a calculation circuit 5 (see FIGS. 7, 18, 19, and 24) extracts segments of the output video signal of the A/D converter 2 at timings determined by the output signal of a timing signal generator 4 (see FIGS. 7, 18, 19, and 24). During one field-period or a plurality of successive field-periods, the signal segments (data) extracted by the calculation circuit 5 correspond to vertical picture line regions having horizontal positions "1", "2", "3", "4", "5", "6", "7", "8", "9", "10", "11", "12", "13", "14", and "15" as shown in FIG. 37.

Figure 37:
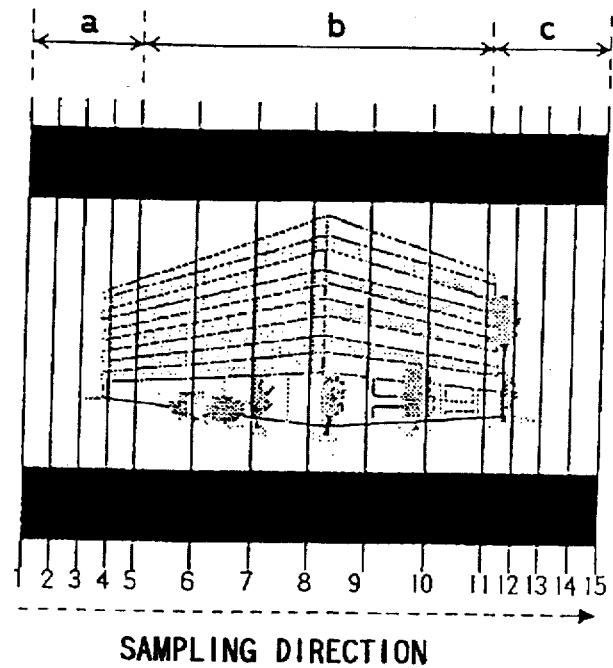
FIG. 37 is a diagram of a picture represented by an incoming video signal, and vertical line regions of the picture which correspond to extracted segments of the incoming video signal in a tenth embodiment of this invention.

Specifically, as shown in FIG. 37, a frame is divided along two vertical lines into a left-hand edge block "a", a central block "b", and a right-hand edge block "c". The vertical picture line region having the horizontal position "1" corresponds to the left-hand edge of the frame. The vertical picture line region having the horizontal position "5" corresponds to the boundary between the left-hand edge block "a" and the central block "b". The vertical picture line regions having the horizontal positions "2", "3", and "4" extend in the left-hand edge block "a". The vertical picture line regions having the horizontal positions "1", "2", "3", "4", and "5" are spaced at equal intervals. The vertical picture line region having the horizontal position "11" corresponds to the boundary between the central block "b" and the right-hand edge block "c". The vertical picture line regions having the horizontal positions "6", "7", "8", "9", and "10" extend in the central block "b". The vertical picture line regions having the horizontal positions "5", "6", "7", "8", "9", "10", and "11" are spaced at equal intervals greater than the intervals between the vertical picture line regions having the horizontal positions "1", "2", "3", "4", and "5". The vertical picture line region having the horizontal position "15" corresponds to the right-hand edge of the frame. The vertical picture line regions having the horizontal positions "12", "13", and "14" extend in the right-hand edge block "c". The vertical picture line regions having the horizontal positions "11", "12", "13", "14", and "15" are spaced at equal intervals which agree with the intervals between the vertical picture line regions having the horizontal positions "1", "2", "3", "4", and "5". Accordingly, the spacing between the vertical picture line regions in the left-hand and right-hand edge blocks "a" and "c" is narrower than the spacing between the vertical picture line regions in the central block "b".

Generally, a caption occupies only a central part of a lower mask region and does not extend into right-hand and left-hand edge parts thereof. The narrow spacing between the vertical picture line regions in the left-hand and right-hand edge blocks "a" and "c" enables accurate detection of an upper video start line position and a lower video end line position even in the case of an incoming video signal representing a picture having a central effective region, an upper mask region, and a lower mask region with a caption. In addition, the narrow spacing between the vertical picture line regions in the left-hand and right-hand edge blocks "a" and "c" enables detection of an edge black region in a normal-aspect special-effect picture such as shown in FIG. 26.

The calculation circuit 5 determines an upper video start address and a lower video end address for each of the vertical picture line regions as in the embodiment of FIG. 7. In the case of a picture having a lower mask region with a caption, the calculation circuit 5 also detects a caption start address and a caption end address. A value or numeral of "1" is given to each of the upper video start addresses and the lower video end addresses while a value or numeral of "0" is given to each of other addresses as in the embodiment of FIG. 7. The numerals are added in each address position, forming an address projection for each of the left-hand edge block "a", the central block "b", and the right-hand edge block "c". Regarding the block-by-block addition process, the vertical picture line regions having the horizontal positions "1", "2", "3", "4", and "5" are assigned to the left-hand edge block "a". In addition, the vertical picture line regions having the horizontal positions "6", "7", "8", "9", and "10" are assigned to the central block "b" while the vertical picture line regions having the horizontal positions "11", "12", "13", "14", and "15" are assigned to the right-hand edge block "c".

Figure 38:
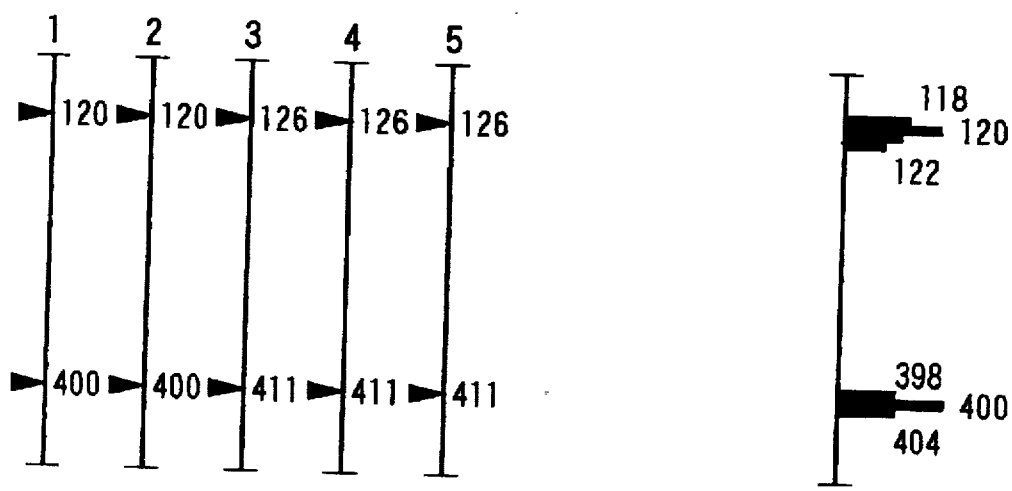
FIG. 38 is a diagram of upper video start addresses, lower video end addresses, and an address projection which occur in the tenth embodiment.

In respect of the left-hand edge block "a", the numerals corresponding to the five upper video start addresses and the five lower video end addresses are added in each address position, forming an address projection such as shown in the right-hand edge of FIG. 38. Data representing the address projection exhibits a normal distribution, a random distribution, or a good distribution in which all upper video start addresses are equal to each other and all lower video end addresses are equal to each other. The random distribution tends to occur in the case of a picture which does not have mask regions. Addresses at which peak values occur in the address projection are defined as a final upper video start address and a final lower video end address. In the case where the final upper video start address and the final lower video end address are composed of more than half members, the final upper video start address and the final lower video end address are accepted and used. On the other hand, in the case where the final upper video start address and the final lower video end address are not composed of more than half members, the final upper video start address and the final lower video end address are rejected and discarded. In this case, the calculation circuit 5 samples and accepts segments of the output video signal of the A/D converter 2 again, and generates a second address projection from the sampled signal segments. Then, the calculation circuit 5 decides a final upper video start address and a final lower video end address by referring to the second address projection.

Figure 39:
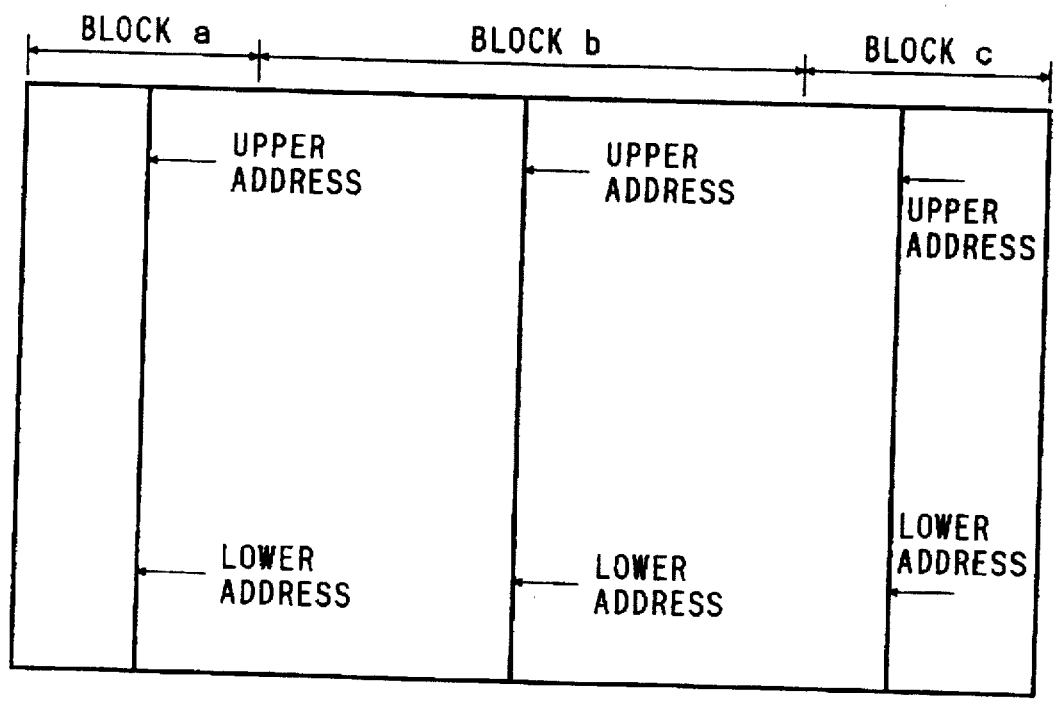
FIG. 39 is a diagram of blocks composing one picture frame, final upper video start addresses, and final lower video end addresses in the tenth embodiment.

Similarly, the calculation circuit 5 decides a final upper video start address and a final lower video end address in respect of each of the central block "b" and the right-hand edge block "c". Accordingly, as shown in FIG. 39, a pair of a final upper video start address and a final lower video end address are determined in respect of each of the left-hand edge block "a", the central block "b", and the right-hand edge block "c". It should be noted that the calculation circuit 5 may introduce a weighting process into the addition of numerals to form an address projection as in the sixth embodiment.

When the final upper video start addresses related to the blocks "a", "b", and "c" are equal to each other and also the final lower video end addresses related to the blocks "a", "b", and "c" are equal to each other, the calculation circuit 5 detects that a picture represented by the incoming video signal has a central effective region and upper and lower noneffective mask regions without any caption. When the final upper video start addresses related to the blocks "a", "b", and "c" are equal to each other and also the final lower video end addresses related to the blocks "a" and "c" are equal to each other, the calculation circuit 5 detects that a picture represented by the incoming video signal has a central effective region, an upper mask region, and a lower mask region with a caption. When a final upper video start address and a final lower video end address can not be determined in the data processing related to the left-hand edge block "a", the calculation circuit 5 detects that a picture represented by the incoming video signal does not have upper and lower noneffective mask regions.

While a frame is divided along vertical lines into three blocks in this embodiment, it may be divided into at least three blocks in another manner.

In this embodiment, the signal sampling process regarding the left-hand edge block "a", the signal sampling process regarding the central block "b", and the signal sampling process regarding the right-hand edge block "c" are sequentially executed. It should be noted that the signal sampling process regarding the left-hand edge block "a", the signal sampling process regarding the right-hand edge block "c", and the signal sampling process regarding the central block "b" may be sequentially executed.

Eleventh Embodiment

An eleventh embodiment of this invention is similar to one of the embodiments of FIGS. 7, 18, 19, and 24 except for design changes indicated later.

Figure 40:
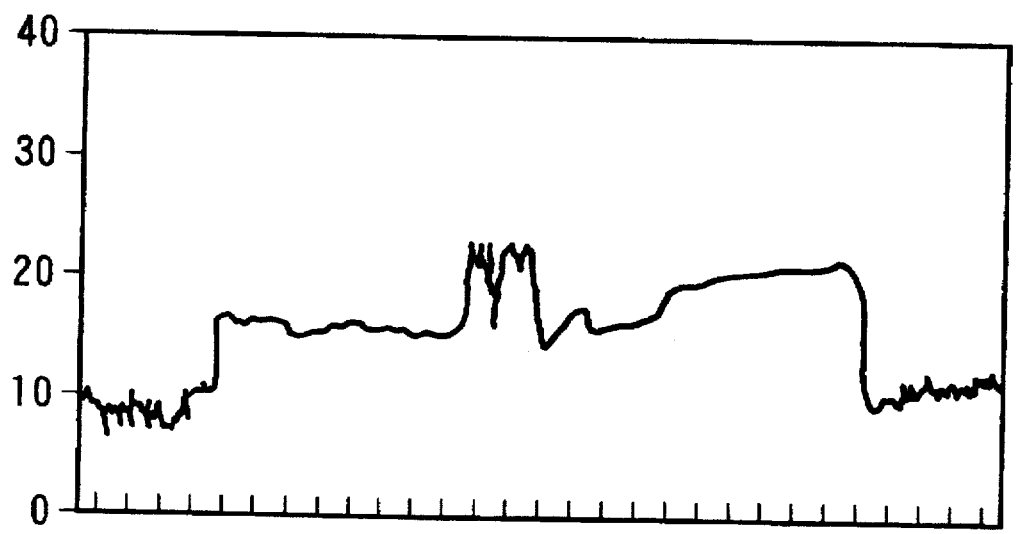
FIG. 40 corresponds to FIG. 11, and shows a first example of a distribution of luminance levels represented by signal segments extracted by a calculation circuit which relate to one vertical picture line region in an eleventh embodiment of this invention.

FIG. 40 corresponds to FIG. 11, and shows an example of a distribution of the luminance levels represented by signal segments (data) extracted by a calculation circuit 5 (see FIGS. 7, 18, 19, and 24) which relate to one vertical picture line region. The example in FIG. 40 occurs in the case of an incoming video signal representing a picture where luminance levels in upper and lower mask regions are remarkably lower than those in a central effective region. In other words, there are great differences in luminance level between the central effective region and the upper and lower mask regions.

Figure 41:
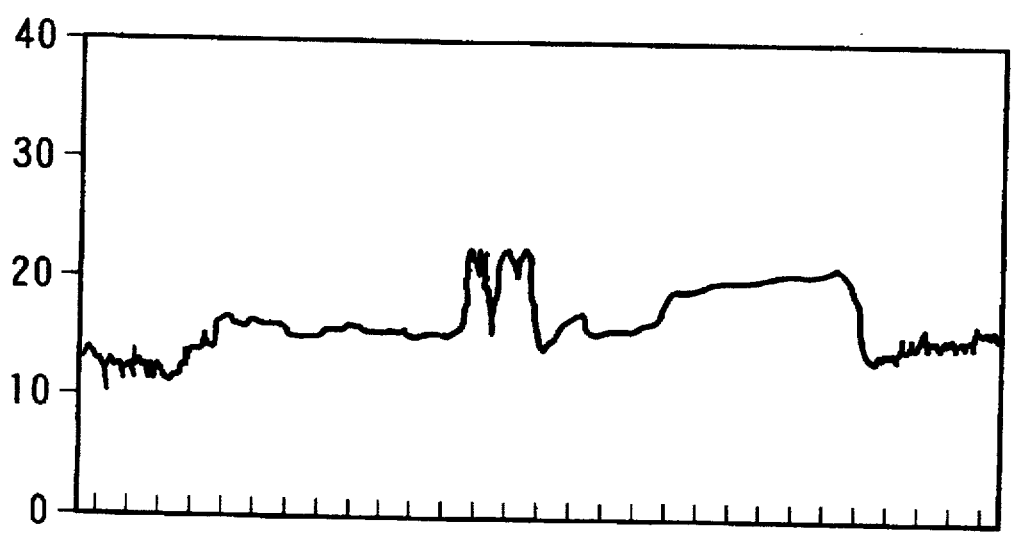
FIG. 41 corresponds to FIG. 11, and shows a second example of a distribution of luminance levels represented by signal segments extracted by the calculation circuit which relate to one vertical picture line region in the eleventh embodiment.

FIG. 41 corresponds to FIG. 11, and shows an example of a distribution of the luminance levels represented by signal segments (data) extracted by the calculation circuit 5 which relate to one vertical picture line region. The example in FIG. 41 occurs in the case of an incoming video signal representing a picture where luminance levels in upper and lower mask regions are slightly lower than those in a central effective region. In other words, there are small differences in luminance level between the central effective region and the upper and lower mask regions.

The eleventh embodiment is designed to accurately detect the presence and absence of upper and lower mask regions in and from a picture corresponding to the example in FIG. 41 as well as a picture corresponding to the example in FIG. 40.

The calculation circuit 5 samples and accepts segments of the output video signal of an A/D converter 2 (see FIGS. 7, 18, 19, and 24) which correspond to vertical picture line regions as described in connection with FIG. 10. It should be noted that the calculation circuit 5 may sample and accept segments of the output video signal of the A/D converter 2 which correspond to vertical picture line regions as described in connection with FIG. 37. The calculation circuit 5 statistically detects or determines a luminance level in upper and lower mask regions by referring to the sampled signal segments (the sampled data pieces).

Figure 42:
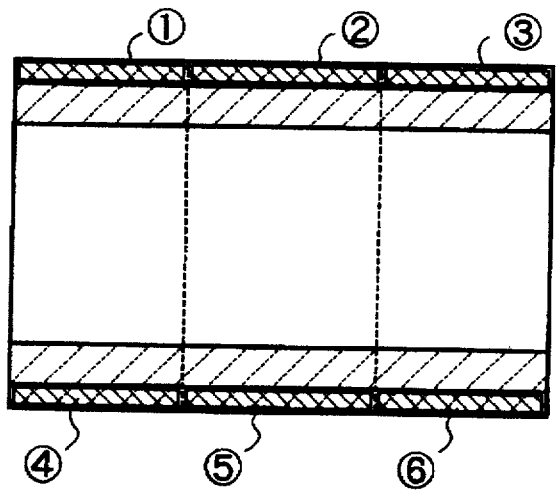
FIG. 42 is a diagram of divided regions of a picture frame.

As shown in FIG. 42, sub regions ①, ②, and ③ are defined in an upper frame region which corresponds in position to a top edge of an upper mask region. The sub regions ①, ②, and ③ are composed of about 10 successive horizontal lines starting from the uppermost horizontal line. In addition, sub regions ④, ⑤, and ⑥ are defined in a lower frame region which corresponds in position to a bottom edge of a lower mask region. The sub regions ④, ⑤, and ⑥ are composed of about 10 successive horizontal lines ending at the lowermost horizontal line. The sub regions ④, ⑤, and ⑥ are located in areas where a caption is hardly present. It should be noted that the total number of sub regions may differ from six. The calculation circuit 5 uses only ones among the sampled signal segments (the sampled data pieces) which correspond to the sub regions ①, ②, ③, ④, ⑤, and ⑥ in detecting a luminance level in upper and lower mask regions.

Figure 43:
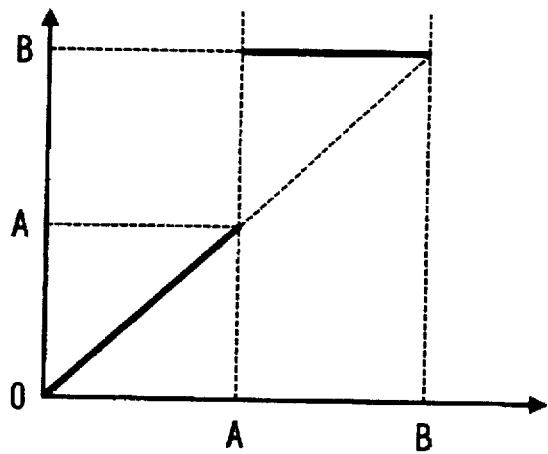
FIG. 43 is a diagram of a characteristic of nonlinear conversion in the eleventh embodiment.

A reference luminance level "A" is now defined as equal to the sum of the possible maximum value of a luminance level in upper and lower mask regions and a small value predetermined in consideration of affection by low-frequency noise. A maximum luminance level "B" is now defined as equal to the possible maximum value represented by one sampled data piece (one sampled signal segment). In the case where each sampled data piece has 8 bits, the maximum luminance level "B" is equal to "255". In the calculation circuit 5, each of the sampled data pieces corresponding to the sub regions ①, ②, ③, ④, ⑤, and ⑥ are subjected to nonlinear conversion having a characteristic shown in FIG. 43. Specifically, when the luminance level represented by a sampled data piece exceeds the reference level "A", the sampled data piece is converted into a data piece indicating the maximum luminance level "B". When the luminance level represented by a sampled data piece is equal to or smaller than the reference level "A", the sampled data piece is not converted.

The calculation circuit 5 counts up data pieces indicative of the maximum luminance level "B" in each of the sub regions ①, ②, ③, ④, ⑤, and ⑥. When the total number of data pieces indicative of the maximum luminance level "B" is equal to or greater than a prescribed number in each of the sub regions ①, ②, ③, ④, ⑤, and ⑥, the calculation circuit 5 detects that a picture represented by an incoming video signal does not have upper and lower mask regions. It should be noted that when the total number of data pieces indicative of the maximum luminance level "B" is equal to or greater than the prescribed number in only the sub region ①, the calculation circuit 5 may decide a picture to be without upper and lower mask regions.

When the total number of data pieces indicative of the maximum luminance level "B" is relatively small in each of the sub regions ①, ②, ③, ④, ⑤, and ⑥, the calculation circuit 5 detects that a picture represented by an incoming video signal has upper and lower mask regions. In this case, the calculation circuit 5 determines a mean value (an average value) between the levels represented by all the data pieces in each of the sub regions ①, ②, ③, ④, ⑤, and ⑥. When the determined mean values related to the respective sub regions ①, ②, ③, ④, ⑤, and ⑥ are approximately equal to each other within a prescribed dispersion, the calculation circuit 5 determines a synthetic mean value between the levels represented by all the data pieces in all the sub regions ①, ②, ③, ④, ⑤, and ⑥ and uses the determined synthetic mean value as an indication of a luminance level in the upper and lower mask regions. Otherwise, the calculation circuit 5 detects that a picture represented by an incoming video signal does not have upper and lower mask regions.

In this embodiment, as understood from the previous description, a decision regarding a dispersion is executed by comparing the determined mean values related to the respective sub regions ①, ②, ③, ④, ⑤, and ⑥. A decision regarding a dispersion may be executed by comparing statistical quantities such as high-order moments and factors related to a mean value between the squares of data values minus the square of a mean value between data values. In this case, when the statistical quantities are different from each other with more than a prescribed dispersion, the calculation circuit 5 detects that a picture represented by an incoming video signal does not have upper and lower mask regions.

Figure 44:
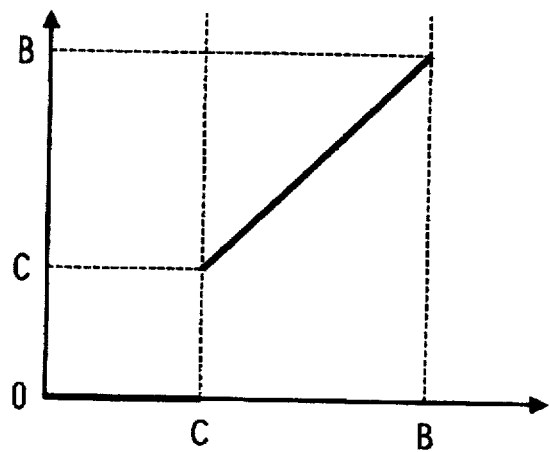
FIG. 44 is a diagram of a characteristic of nonlinear conversion in the eleventh embodiment.
Figure 45:
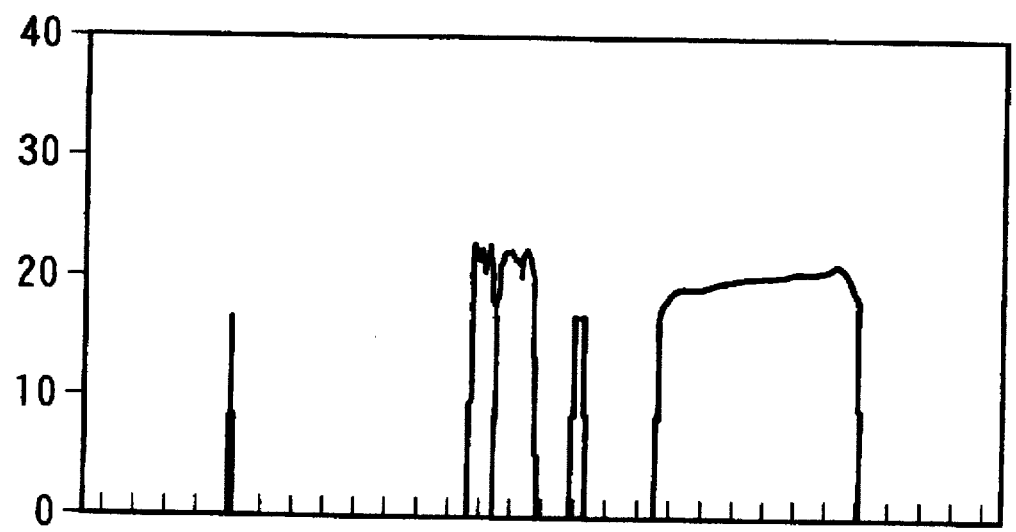
FIG. 45 is a diagram of a luminance level distribution provided by the nonlinear conversion in FIG. 44.

After the luminance level in the upper and lower mask regions is determined, the calculation circuit 5 subjects all the sampled data pieces in the vertical picture line regions to nonlinear conversion having a characteristic shown in FIG. 44. This nonlinear conversion is designed to increase the sensitivity or the accuracy of detection of the boundaries between the central effective region and the upper and lower mask regions in a picture corresponding to the example in FIG. 41. A reference luminance level "C" is now defined as equal to the sum of the luminance level in the upper and lower mask regions and a given value predetermined in consideration of affection by noise. According to the nonlinear conversion in FIG. 44, when the luminance level represented by a sampled data piece is smaller than the reference level "C", the sampled data piece is converted into a data piece indicating a luminance level of "0" or a minimum luminance level. When the luminance level represented by a sampled data piece exceeds the reference level "C", the sampled data piece is not converted. For example, in the case of the luminance level distribution of FIG. 41, the nonlinear conversion in FIG. 44 provides a luminance level distribution of FIG. 45. As shown in FIG. 45, the nonlinear conversion in FIG. 44 emphasizes the luminance level steps at the boundaries between the central effective region and the upper and lower mask regions.

The calculation circuit 5 detects an upper video start line position and a lower video end line position by referring to the data pieces which result from the nonlinear conversion in FIG. 44. The calculation circuit 5 includes a memory storing the data pieces which result from the nonlinear conversion in FIG. 44. Specifically, the data pieces are stored in segments of the memory to which successive addresses are sequentially assigned along a vertical direction. The calculation circuit 5 sequentially scans the data pieces in the memory along both a downward vertical direction (an up-to-down direction) and an upward vertical direction (a down-to-up direction), and searches for data pieces greater in level than immediately preceding data pieces by at least a predetermined reference value (a predetermined reference level). The calculation circuit 5 determines or detects addresses of the searched data pieces as indications of the positions of an upper line (an upper horizontal scanning line) and a lower line (a lower horizontal scanning line) at which a central effective region starts and ends respectively. In the case of eight vertical picture line regions as shown in FIG. 10, there are provided eight addresses regarding the position of an upper line at which a central effective region starts, and eight addresses regarding the position of a lower line at which a central effective region ends. When a caption is present in a lower mask region, there are also provided eight addresses regarding the position of an upper line at which a caption starts, and eight addresses regarding the position of a lower line at which a caption ends.

A value or numeral of "1" is given to each of the upper video start addresses and the lower video end addresses while a value or numeral of "0" is given to each of other addresses. The numerals are added in each address position, forming an address projection such as shown in the right-hand edge of FIG. 17.

Data representing the address projection exhibits a normal distribution, a random distribution, or a good distribution in which all upper video start addresses are equal to each other and all lower video end addresses are equal to each other. The random distribution tends to occur in the case of a picture which does not have mask regions. Addresses at which peak values occur in the address projection are defined as a final upper video start address and a final lower video end address. In the case where the final upper video start address and the final lower video end address are composed of more than half members, the final upper video start address and the final lower video end address are accepted and used. On the other hand, in the case where the final upper video start address and the final lower video end address are not composed of more than half members, the final upper video start address and the final lower video end address are rejected and discarded. In this case, the calculation circuit 5 samples and accepts segments of the output video signal of the A/D converter 2 again, and generates a second address projection from the sampled signal segments. Then, the calculation circuit 5 decides a final upper video start address and a final lower video end address by referring to the second address projection.

The calculation circuit 5 decides whether or not a picture represented by the incoming video signal has upper and lower noneffective mask regions by referring to information of the final upper video start address and the final lower video end address. When the calculation circuit 5 detects that a picture represented by the incoming video signal has a wide-aspect central effective region and upper and lower noneffective mask regions as shown in FIG. 8, the calculation circuit 5 commands an aspect converting circuit 6 (see FIGS. 7, 18, 19, and 24) to execute aspect conversion of the incoming video signal so that the central effective region of the picture represented by the incoming video signal will fully occupy the screen of a CRT 7 (see FIGS. 7, 18, 19, and 24).

Twelfth Embodiment

A twelfth embodiment of this invention is similar to the eleventh embodiment except for design changes indicated later.

In the twelfth embodiment, a calculation circuit 5 (see FIGS. 7, 18, 19, and 24) differentiates, along a vertical direction, a distribution of the luminances represented by data pieces which result from the nonlinear conversion in FIG. 44. In other words, the calculation circuit 5 determines a variation, along a vertical direction, in the luminances represented by the data pieces which result from the non-linear conversion in FIG. 44. The differentiation is introduced in consideration of the fact that a mask region has no luminance variation.

Figure 46:
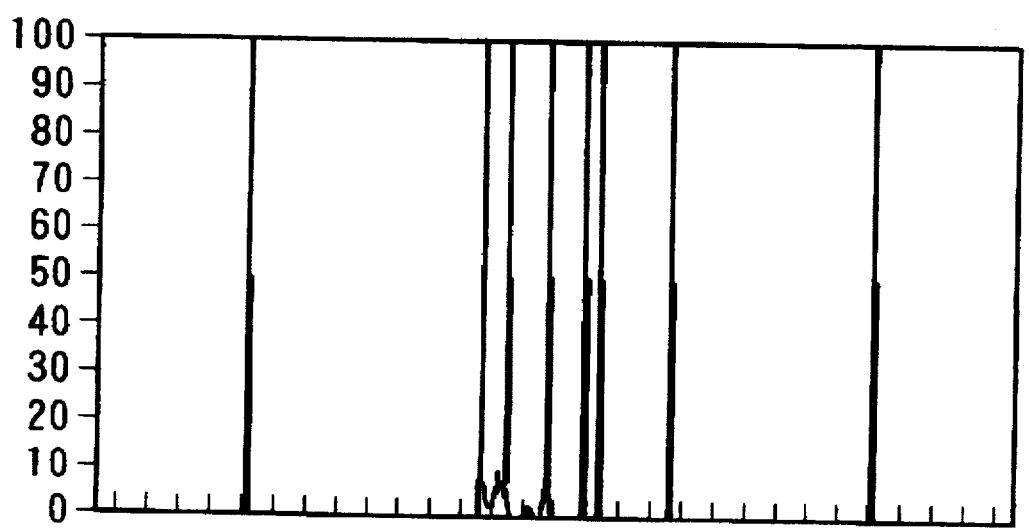
FIG. 46 is a diagram of an example of the result of the square in connection with the luminance level distribution of FIG. 45 according to a twelfth embodiment of this invention.

To enable more accurate detection of the positions of boundaries between a central effective region and upper and lower mask regions, the calculation circuit 5 squares the result of the differentiation of the luminance distribution. FIG. 46 shows an example of the result of the square in connection with the luminance distribution of FIG. 45. The calculation circuit 5 compares the square-resultant values with a predetermined reference value, detecting the positions of the previously-indicated boundaries.

The squaring process executed by the calculation circuit 5 may be replaced by a process of calculating absolute values of the result of the differentiation of the luminance distribution. In this case, the calculation circuit 5 compares the resultant absolute values with a predetermined reference value, detecting the positions of the previously-indicated boundaries.

The calculation circuit 5 detects the positions of an upper line (an upper horizontal scanning line) and a lower line (a lower horizontal scanning line) at which a central effective region starts and ends respectively in response to data representing the result of the square or the absolute-value calculation. The calculation circuit 5 includes a memory storing the data representing the result of the square or the absolute-value calculation in connection with all the vertical picture line regions. Pieces of the data representing the result of the square or the absolute-value calculation are stored in segments of the memory to which successive addresses are sequentially assigned along a vertical direction. The calculation circuit 5 sequentially scans the data pieces in the memory along both a downward vertical direction (an up-to-down direction) and an upward vertical direction (a down-to-up direction), and searches for data pieces greater in level than immediately preceding data pieces by at least a predetermined reference value (a predetermined reference level). The calculation circuit 5 determines or detects addresses of the searched data pieces as indications of the positions of an upper line (an upper horizontal scanning line) and a lower line (a lower horizontal scanning line) at which a central effective region starts and ends respectively. In the case of eight vertical picture line regions as shown in FIG. 10, there are provided eight addresses regarding the position of an upper line at which a central effective region starts, and eight addresses regarding the position of a lower line at which a central effective region ends. When a caption is present in a lower mask region, there are also provided eight addresses regarding the position of an upper line at which a caption starts, and eight addresses regarding the position of a lower line at which a caption ends.

A value or numeral of "1" is given to each of the upper video start addresses and the lower video end addresses while a value or numeral of "0" is given to each of other addresses. The numerals are added in each address position, forming an address projection such as shown in the right-hand edge of FIG. 17.

Data representing the address projection exhibits a normal distribution, a random distribution, or a good distribution in which all upper video start addresses are equal to each other and all lower video end addresses are equal to each other. The random distribution tends to occur in the case of a picture which does not have mask regions. Addresses at which peak values occur in the address projection are defined as a final upper video start address and a final lower video end address. In the case where the final upper video start address and the final lower video end address are composed of more than half members, the final upper video start address and the final lower video end address are accepted and used. On the other hand, in the case where the final upper video start address and the final lower video end address are not composed of more than half members, the final upper video start address and the final lower video end address are rejected and discarded. In this case, the calculation circuit 5 samples and accepts segments of the output video signal of an A/D converter 2 (see FIGS. 7, 18, 19, and 24) again, and generates a second address projection from the sampled signal segments. Then, the calculation circuit 5 decides a final upper video start address and a final lower video end address by referring to the second address projection.

The calculation circuit 5 decides whether or not a picture represented by the incoming video signal has upper and lower noneffective mask regions by referring to information of the final upper video start address and the final lower video end address. When the calculation circuit 5 detects that a picture represented by the incoming video signal has a wide-aspect central effective region and upper and lower noneffective mask regions as shown in FIG. 8, the calculation circuit 5 commands an aspect converting circuit 6 (see FIGS. 7, 18, 19, and 24) to execute aspect conversion of the incoming video signal so that the central effective region of the picture represented by the incoming video signal will fully occupy the screen of a CRT 7 (see FIGS. 7, 18, 19, and 24).

Thirteenth Embodiment

A thirteenth embodiment of this invention is similar to one of the embodiments of FIGS. 7, 18, 19, and 24 except for design changes indicated later.

In the thirteenth embodiment, a calculation circuit 5 (see FIGS. 7, 18, 19, and 24) samples and accepts segments of the output video signal of an A/D converter 2 (see FIGS. 7, 18, 19, and 24) which correspond to vertical picture line regions as described in connection with FIG. 10. It should be noted that the calculation circuit 5 may sample and accept segments of the output video signal of the A/D converter 2 which correspond to vertical picture line regions as described in connection with FIG. 37. The calculation circuit 5 statistically detects or determines a luminance level in upper and lower mask regions by referring to the sampled signal segments (the sampled data pieces).

As shown in FIG. 42, sub regions ①, ②, and ③ are defined in an upper frame region which corresponds in position to a top edge of an upper mask region. The sub regions ①, ②, and ③ are composed of about 10 successive horizontal lines starting from the uppermost horizontal line. In addition, sub regions ④, ⑤, and ⑥ are defined in a lower frame region which corresponds in position to a bottom edge of a lower mask region. The sub regions ④, ⑤, and ⑥ are composed of about 10 successive horizontal lines ending at the lowermost horizontal line. The sub regions ④, ⑤, and ⑥ are located in areas where a caption is hardly present. It should be noted that the total number of sub regions may differ from six. The calculation circuit 5 uses only ones among the sampled signal segments (the sampled data pieces) which correspond to the sub regions ①, ②, ③, ④, ⑤, and ⑥ in detecting a luminance level in upper and lower mask regions.

A reference luminance level "A" is now defined as equal to the sum of the possible maximum value of a luminance level in upper and lower mask regions and a small value predetermined in consideration of affection by low-frequency noise. A maximum luminance level "B" is now defined as equal to the possible maximum value represented by one sampled data piece (one sampled signal segment). In the case where each sampled data piece has 8 bits, the maximum luminance level "B" is equal to "255". In the calculation circuit 5, each of the sampled data pieces corresponding to the sub regions ①, ②, ③, ④, ⑤, and ⑥ are subjected to nonlinear conversion having a characteristic shown in FIG. 43. Specifically, when the luminance level represented by a sampled data piece exceeds the reference level "A", the sampled data piece is converted into a data piece indicating the maximum luminance level "B". When the luminance level represented by a sampled data piece is equal to or smaller than the reference level "A", the sampled data piece is not converted.

The calculation circuit 5 counts up data pieces indicative of the maximum luminance level "B" in each of the sub regions ①, ②, ③, ④, ⑤, and ⑥. When the total number of data pieces indicative of the maximum luminance level "B" is equal to or greater than a prescribed number in each of the sub regions ①, ②, ③, ④, ⑤, and ⑥, the calculation circuit 5 detects that a picture represented by an incoming video signal does not have upper and lower mask regions. It should be noted that when the total number of data pieces indicative of the maximum luminance level "B" is equal to or greater than the prescribed number in only the sub region ①, the calculation circuit 5 may decide a picture to be without upper and lower mask regions.

When the total number of data pieces indicative of the maximum luminance level "B" is relatively small in each of the sub regions ①, ②, ③, ④, ⑤, and ⑥, the calculation circuit 5 detects that a picture represented by an incoming video signal has upper and lower mask regions. In this case, the calculation circuit 5 determines a mean value (an average value) between the levels represented by all the data pieces in each of the sub regions ①, ②, ③, ④, ⑤, and ⑥. When the determined mean values related to the respective sub regions ①, ②, ③, ④, ⑤, and ⑥ are approximately equal to each other within a prescribed dispersion, the calculation circuit 5 determines a synthetic mean value between the levels represented by all the data pieces in all the sub regions ①, ②, ③, ④, ⑤, and ⑥ and uses the determined synthetic mean value as an indication of a luminance level in the upper and lower mask regions. Otherwise, the calculation circuit 5 detects that a picture represented by an incoming video signal does not have upper and lower mask regions.

In this embodiment, as understood from the previous description, a decision regarding a dispersion is executed by comparing the determined mean values related to the respective sub regions ①, ②, ③, ④, ⑤, and ⑥. A decision regarding a dispersion may be executed by comparing statistical quantities such as high-order moments and factors related to a mean value between the squares of data values minus the square of a mean value between data values. In this case, when the statistical quantifies are different from each other with more than a prescribed dispersion, the calculation circuit 5 detects that a picture represented by an incoming video signal does not have upper and lower mask regions.

After the luminance level in the upper and lower mask regions is determined, the calculation circuit 5 defines a reference luminance level "C" which is equal to the sum of the luminance level in the upper and lower mask regions and a given value predetermined in consideration of affection by noise. The calculation circuit 5 compares the levels represented by the sampled data pieces in the vertical picture line regions with the reference level "C". Regarding each of the vertical picture line regions, the calculation circuit 5 detects a sampled data piece representative of greater than the reference level "C" which is immediately preceded by a sampled data piece representative of smaller than the reference level "C", and also detects a sampled data piece representative of greater than the reference level "C" which is immediately followed by a sampled data piece representative of smaller than the reference level "C". The calculation circuit 5 uses the detected sampled data pieces as indications of an upper video start line position and a lower video end line position respectively.

The determined upper video start line position and the determined lower video end line position may be made effective only when the total number of sampled data pieces representative of greater than the reference level "C" and the total number of sampled data pieces representative of smaller than the reference level "C" exceed predetermined numbers. This design prevents wrong detection caused by noise.

It should be noted that the reference luminance level "C" may be replaced by another reference luminance level.

Fourteenth Embodiment

A fourteenth embodiment of this invention is similar to the thirteenth embodiment except for design changes indicated later. A calculation circuit 5 (see FIGS. 7, 18, 19, and 24) in the fourteenth embodiment determines a luminance level in upper and lower mask regions as in the thirteenth embodiment.

After the luminance level in the upper and lower mask regions is determined, the calculation circuit 5 defines a reference luminance level "C" which is equal to the sum of the luminance level in the upper and lower mask regions and a given value predetermined in consideration of affection by noise. The calculation circuit 5 subjects sampled data pieces in vertical picture line regions to multi-value/bi-value conversion having a characteristic shown in FIG. 47. This multi-value/bi-value conversion is designed to increase the sensitivity or the accuracy of detection of the boundaries between the central effective region and the upper and lower mask regions in a picture corresponding to the example in FIG. 41. Specifically, the calculation circuit 5 uses the reference level "C" as a threshold value, and compares the levels represented by the sampled data pieces in the vertical picture line regions with the threshold level "C". According to the multi-value/bi-value conversion in FIG. 47, when the luminance levels represented by sampled data pieces are smaller than the threshold level "C", the sampled data pieces are converted into data pieces indicating a luminance level of "0" or a minimum luminance level. On the other hand, when the luminance levels represented by sampled data pieces are greater than the threshold level "C", the sampled data pieces are converted into data pieces indicating a maximum luminance level "B". In the case where each sampled data piece has 8 bits, the maximum luminance level "B" is equal to "255".

Figure 47:
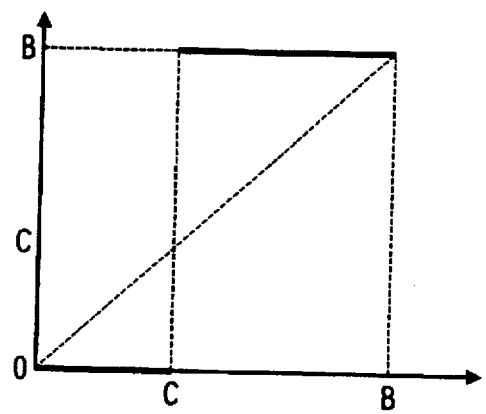
FIG. 47 is a diagram of a characteristic of multi-value/bi-value conversion in a fourteenth embodiment of this invention.
Figure 48:
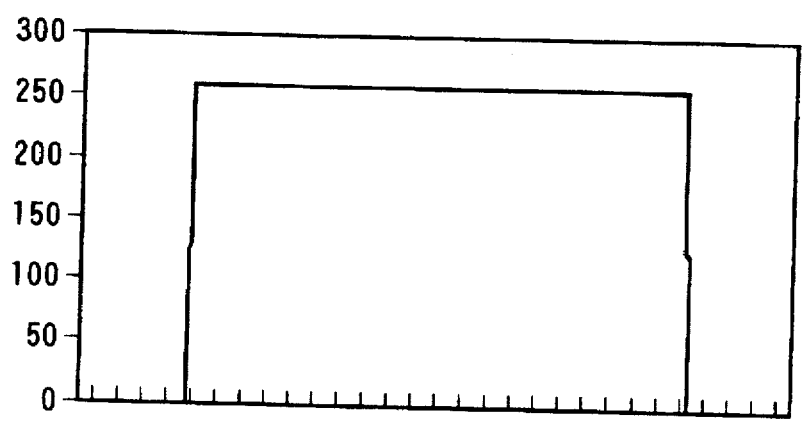
FIG. 48 is a diagram of a level distribution provided by the multi-value/bi-value conversion in FIG. 47 with respect to the luminance level distribution of FIG. 40.
Figure 49:
FIG. 49 is a diagram of a level distribution provided by the multi-value/bi-value conversion in FIG. 47 with respect to the luminance level distribution of FIG. 41.

The multi-value/bi-value conversion in FIG. 47 provides a level distribution of FIG. 48 with respect to the luminance distribution of FIG. 40. The multi-value/bi-value conversion in FIG. 47 provides a level distribution of FIG. 49 with respect to the luminance distribution of FIG. 41. As shown in FIGS. 48 and 49, the multi-value/bi-value conversion in FIG. 47 emphasizes the luminance level steps at the boundaries between the central effective region and the upper and lower mask regions.

The calculation circuit 5 detects the positions of an upper line (an upper horizontal scanning line) and a lower line (a lower horizontal scanning line) at which a central effective region starts and ends respectively in response to data resulting from the multi-value/bi-value conversion in FIG. 47. The calculation circuit 5 includes a memory storing the data resulting from the multi-value/bi-value conversion in connection with all the vertical picture line regions. Pieces of the data resulting from the multi-value/bi-value conversion are stored in segments of the memory to which successive addresses are sequentially assigned along a vertical direction. The calculation circuit 5 sequentially scans the data pieces in the memory along both a downward vertical direction (an up-to-down direction) and an upward vertical direction (a down-to-up direction), and searches for data pieces greater in level than immediately preceding data pieces by at least a predetermined reference value (a predetermined reference level). The calculation circuit 5 determines or detects addresses of the searched data pieces as indications of the positions of an upper line (an upper horizontal scanning line) and a lower line (a lower horizontal scanning line) at which a central effective region starts and ends respectively. In the case of eight vertical picture line regions as shown in FIG. 10, there are provided eight addresses regarding the position of an upper line at which a central effective region starts, and eight addresses regarding the position of a lower line at which a central effective region ends. When a caption is present in a lower mask region, there are also provided eight addresses regarding the position of an upper line at which a caption starts, and eight addresses regarding the position of a lower line at which a caption ends.

Figure 50:
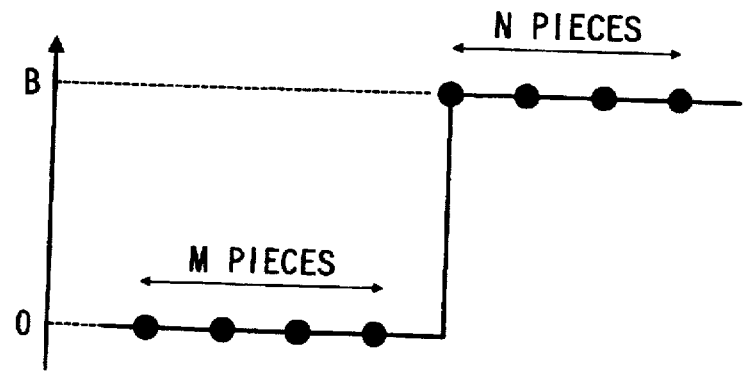
FIG. 50 is a diagram of an example of a sequence of data pieces which corresponds to one vertical picture line region in the fourteenth embodiment.

FIG. 50 shows an example of a sequence of data pieces which corresponds to one vertical picture line region. In FIG. 50, a succession of M data pieces representing "0" adjoins a succession of N data pieces representing the maximum level "B", where M and N denote natural numbers respectively. When the numbers M and N are greater than predetermined numbers, the boundary between the succession of M data pieces representing "0" and the succession of N data pieces representing the maximum level "B" is decided to be either a boundary between a central effective region and an upper mask region or a boundary between a central effective region and a lower mask region. Specifically, in the case where the rightward (left-to-right) direction of FIG. 50 agrees with the downward vertical direction of a picture, the boundary between the two data successions is decided to be a boundary between an upper mask region and a central effective region. In the case where the leftward (right-to-left) direction of FIG. 50 agrees with the downward vertical direction of a picture, the boundary between the two data successions is decided to be a boundary between a central effective region and a lower mask region. To remove adverse affection by noise, it is preferable that the predetermined numbers providing references for the numbers M and N are equal to or greater than 3.

A value or numeral of "1" is given to each of the upper video start addresses and the lower video end addresses while a value or numeral of "0" is given to each of other addresses. The numerals are added in each address position, forming an address projection such as shown in the right-hand edge of FIG. 17.

Data representing the address projection exhibits a normal distribution, a random distribution, or a good distribution in which all upper video start addresses are equal to each other and all lower video end addresses are equal to each other. The random distribution tends to occur in the case of a picture which does not have mask regions. Addresses at which peak values occur in the address projection are defined as a final upper video start address and a final lower video end address. In the case where the final upper video start address and the final lower video end address are composed of more than half members, the final upper video start address and the final lower video end address are accepted and used. On the other hand, in the case where the final upper video start address and the final lower video end address are not composed of more than half members, the final upper video start address and the final lower video end address are rejected and discarded. In this case, the calculation circuit 5 samples and accepts segments of the output video signal of an A/D converter 2 (see FIGS. 7, 18, 19, and 24) again, and generates a second address projection from the sampled signal segments. Then, the calculation circuit 5 decides a final upper video start address and a final lower video end address by referring to the second address projection.

The calculation circuit 5 decides whether or not a picture represented by the incoming video signal has upper and lower noneffective mask regions by referring to information of the final upper video start address and the final lower video end address. When the calculation circuit 5 detects that a picture represented by the incoming video signal has a wide-aspect central effective region and upper and lower noneffective mask regions as shown in FIG. 8, the calculation circuit 5 commands an aspect converting circuit 6 (see FIGS. 7, 18, 19, and 24) to execute aspect conversion of the incoming video signal so that the central effective region of the picture represented by the incoming video signal will fully occupy the screen of a CRT 7 (see FIGS. 7, 18, 19, and 24).

Fifteenth Embodiment

Figure 51:
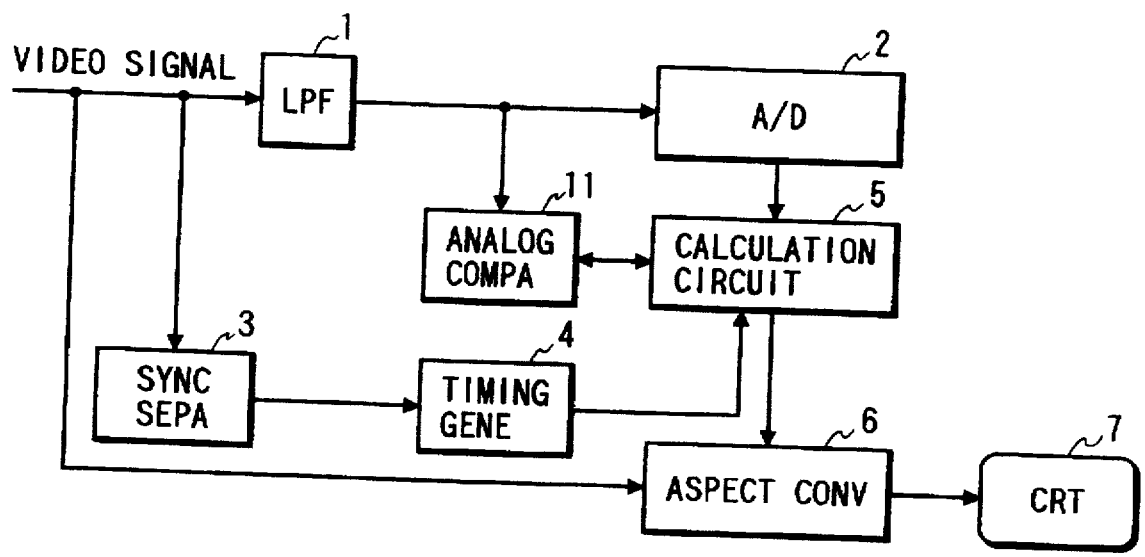
FIG. 51 is a block diagram of a television receiver according to a fifteenth embodiment of this invention.

FIG. 51 shows a fifteenth embodiment of this invention which is similar to the embodiment of FIG. 7 except for design changes indicated later.

With reference to FIG. 51, a wide television receiver of the fifteenth embodiment includes a low pass filter 1, an A/D converter 2, a sync separation circuit 3, a timing signal generator 4, a calculation circuit 5, an aspect converting circuit 6, a display or a CRT 7, and an analog comparator (a voltage comparator) 11.

An incoming video signal is inputted into the low pass filter 1, the sync separation circuit 3, and the aspect converting circuit 6. The low pass filter 1 removes high-frequency components from the incoming video signal, and outputs a resultant video signal to the A/D converter 2 and the analog comparator 11. The A/D converter 2 changes the received video signal into a corresponding digital video signal. The A/D converter 2 outputs the digital video signal to the calculation circuit 5.

The sync separation circuit 3 separates a horizontal sync signal and a vertical sync signal from the incoming video signal, and outputs the sync signals to the timing signal generator 4. The timing signal generator 4 produces a timing signal in response to the sync signals, and outputs the timing signal to the calculation circuit 5.

The calculation circuit 5 samples and accepts the output video signal of the A/D converter 2 at a timing determined by the timing signal fed from the timing signal generator 4. The calculation circuit 5 detects a luminance level in upper and lower mask regions from the accepted video signal. The calculation circuit 5 defines a reference luminance level "C" which is equal to the sum of the detected luminance level in the upper and lower mask regions and a given value predetermined in consideration of affection by noise. The calculation circuit 5 contains a D/A converter which changes a digital signal representative of the reference luminance level "C" into a corresponding analog (voltage) signal. The calculation circuit 5 outputs the analog signal representative of the reference luminance level "C" to the analog comparator 11. It should be noted that the D/A converter may be moved from the calculation circuit 5 to the analog comparator 11.

The analog comparator 11 compares the level of the output video signal of the low pass filter 1 and the reference luminance level "C". The analog comparator 11 feeds the calculation circuit 5 with a binary signal depending on the result of the comparison. Specifically, when the level of the output video signal of the low pass filter 1 is smaller than the reference luminance level "C", the binary signal from the analog comparator 11 assumes a state of "0". Otherwise, the binary signal from the analog comparator 11 assumes a state of "1".

The calculation circuit 5 decides whether or not a picture represented by the incoming video signal has upper and lower noneffective mask regions by referring to the output signal of the analog comparator 11. When the calculation circuit 5 detects that a picture represented by the incoming video signal has a wide-aspect central effective region and upper and lower noneffective mask regions, the calculation circuit 5 commands the aspect converting circuit 6 to execute aspect conversion of the incoming video signal so that the central effective region of the picture represented by the incoming video signal will fully occupy the screen of the CRT 7. The aspect converting circuit 6 executes aspect conversion by processing the incoming video signal or by controlling at least one of a horizontal deflection width (a horizontal raster amplitude) and a vertical deflection width (a vertical raster amplitude) in the CRT 7.

Operation of the calculation circuit 5 will now be further described. As previously described, the calculation circuit 5 extracts segments of the output video signal of the A/D converter 2 in response to the timing signal fed from the timing signal generator 4. Specifically, the calculation circuit 5 samples and accepts segments of the output video signal of the A/D converter 2 which correspond to vertical picture line regions as described in connection with FIG. 10. It should be noted that the calculation circuit 5 may sample and accept segments of the output video signal of the A/D converter 2 which correspond to vertical picture line regions as described in connection with FIG. 37. The calculation circuit 5 statistically detects or determines a luminance level in upper and lower mask regions by referring to the sampled signal segments (the sampled data pieces).

Figure 52:
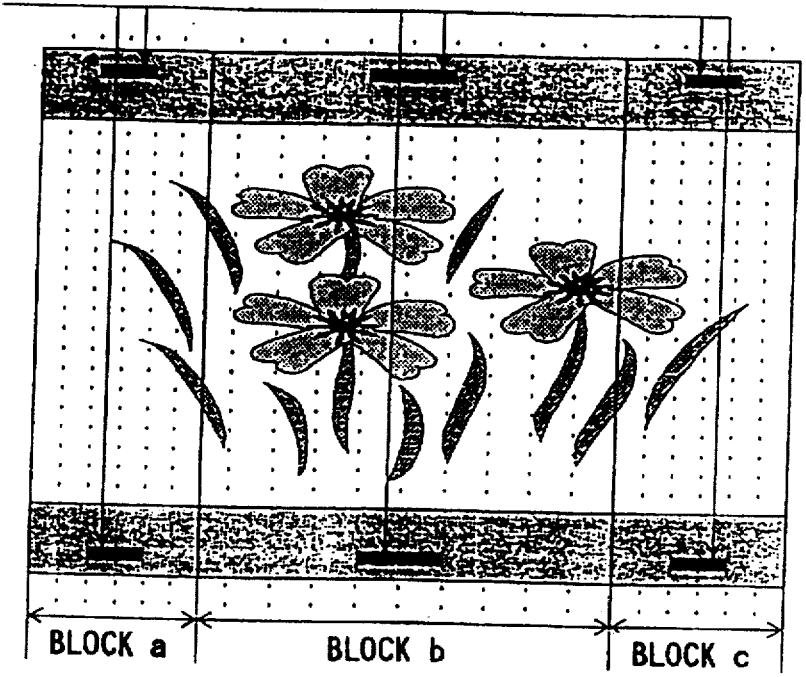
FIG. 52 is a diagram of a picture, and blocks composing one picture frame in the fifteenth embodiment.

As shown in FIG. 52, a frame is divided along two vertical lines into a left-hand edge block "a", a central block "b", and a right-hand edge block "c". Upper and lower frame regions are now defined as corresponding in position to upper and lower mask regions respectively. The calculation circuit 5 uses only ones among the sampled signal segments which correspond to the upper and lower frame regions in detecting a luminance level in the upper and lower mask regions. The calculation circuit 5 determines a mean value (an average value) between the levels represented by the data pieces in each of the left-hand edge block "a", the central block "b", and the right-hand edge block "c". When the determined mean values related to the respective blocks "a", "b", and "c" are approximately equal to each other within a prescribed dispersion, the calculation circuit 5 determines a synthetic mean value between the levels, represented by the data pieces in all the blocks "a", "b", and "c" and uses the determined synthetic mean Value as an indication of a luminance level in the upper and lower mask regions. Otherwise, the calculation circuit 5 detects that a picture represented by an incoming video signal does not have upper and lower mask regions. Also in the case where a given number or more of data pieces represent higher than a predetermined luminance level (for example, 20 IRE to 30 IRE) in each of the blocks "a", "b", and "c", the calculation circuit 5 detects that a picture represented by an incoming video signal does not have upper and lower mask regions.

As previously described, the calculation circuit 5 defines a reference luminance level "C" which is equal to the sum of the detected luminance level in the upper and lower mask regions and a given value predetermined in consideration of affection by noise. The calculation circuit 5 feeds the analog comparator 11 with a signal representing the reference luminance level "C". It should be noted that the analog comparator 11 may use a fixed signal representative of a given luminance level of 20 IRE to 30 IRE in place of the signal from the calculation circuit 5 which indicates the reference luminance level "C".

Figure 53:
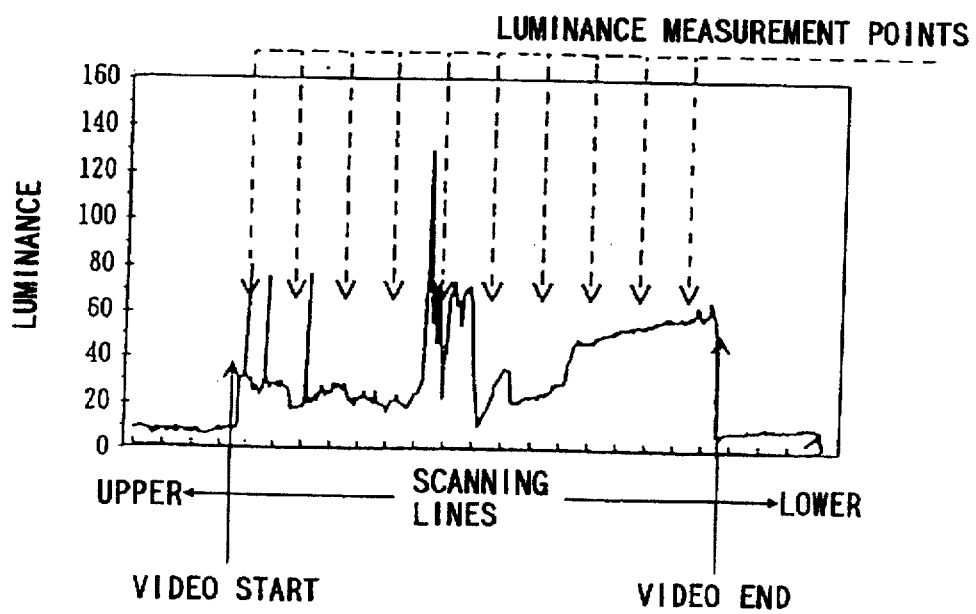
FIG. 53 is a diagram of a distribution of luminances corresponding to one vertical line region, and luminance measurement points in the fifteenth embodiment.

After the luminance level in the upper and lower mask regions is determined, the calculation circuit 5 determines a luminance level in a central effective region of a picture. A central frame region is now defined as corresponding in position to a central effective region of a picture. As shown in FIG. 53, the calculation circuit 5 selects ones among the sampled signal segments (the sampled data pieces) which correspond to the central frame region. The calculation circuit 5 uses the selected signal segments in detecting a luminance level in the central effective region. Specifically, the calculation circuit 5 determines a mean value between the luminance levels represented by the selected signal segments. The calculation circuit 5 uses the determined mean value as an indication of the luminance level in the central effective region. The calculation circuit 5 compares the luminance level in the central effective region and the luminance level in the upper and lower mask regions to decide whether or not the incoming video signal assumes a state at which an accurate decision regarding the presence and absence of the upper and lower mask regions is possible. When there is hardly an appreciable difference between the luminance level in the central effective region and the luminance level in the upper and lower mask regions, that is, when an accurate decision regarding the presence and absence of the upper and lower mask regions is difficult, the calculation circuit 5 does not execute a process of detecting the upper and lower mask regions. When there is an appreciable difference between the luminance level in the central effective region and the luminance level in the upper and lower mask regions, that is, when an accurate decision regarding the presence and absence of the upper and lower mask regions is possible, the calculation circuit 5 uses the output signal of the analog comparator 11 but does not use the sampled data pieces derived from the output signal of the A/D converter 2.

The calculation circuit 5 samples and accepts the output signal of the analog comparator 11 at a timing determined by the timing signal fed from the timing signal generator 4. Specifically, the calculation circuit 5 samples and accepts segments of the output signal of the analog comparator 11 which correspond to vertical picture line regions as described in connection with FIG. 10. It should be noted that the calculation circuit 15 may sample and accept segments of the output signal of the analog comparator 11 which correspond to vertical picture line regions as described in connection with FIG. 37. The manner of the sampling of the output signal of the analog comparator 11 is similar to the manner of the sampling of the output video signal of the A/D converter 2.

Figure 54:
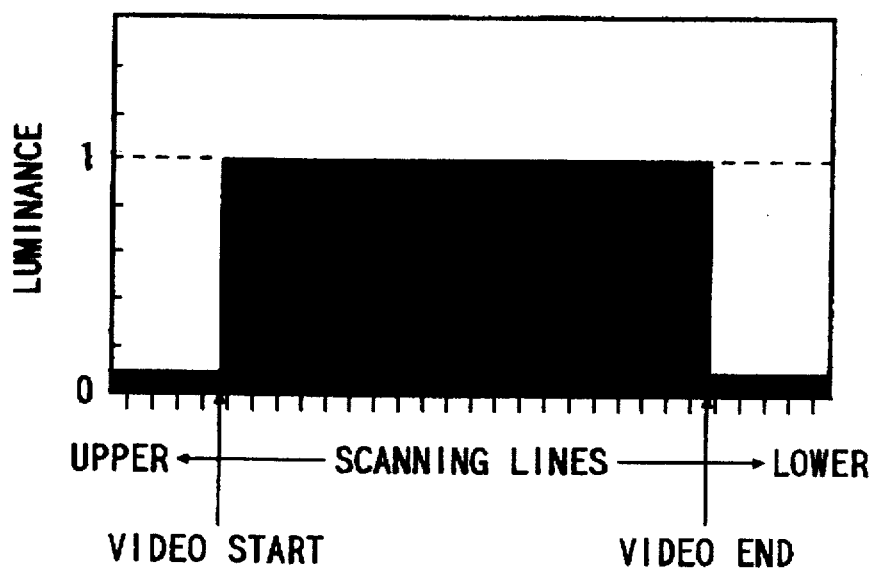
FIG. 54 is a diagram of a first example of the states of sampled signal segments derived from the output signal of an analog comparator which corresponds to one vertical line region in the fifteenth embodiment.
Figure 55:
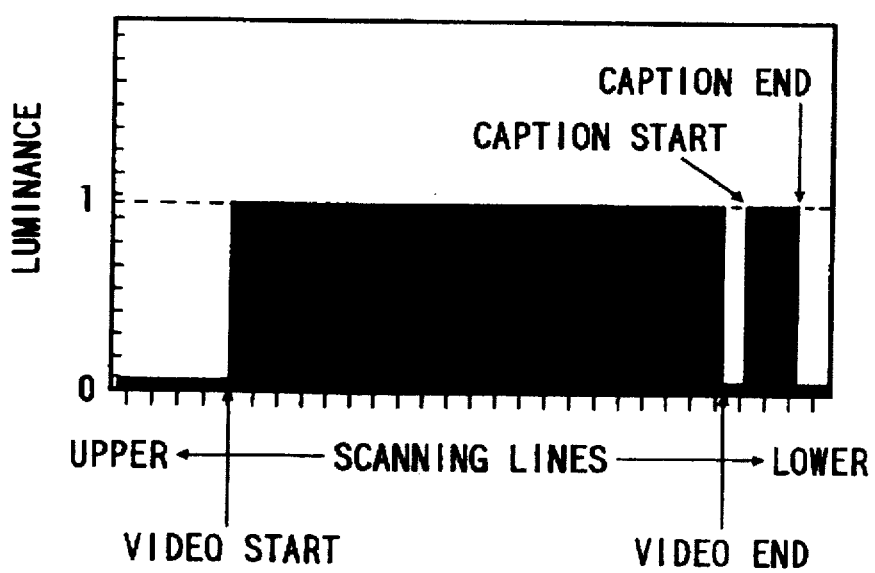
FIG. 55 is a diagram of a second example of the states of sampled signal segments derived from the output signal of the analog comparator which corresponds to one vertical line region in the fifteenth embodiment.

FIG. 54 shows an example of the states of data pieces (sampled signal segments) derived from the output signal of the analog comparator 11 which corresponds to one vertical line region. The example in FIG. 54 occurs in the case of an incoming video signal representing a picture having a central effective region and upper and lower mask regions without any caption. FIG. 55 shows an example of the states of data pieces (sampled signal segments) derived from the output signal of the analog comparator 11 which corresponds to one vertical line region. The example in FIG. 55 occurs in the case of an incoming video signal representing a picture having a central effective region, an upper mask region, and a lower mask region with a caption. As understood from FIGS. 54 and 55, the data pieces derived from the output signal of the analog comparator 11 indicate emphasized boundaries between a central effective region and upper and lower mask regions. The calculation circuit 5 detects the boundary between a central effective region and an upper mask region (an upper video start line position) and the boundary between the central effective region and a lower mask region (a lower video end line position) by analyzing the data pieces derived from the output signal of the analog comparator 11. Generally, a pair of an upper video start line position (an upper video start address) and a lower video end line position (a lower video end address) is detected for each of the vertical line regions.

Figure 56:
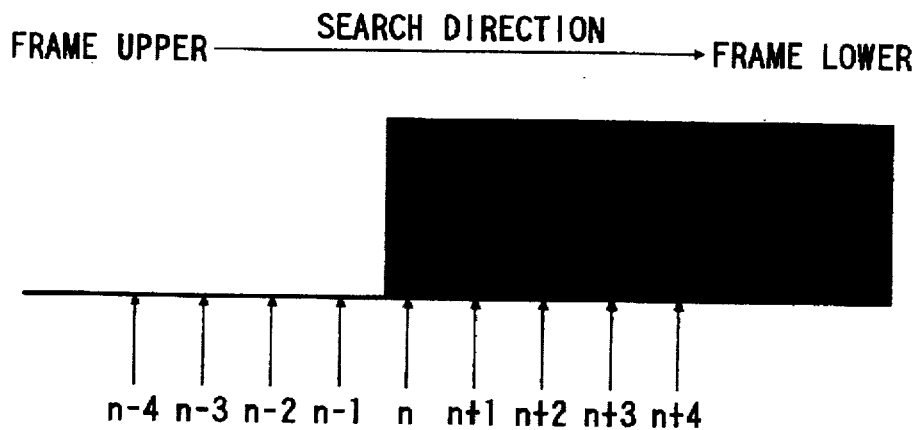
FIG. 56 is a diagram of a third example of the states of sampled signal segments derived from the output signal of the analog comparator which corresponds to a portion of one vertical line region in the fifteenth embodiment.

FIG. 56 shows an example of the states of data pieces (sampled signal segments) derived from the output signal of the analog comparator 11 which corresponds to one vertical line region. According to the example of FIG. 56, the data pieces correspond to successive positions "n−4", "n−3", "n−2", "n−1", "n", "n+1", "n+2", "n+3", "n+4", . . . in the vertical line region along a search direction equal to a downward vertical direction respectively. The four data pieces corresponding to the successive positions "n−4", "n−3", "n−2", and "n−1" indicate a black level while the five data pieces corresponding to the immediately following successive positions "n", "n+1", "n+2", "n+3", and "n+4" indicate a non-black level. In such a case, the calculation circuit 5 decides the position "n" to be an upper video start line position.

Figure 57:
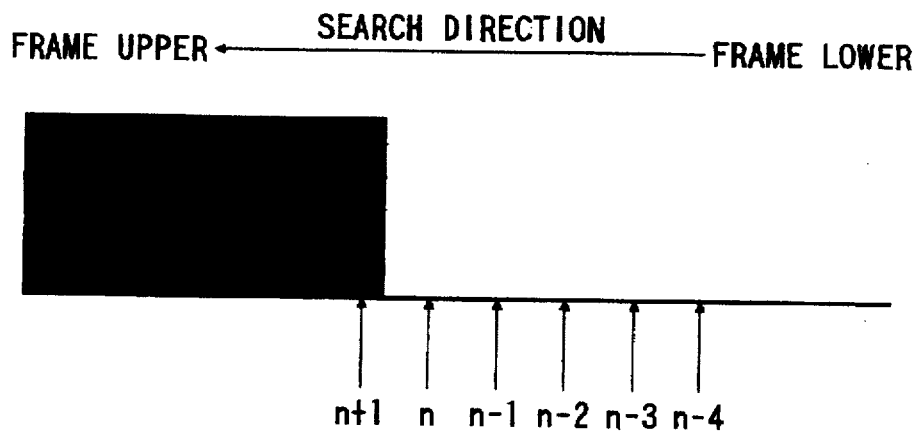
FIG. 57 is a diagram of a fourth example of the states of sampled signal segments derived from the output signal of the analog comparator which corresponds to a portion of one vertical line region in the fifteenth embodiment.

FIG. 57 shows an example of the states of data pieces (sampled signal segments) derived from the output signal of the analog comparator 11 which corresponds to one vertical line region. According to the example of FIG. 57, the data pieces correspond to successive positions "n−4", "n−3", "n−2", "n−1", "n", "n+1", . . . in the vertical line region along a search direction equal to an upward vertical direction respectively. The five data pieces corresponding to the successive positions "n−4", "n−3", "n−2", "n−1", and "n" indicate the black level while the data piece corresponding to the immediately following position "n+1" indicate the non-black level. In such a case, the calculation circuit 5 decides the position "n+1" to be a lower video end line position.

Figure 58:
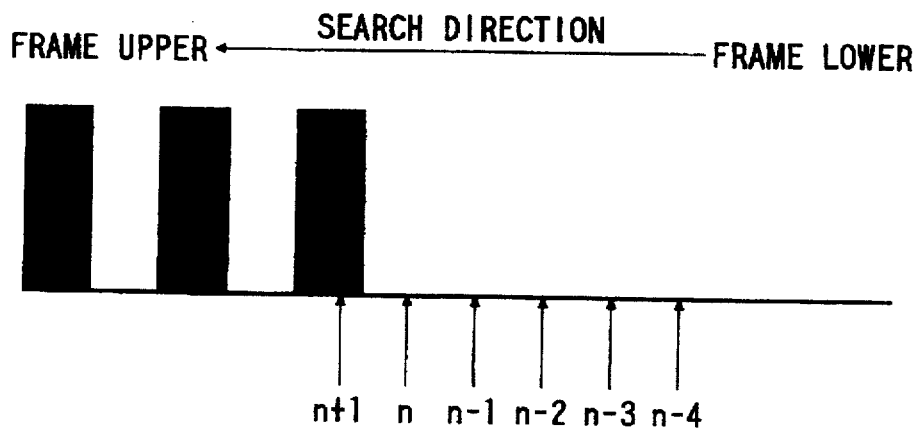
FIG. 58 is a diagram of a fifth example of the states of sampled signal segments derived from the output signal of the analog comparator which corresponds to a portion of one vertical line region in the fifteenth embodiment.

FIG. 58 shows an example of the states of data pieces (sampled signal segments) derived from the output signal of the analog comparator 11 which corresponds to one vertical line region. The example in FIG. 58 occurs in the case of an incoming video signal representing a picture having a central effective region, an upper mask region, and a lower mask region with a caption. According to the example of FIG. 58, the data pieces correspond to successive positions "n−4", "n−3", "n−2", "n−1", "n", "n+1", . . . in the vertical line region along a search direction equal to an upward vertical direction respectively. The five data pieces corresponding to the successive positions "n−4", "n−3", "n−2", "n−1", and "n" indicate the black level while the data piece corresponding to the immediately following position "n+1" indicates the non-black level. The data pieces corresponding to respective positions subsequent to the position "n+1" alternately indicate the black level and the non-black level. In such a case, the calculation circuit 5 detects only a first change from the black level to the non-black level, that is, the level change at the position "n+1", and ignores a second and later changes from the black level to the non-black level at positions following the position "n+1".

The calculation circuit 5 includes a memory storing the data pieces (the sampled signal segments) derived from the output signal of the analog comparator 11. Specifically, the data pieces are stored in segments of the memory to which successive addresses are sequentially assigned along a vertical direction. The calculation circuit 5 sequentially scans the data pieces in the memory along both a downward vertical direction (an up-to-down direction) and an upward vertical direction (a down-to-up direction), and searches for data pieces related to luminance level changes. The calculation circuit 5 determines or detects addresses of the searched data pieces as indications of the upper video start line position and the lower video end line position respectively. In the case of fifteen vertical picture line regions as shown in FIG. 37, there are provided fifteen addresses regarding the upper video start line position, and fifteen addresses regarding the lower video end line position as long as the luminance level in the central effective region remains adequately greater than the luminance level in the upper and lower mask regions.

A value or numeral of "1" is given to each of the upper video start addresses and the lower video end addresses while a value or numeral of "0" is given to each of other addresses. The numerals are added in each address position, forming an address projection for each of the left-hand edge block "a", the central block "b", and the right-hand edge block "c". The calculation circuit 5 determines a final upper video start address and a lower video end address by referring to the address projection for each of the blocks "a", "b", and "c". The character "α" is now introduced as an indication of the total number of the vertical picture line regions in each of the blocks "a", "b", and "c". Further, the character "β" is introduced as an indication of the number of the vertical picture line regions, about which detection of the upper video start addresses and the lower video end addresses is successful in each of the blocks "a", "b", and "c". The calculation circuit 5 compares the value "β/α" with a predetermined reference value "η". When the value "β/α" is smaller than the reference value "η", the calculation circuit 5 decides address detection to be unsuccessful. Otherwise, the calculation circuit 5 decides address detection to be successful. The detection accuracy can be adjusted by changing the reference value "η". The calculation circuit 5 statistically decides the presence and absence of upper and lower mask regions, and a final upper video start line position and a final lower video end line position in response to the upper video start addresses and the lower video end addresses regarding the blocks "a", "b", and "c".

Specifically, the calculation circuit 5 uses an array M of data items M[0], M[1], . . . , and M[n]. For each of the blocks "a", "b", and "c", the calculation circuit 5 sets the data items M[0], M[1], . . . , and M[n] to represent an upper video start address regarding a first one of the vertical picture line regions, an upper video start address regarding a second one of the vertical picture line regions, . . . , and an upper video start address regarding an "n+1"-th one of the vertical picture line regions respectively. The calculation circuit 5 determines a mean address "m" among the upper video start addresses regarding the vertical picture line regions by referring to an equation as follows.

$$m = \left\{ \sum_{i=0}^{n} M[i] \right\} / n$$

In addition, the calculation circuit 5 determines a dispersion "k" by referring to an equation as follows.

$$k = \left\{ \sum_{i=0}^{n} (m - M[i])^2 \right\} / n$$

The calculation circuit 5 may determine a dispersion "k" by referring to an equation as follows.

$$k = \left\{ \sum_{i=0}^{n} abs(m - M[i]) \right\} / n$$

where "abs" denotes an operator for calculating the absolute value of a number in the subsequent parentheses. The mean address "m" and the dispersion "k" regarding the upper video start addresses are determined for each of the blocks "a", "b", and "c".

For each of the blocks "a", "b", and "c", the calculation circuit 5 compares the dispersion "k" with a predetermined reference dispersion "k1". When the dispersion "k" is smaller than the reference dispersion "k1", the calculation circuit 5 uses the mean address "m" as an indication of a final upper video start address regarding the related block. When the dispersion "k" is equal to or greater than the reference dispersion "k1", the calculation circuit 5 detects that a picture represented by the incoming video signal does not have an upper mask region.

Similarly to the determination of the mean address "m" and the dispersion "k" regarding the upper video start addresses, the calculation circuit 5 determines a mean address "m" and a dispersion "k" regarding the lower video end addresses for each of the blocks "a", "b", and "c". For each of the left-hand edge block "a" and the right-hand edge block "c", the calculation circuit 5 compares the dispersion "k" with the reference dispersion "k1". When the dispersion "k" is smaller than the reference dispersion "k1", the calculation circuit 5 uses the mean address "m" as an indication of a final lower video end address regarding the related block. When the dispersion "k" is equal to or greater than the reference dispersion "k1", the calculation circuit 5 detects that a picture represented by the incoming video signal does not have a lower mask region. For each of the central block "b", the calculation circuit 5 compares the dispersion "k" with a predetermined reference dispersion "k2". When the dispersion "k" is smaller than the reference dispersion "k2", the calculation circuit 5 uses the mean address "m" as an indication of a final lower video end address regarding the central block "b". When the dispersion "k" is equal to or greater than the reference dispersion "k2", the calculation circuit 5 detects that a picture represented by the incoming video signal does not have a lower mask region. The reference dispersion "k2" is set greater than the reference dispersion "k1" in consideration of the fact that the possibility of the presence of a caption in the central block "b" is higher than the possibilities in the left-hand edge block "a" and the right-hand edge block "c".

The calculation circuit 5 analyzes the relation among the final upper video start addresses and the lower video end addresses regarding the blocks "a", "b", and "c" to detect a type of a picture represented by the incoming video signal. In the case where the final upper video start addresses regarding the blocks "a", "b", and "c" are equal to each other and also the final lower video end addresses regarding the blocks "a", "b", and "c" are equal to each other, the calculation circuit 5 detects that a picture represented by the incoming video signal has upper and lower masks without any caption. In this case, one of the final upper video start addresses regarding the blocks "a", "b", and "c" is used as an indication of a synthetic upper video start address regarding the picture while one of the final lower video end addresses regarding the blocks "a", "b", and "c" is used as an indication of a synthetic lower video end address regarding the picture. In the case where the final upper video start addresses regarding the blocks "a", "b", and "c" are equal to each other while the final lower video end addresses regarding the blocks "a" and "c" are equal to each other but are different from the final lower video end address regarding the block "b", the calculation circuit 5 detects that a picture represented by the incoming video signal has an upper mask region and a lower mask region with a caption. In this case, one of the final upper video start addresses regarding the blocks "a", "b", and "c" is used as an indication of a synthetic upper video start address regarding the picture while one of the final lower video end addresses regarding the blocks "a" and "c" is used as an indication of a synthetic lower video end address regarding the picture.

It is preferable that the presence and absence of upper and lower mask regions in and from a picture is decided by analyzing only the sampled data pieces regarding the left-hand edge block "a".

Figure 59:
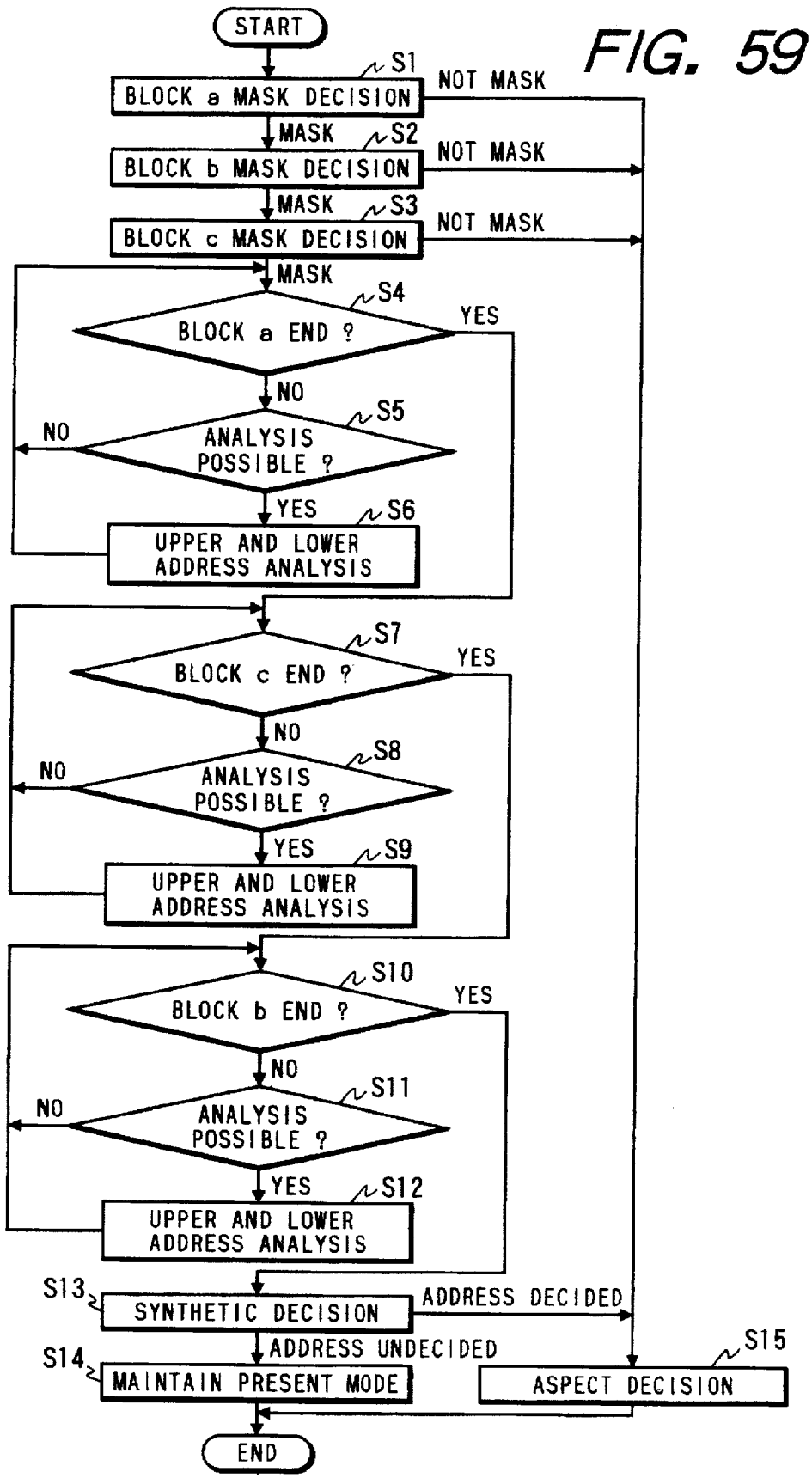
FIG. 59 is a flowchart of a program for operating a microcomputer in a calculation circuit in FIG. 51.

The calculation circuit 5 includes a microcomputer having a combination of an I/O port, a CPU, a RAM, and a ROM. The calculation circuit 5 operates in accordance with a program stored in the ROM. FIG. 59 shows a flowchart of the program.

As shown in FIG. 59, a first step S1 in the program decides the presence and absence of upper and lower mask regions regarding the left-hand edge block "a". When upper and lower mask regions are decided to be present regarding the left-hand edge block "a", the program advances from the step S1 to a step S2. Otherwise, the program jumps from the step S1 to a step S15.

The step S2 decides the presence and absence of upper and lower mask regions regarding the right-hand edge block "c". When upper and lower mask regions are decided to be present regarding the right-hand edge block "c", the program advances from the step S2 to a step S3. Otherwise, the program jumps from the step S2 to the step S15.

The step S3 decides the presence and absence of upper and lower mask regions regarding the central block "b". When upper and lower mask regions are decided to be present regarding the central block "b", the program advances from the step S3 to a step S4. Otherwise, the program jumps from the step S3 to the step S15.

The step S15 determines a desired aspect condition, and controls the aspect converting circuit 6 in response the desired aspect condition. After the step S15, the current execution cycle of the program ends.

The step S4 decides whether or not a detecting process regarding the left-hand edge block "a" has been completed. When the detecting process regarding the left-hand edge block "a" has been completed, the program advances from the step S4 to a step S7. Otherwise, the program advances from the step S4 to a step S5.

The step S5 decides whether or not luminance levels regarding the left-hand edge block "a" are in conditions where accurate aspect analysis is possible, that is, where an accurate decision regarding the presence and absence of upper and lower mask regions is possible. When accurate aspect analysis is possible, the program advances from the step S5 to a step S6. Otherwise, the program returns from the step S5 to the step S4.

The step S6 calculates a final upper video start address and a final lower video end address regarding the left-hand edge block "a". After the step S6, the program returns to the step S4.

The step S7 decides whether or not a detecting process regarding the right-hand edge block "c" has been completed. When the detecting process regarding the right-hand edge block "c" has been completed, the program advances from the step S7 to a step S10. Otherwise, the program advances from the step S7 to a step S8.

The step S8 decides whether or not luminance levels regarding the right-hand edge block "c" are in conditions where accurate aspect analysis is possible, that is, where an accurate decision regarding the presence and absence of upper and lower mask regions is possible. When accurate aspect analysis is possible, the program advances from the step S8 to a step S9. Otherwise, the program returns from the step S8 to the step S7.

The step S9 calculates a final upper video start address and a final lower video end address regarding the right-hand edge block "c". After the step S9, the program returns to the step S7.

The step S10 decides whether or not a detecting process regarding the central block "b" has been completed. When the detecting process regarding the central block "b" has been completed, the program advances from the step S10 to a step S13. Otherwise, the program advances from the step S10 to a step S11.

The step S11 decides whether or not luminance levels regarding the central block "b" are in conditions where accurate aspect analysis is possible, that is, where an accurate decision regarding the presence and absence of upper and lower mask regions is possible. When accurate aspect analysis is possible, the program advances from the step S11 to a step S12. Otherwise, the program returns from the step S11 to the step S10.

The step S12 calculates a final upper video start address and a final lower video end address regarding the central block "b". After the step S12, the program returns to the step S10.

The step S13 analyzes the relation among the final upper video start addresses and the lower video end addresses regarding the blocks "a", "b", and "c", and thereby determines a synthetic upper video start address and a synthetic lower video end address regarding a picture represented by the incoming video signal. When the synthetic upper video start address and the synthetic lower video end address are successfully determined, the program advances from the step S13 to the step S15. Otherwise, the program advances from the step S13 to a step S14.

The step S14 maintains the currently-used aspect condition. After the step S14, the current execution cycle of the program ends.

It should be noted that a nonlinear filter 9 may be added as in the embodiment of FIG. 19. In addition, the calculation circuit 5 may introduce a weighting process into the addition of numerals to form an address projection regarding the left-hand edge block "a" and the right-hand edge block "c" as in the sixth embodiment. Furthermore, a frame may be divided along vertical lines into more than three blocks.

Sixteenth Embodiment

Figure 60:
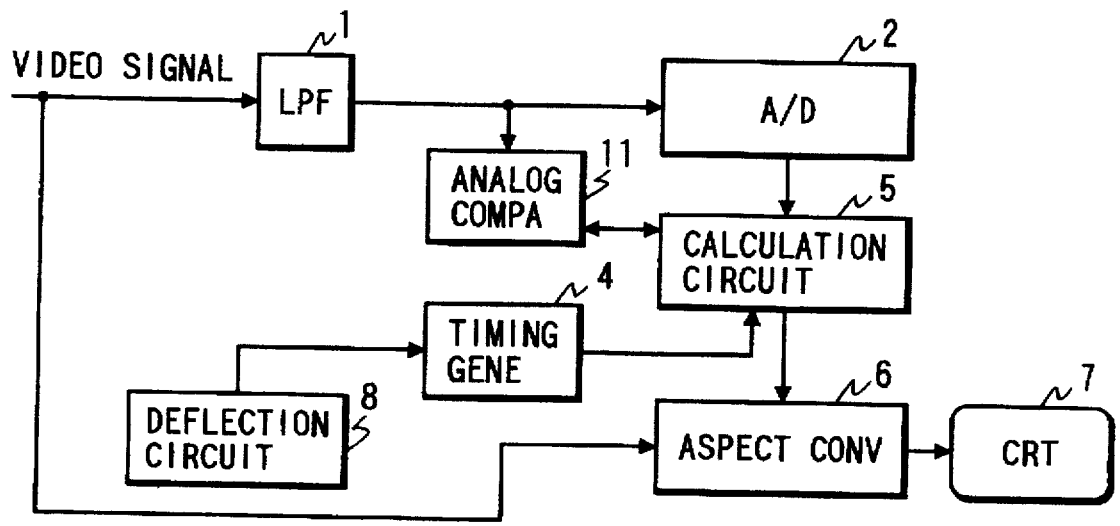
FIG. 60 is a block diagram of a television receiver according to a sixteenth embodiment of this invention.

FIG. 60 shows a sixteenth embodiment of this invention which is similar to the embodiment of FIG. 51 except that a deflection circuit 8 is used in place of the sync separation circuit 3 (see FIG. 51). The deflection circuit 8 feeds a horizontal sync signal and a vertical sync signal to a timing signal generator 4.

Seventeenth Embodiment

Figure 61:
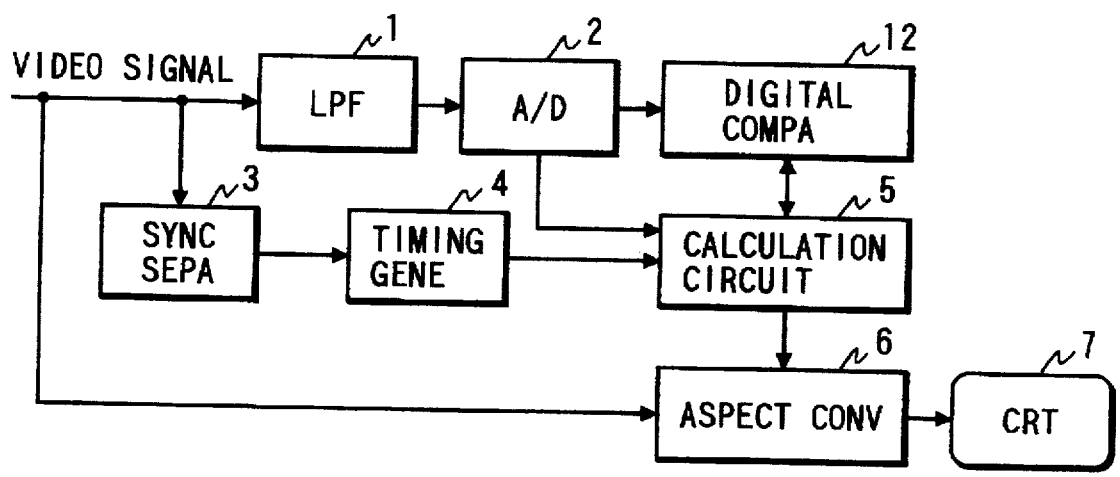
FIG. 61 is a block diagram of a television receiver according to a seventeenth embodiment of this invention.

FIG. 61 shows a seventeenth embodiment of this invention which is similar to the embodiment of FIG. 51 except that a digital comparator 12 is used in place of the analog comparator 11 (see FIG. 51). The digital comparator 12 is connected to an A/D converter 2 and a calculation circuit 5. The digital comparator 12 receives the output signal of the A/D converter 2. The digital comparator 12 receives an output signal of the calculation circuit 5 which represents a reference luminance level "C". Operation of the digital comparator 12 is similar in substance to that of the analog comparator 11 in the embodiment of FIG. 51. Thus, the digital comparator 12 compares the luminance level represented by the output signal of the A/D converter 2 with the reference luminance level "C". The digital comparator 12 feeds the calculation circuit 5 with a binary signal representing the result of the comparison.

Eighteenth Embodiment

Figure 62:
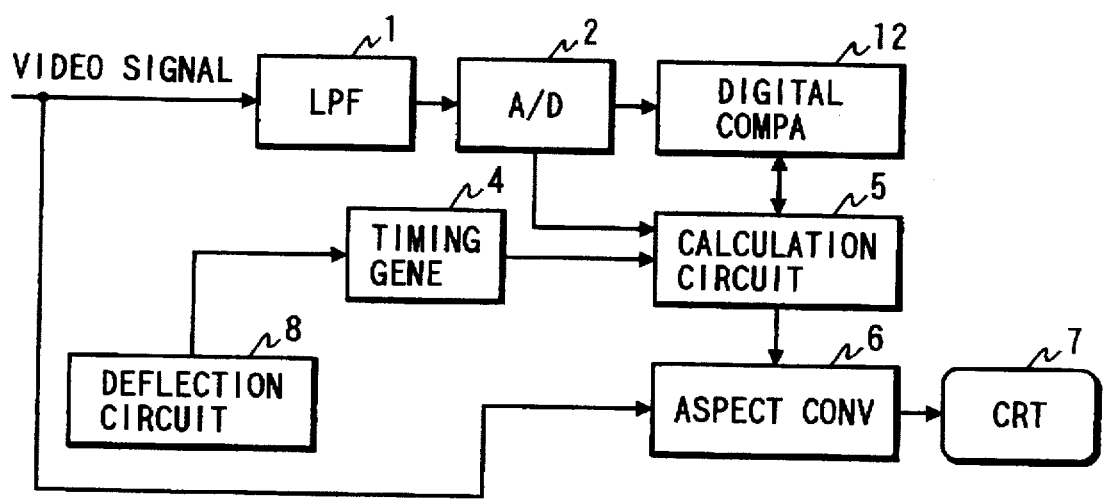
FIG. 62 is a block diagram of a television receiver according to an eighteenth embodiment of this invention.

FIG. 62 shows an eighteenth embodiment of this invention which is similar to the embodiment of FIG. 61 except that a deflection circuit 8 is used in place of a sync separation circuit 3 (see FIG. 61). The deflection circuit 8 feeds a horizontal sync signal and a vertical sync signal to a timing signal generator 4.

What is claimed is:

1. A frame-size adjusting apparatus comprising:

a low pass filter for removing high-frequency components from an incoming video signal;

an A/D converter for converting an output video signal from the low pass filter into corresponding digital data;

a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit;

wherein the calculation circuit comprises first means for differentiating the sampled and accepted segments of the digital data along a vertical direction for each of the vertically-extending regions, second means for subjecting output data from the first means to one of a squaring process or an absolute-value calculating process, and third means for detecting horizontal-line positions at which a central effective region of every picture starts and ends respectively in response to output data from the second means.

2. A frame-size adjusting apparatus according to claim 1, further comprising a brightness detector for detecting a brightness represented by the incoming video signal, wherein the third means in the calculation circuit comprises means for detecting the horizontal-line positions in response to the output data from the second means by referring to a judgment level, and means for varying the judgment level as a function of the detected brightness.

3. A frame-size adjusting apparatus according to claim 1, wherein the calculation circuit further comprises fourth means for weighting the sampled and accepted segments of the digital data in accordance with the related vertically-extending regions before the first means differentiates the digital data.

4. A frame-size adjusting apparatus according to claim 1, wherein the calculation circuit further comprises fourth means for dividing a picture frame represented by the sampled and accepted segments the digital data into a plurality of blocks along vertical boundaries, the third means being operative for detecting horizontal-line positions at which a central effective region of every picture starts and ends respectively for each of the blocks.

5. A frame-size adjusting apparatus according to claim 1, further comprising a nonlinear filter provided at one of a stage preceding the A/D converter and a stage following the A/D converter for emphasizing signal components representing dark picture portions.

6. A frame-size adjusting apparatus comprising:

a low pass filter for removing high-frequency components from an incoming video signal;

an A/D converter for converting an output video signal from the low pass filter into corresponding digital data;

a differentiating and summing circuit for differentiating the digital data into differentiation-resultant data along horizontal directions and summing the differential-resultant data into summing-resultant data in each of scanning lines;

a calculation circuit for sampling and accepting segments of the digital data which correspond to a given horizontal position, for checking a signal level in response to the sampled and accepted segments of the digital data, and for detecting upper and lower mask regions in every picture represented by the incoming video signal in response to the summing-resultant signal and a result of the check on the signal level; and an aspect converting circuit for controlling an aspect condition of the incoming video signal in response to a result of the detection by the calculation circuit;

wherein the calculation circuit comprises first means for differentiating the summing-resultant data data along a vertical direction, second means for subjecting output data from the first means to one of a squaring process or an absolute-value calculating process, and third means for detecting horizontal-line positions at which a central effective region of every picture starts and ends respectively in response to output data from the second means.

7. A frame-size adjusting apparatus according to claim 6, further comprising a brightness detector for detecting a brightness represented by the incoming video signal, wherein the third means in the calculation circuit comprises means for detecting the horizontal-line positions in response to the output data from the second means by referring to a judgment level, and means for varying the judgment level as a function of the detected brightness.

8. A frame-size adjusting apparatus according to claim 6, further comprising a nonlinear filter provided at one of a stage preceding the A/D converter and a stage following the A/D converter for emphasizing signal components representing dark picture portions.

9. A frame-size adjusting apparatus comprising:

a low pass filter for removing high-frequency components from an incoming video signal;

an A/D converter for converting an output video signal from the low pass filter into corresponding digital data;

a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit;

wherein the calculation circuit comprises first means for detecting a luminance level in upper and lower mask regions, second means for nonlinearly converting the digital data with respect to a reference value based on the detected luminance level, and third means for detecting horizontal-line positions at which a central effective region of every picture starts and ends respectively in response to output data from the second means.

10. A frame-size adjusting apparatus according to claim 9, wherein the second means comprises means for comparing each value represented by the digital data with the reference value, and means for converting the digital data representative of a value smaller than the reference value into data representative of a predetermined minimum value.

11. A frame-size adjusting apparatus according to claim 9, wherein the third means comprises means for differentiating the output data from the second means into differentiation-resultant data along a vertical direction, means for subjecting the differentiation-resultant data to one of a squaring process or an absolute-value calculating process to change the differentiation-resultant data into process-resultant data, and means for detecting horizontal-line positions at which a central effective region of every picture starts and ends respectively in response to the process-resultant data.

12. A frame-size adjusting apparatus according to claim 9, wherein the calculation circuit further comprises fourth means for dividing a picture frame represented by the sampled and accepted segments of the digital data into a plurality of blocks along vertical boundaries, the third means being operative for detecting horizontal-line positions at which a central effective region of every picture starts and ends respectively for each of the blocks.

13. A frame-size adjusting apparatus comprising:

a low pass filter for removing high-frequency components from an incoming video signal;

an A/D converter for converting an output video signal from the low pass filter into corresponding digital data;

a calculation circuit for sampling and accepting segments of the digital data which correspond to a plurality of vertically-extending regions in at least one field, and for detecting upper and lower mask regions in every picture represented by the incoming video signal; and an aspect converting circuit for controlling an aspect condition of the incoming video signal in response to a result of the detection by the calculation circuit;

wherein the calculation circuit comprises first means for detecting a luminance level in upper and lower mask regions, second means for comparing each value represented by the digital data with a reference value based on the detected luminance level, and third means for detecting horizontal-line positions at which a central effective region of every picture starts and ends respectively in response to a result of the comparison by the second means.

14. A frame-size adjusting apparatus according to claim 13, wherein the calculation circuit further comprises fourth means for dividing a picture frame represented by the sampled and accepted segments of the digital data into a plurality of blocks along vertical boundaries, the third means being operative for detecting horizontal-line positions at which a central effective region of every picture starts and ends respectively for each of the blocks.

15. A frame-size adjusting apparatus comprising:
a low pass filter for removing high-frequency components from an incoming video signal;
an A/D converter for converting an output video signal from the low pass filter into corresponding digital data;
a calculation circuit for sampling and accepting segments of the digital data which correspond to a plurality of vertically-extending regions in at least one field, and for detecting upper and lower mask regions in every picture represented by the incoming video signal; and
an aspect converting circuit for controlling an aspect condition of the incoming video signal in response to a result of the detection by the calculation circuit;
wherein the calculation circuit comprises first means for detecting a luminance level in upper and lower mask regions, second means for converting the digital data into conversion-resultant data representative of either a predetermined first value and a predetermined second value with respect to a reference value based on the detected luminance level, and third means for detecting horizontal-line positions at which a central effective region of every picture starts and ends respectively in response to the conversion-resultant data.

16. A frame-size adjusting apparatus according to claim 15, wherein the second means comprises means for comparing each value represented by the digital data with the reference value, means for converting the digital data representative of a value smaller than the reference value into data representative of a predetermined minimum value, and means for converting the digital data representative of a value greater than the reference value into data representative of a predetermined maximum value.

17. A frame-size adjusting apparatus according to claim 15, wherein the calculation circuit further comprises fourth means for dividing a picture frame represented by the sampled and accepted segments of the digital data into a plurality of blocks along vertical boundaries, the third means being operative for detecting horizontal-line positions at which a central effective region of every picture starts and ends respectively for each of the blocks.

18. A frame-size adjusting apparatus comprising:
a low pass filter for removing high-frequency components from an incoming video signal;
an A/D converter for converting an output video signal from the low pass filter;
a luminance level detector for detecting a luminance level in upper and lower mask regions of a picture represented by the incoming video signal in response to an output signal of the A/D converter;
an analog comparator for comparing the output video signal from the low pass filter with a reference signal representative of a reference level based on the detected luminance level, and for outputting digital data representative of a result of the comparing;
a calculation circuit for sampling and accepting segments of the digital data which correspond to a plurality of vertically-extending regions in at least one field, and for detecting horizontal-line positions at which a central effective region of every picture starts and ends regarding the upper and lower mask regions respectively in response to the sampled and accepted segments of the digital data; and
an aspect converting circuit for controlling an aspect condition of the incoming video signal in response to a result of the detection by the calculation circuit.

19. A frame-size adjusting apparatus comprising:
a low pass filter for removing high-frequency components from an incoming video signal;
an A/D converter for converting an output video signal from the low pass filter;
a digital comparator for comparing the output signal of the A/D converter with a reference signal representative of a reference level, and for outputting digital data representative of a result of the comparing;
a calculation circuit for sampling and accepting segments of the digital data which correspond to a plurality of vertically-extending regions in at least one field, and for detecting horizontal-line positions at which a central effective region of every picture starts and ends regarding the upper and lower mask regions respectively in response to the sampled and accepted segments of the digital data; and
an aspect converting circuit for controlling an aspect condition of the incoming video signal in response to a result of the detection by the calculation circuit.

20. A method of detecting aspect-ratio information, comprising the steps of:
a) sampling and accepting segments of data of an incoming video signal which correspond to a plurality of vertically-extending regions in at least one field;
b) checking a luminance level represented by ones among the sampled and accepted data segments which correspond to upper and lower edge picture regions, and deciding whether or not upper and lower mask regions are present in a picture represented by the incoming video signal in response to the checked luminance level;
c) detecting a luminance level in the upper and lower edge picture regions when the upper and lower mask regions are decided to be present;
d) nonlinearly converting all the sampled and accepted data segments into conversion-resultant data segments with respect to a reference value based on the detected luminance level; and
e) detecting horizontal-line positions at which a central effective region of every picture starts and ends respectively in response to the conversion-resultant data segments.

21. A step according to claim 20, further comprising the steps of:
f) differentiating the conversion-resultant data segments into differentiation-resultant data along a vertical direction; and
g) subjecting the differentiation-resultant data to one of a squaring process and an absolute-value calculating process to change the differentiation-resultant data into process-resultant data, and providing the process-resultant data to the step e).

22. A step according to claim 20, wherein the step d) comprises comparing a value represented by each of the sampled and accepted data segments with the reference value, and converting the data segments representative of a value smaller than the reference value into data segments representative of a predetermined minimum value.

23. A method according to claim 20, wherein the steps b) and c) comprise dividing a picture frame represented by the sampled and accepted data segments into a plurality of blocks along vertical boundaries, executing the check of the luminance level for each of the blocks, and executing the detection of the luminance level for each of the blocks.

24. A method of detecting aspect-ratio information, comprising the steps of:
   a) sampling and accepting segments of data of an incoming video signal which correspond to a plurality of vertically-extending regions in at least one field;
   b) checking a luminance level represented by ones among the sampled and accepted data segments which correspond to upper and lower edge picture regions, and deciding whether or not upper and lower mask regions are present in a picture represented by the incoming video signal in response to the checked luminance level;
   c) detecting a luminance level in the upper and lower edge picture regions when the upper and lower mask regions are decided to be present;
   d) comparing all the sampled and accepted data segments with a reference value based on the detected luminance level; and
   e) detecting horizontal-line positions at which a central effective region of every picture starts and ends respectively in response to a result of the comparison by the step d).

25. A method of detecting aspect-ratio information, comprising the steps of:
   a) sampling and accepting segments of data of an incoming video signal which correspond to a plurality of vertically-extending regions in at least one field;
   b) checking a luminance level represented by ones among the sampled and accepted data segments which correspond to upper and lower edge picture regions, and deciding whether or not upper and lower mask regions are present in a picture represented by the incoming video signal in response to the checked luminance level;
   c) detecting a luminance level in the upper and lower edge picture regions when the upper and lower mask regions are decided to be present;
   d) converting all the sampled and accepted data segments into conversion-resultant data segments representative of either a first predetermined value or a second predetermined value with respect to a reference value based on the detected luminance level; and
   e) detecting horizontal-line positions at which a central effective region of every picture starts and ends respectively in response to the conversion-resultant data segments.

26. A method according to claim 25, wherein the step d) comprises converting the sampled and accepted data segments representative of values smaller than the reference value into data segments representative of a predetermined minimum value, and means for converting the sampled and accepted data segments representative of values greater than the reference value into data representative of a predetermined maximum value.

* * * * *